(12) United States Patent
Kotani

(10) Patent No.: US 7,330,973 B2
(45) Date of Patent: Feb. 12, 2008

(54) SAFETY JUDGMENT METHOD, SAFETY JUDGMENT SYSTEM, SAFETY JUDGMENT APPARATUS, FIRST AUTHENTICATION APPARATUS, AND COMPUTER PROGRAM PRODUCT

(75) Inventor: Seigo Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 10/697,654

(22) Filed: Oct. 31, 2003

(65) Prior Publication Data

US 2004/0139316 A1 Jul. 15, 2004

(30) Foreign Application Priority Data

Nov. 6, 2002 (JP) ............................. 2002-323200

(51) Int. Cl.
*H04L 9/00* (2006.01)
*H04K 1/00* (2006.01)

(52) U.S. Cl. ........................................ 713/175; 713/186
(58) Field of Classification Search ................ 713/175, 713/168, 186
See application file for complete search history.

(56) References Cited

U.S. PATENT DOCUMENTS

| 6,016,476 | A | 1/2000 | Maes et al. |
| 6,289,382 | B1* | 9/2001 | Bowman-Amuah ......... 709/226 |
| 6,434,561 | B1* | 8/2002 | Durst et al. ................ 707/10 |
| 6,842,906 | B1* | 1/2005 | Bowman-Amuah ......... 719/330 |
| 2002/0157015 | A1 | 10/2002 | Gilbert et al. |
| 2003/0154381 | A1* | 8/2003 | Ouye et al. ................. 713/182 |

FOREIGN PATENT DOCUMENTS

| EP | 1 237 091 | 9/2002 |
| EP | 1 271 436 | 1/2003 |
| GB | 2 348 309 | 9/2000 |
| JP | 3-058174 | 3/1991 |
| JP | 9-134260 | 5/1997 |
| JP | 10-116237 | 5/1998 |

(Continued)

OTHER PUBLICATIONS

Extended European Search Report for Application No. EP 07 10 9695.2; mailed Jul. 26, 2007.

(Continued)

Primary Examiner—Kambiz Zand
Assistant Examiner—Aubrey H. Wyszynski
(74) Attorney, Agent, or Firm—Staas & Halsey LLP

(57) ABSTRACT

Security of an information processing apparatus is ensured by performing biological information authentication and collecting the environment information about the information processing apparatus. The information processing apparatus transmits the collected environment information to a first authentication apparatus. An electronic certificate issued by a second authentication apparatus and information encrypted with a secret key issued by the second authentication apparatus are transmitted to the first authentication apparatus. The first authentication apparatus acquires the public key of the second authentication apparatus and the public key of the information processing apparatus so as to decrypt the encrypted information, and judges whether or not the decrypted information is proper. The first authentication apparatus refers to an environment information database and the transmitted information, and judges whether or not the transmitted environment information is proper. When all the authentications by the biological information authentication, environment information authentication and electronic certificate authentication are successful, the information processing apparatus is judged to be safe.

47 Claims, 37 Drawing Sheets

FOREIGN PATENT DOCUMENTS

| | | |
|---|---|---|
| JP | 10-283190 | 10/1998 |
| JP | 2000-004225 | 1/2000 |
| JP | 2000-101568 | 4/2000 |
| JP | 2002-208986 | 7/2002 |
| JP | 2002-353960 | 12/2002 |
| WO | 02/03178 A2 | 1/2002 |
| WO | 02/13444 A2 | 2/2002 |
| WO | 02/17048 A2 | 2/2002 |
| WO | WO 02/084565 | 10/2002 |
| WO | WO 03/007538 | 1/2003 |

OTHER PUBLICATIONS

Office Action for European Application No. EP 03 256 912.1-2224 dated Jul. 25, 2007.

* cited by examiner

FIG. 4
ENVIRONMENT INFORMATION DB 251

| CLASS | PRICE INFOR-MATION | PRODUCT INFOR-MATION | ENVIRONMENT CONDITION ||||||
|---|---|---|---|---|---|---|---|---|
| | | | DEVICE INFORMATION || SOFTWARE || PERIPHERAL EQUIPMENT ||
| | | | DEVICE NAME | Ver. | SOFTWARE NAME | Ver. | EQUIPMENT NAME | Ver. |
| 6 | ~¥100 | CHAKU-MERO IMAGE DATA ... | S001~S004 F001~F004 N001~N004 ... | 1.0 OR MORE 1.0 OR MORE — ... | A B C ... | 2.0 OR MORE 1.0 OR MORE 1.0 OR MORE ... | XX XY ZZ ... | 1.0 OR MORE 2.0 OR MORE 3.0 OR MORE ... |
| 5 | ¥101~¥3,000 | ORDI-NARY DOCU-MENT FILE ... | S003, S004 F003, F004 N003, N004 ... | 1.5 OR MORE — — ... | B C ... | 2.5 OR MORE 1.0 OR MORE ... | XX XY ... | 2.0 OR MORE 2.0 OR MORE ... |
| ... | ... | ... | ... | ... | ... | ... | ... | ... |
| 1 | ¥50,000~ | STOCK CERTIFI-CATE ... | S004 F004 N004 ... | 2.0 OR MORE — — ... | C | 3.0 OR MORE | — | — |

FIG. 6

```
PRODUCT ORDER MENU
PRINTER
[INK JET O××-△△      ▼]

NUMBER [1 ▼]
SCANNER
[△△△×××              ▼]

NUMBER [0 ▼]
                :
TOTAL ¥ 29,800
      [ BUY ]  [ CANCEL ]
```

SAFETY JUDGMENT METHOD, SAFETY JUDGMENT SYSTEM, SAFETY JUDGMENT APPARATUS, FIRST AUTHENTICATION APPARATUS, AND COMPUTER PROGRAM PRODUCT

BACKGROUND OF THE INVENTION

1. Field of the Invention

The present invention relates to a safety judgment method, a safety judgment system, a safety judgment apparatus and a first authentication apparatus, for judging the safety of an information processing apparatus among the information processing apparatus, the first authentication apparatus and a second authentication apparatus which are connected through a communication network, and a computer program product for causing a computer to function as a safety judgment apparatus, and more particularly relates to a safety judgment apparatus which is incorporated into an information processing apparatus, such as a mobile phone, home electronics and personal computer, to judge the safety of the information processing apparatus.

2. Description of Related Art

With the introduction of IPv6 (Internet Protocol Version 6), not only personal computers, server computers and mobile phones, but also home electronics, such as refrigerators, microwave ovens, air conditioners, TVs and DVD apparatuses, copying machines and further robots are connected as information processing apparatuses to communication networks such as the Internet, and transmit and receive information. With such an increase in the number of information processing apparatuses connected to the communication networks, security is lowered.

In particular, since the security of home electronics is low, there is a case where programs which obstruct normal operations of home electronics are sent from external devices, and there is a fear that home electronics is used as a stepping-stone for DDoS (Distributed Denial of Service). Hence, in order to increase the security of such information processing apparatuses, attempts were made to provide information processing apparatuses with a biometric authentication function using a fingerprint, etc. (see, for example, Japanese Patent Application Laid-Open No. 3-58174/1991).

However, there was a problem that it was difficult to ensure high security only by biometric authentication because fingerprint information for authentication may leak. In particular, when performing an electronic transaction by using such an information processing apparatus, it is desirable to perform the transaction after ensuring security by confirming whether the information processing apparatus is used by a proper owner, whether the transaction is performed using the owner's own information processing apparatus, whether devices or software, such as OS (Operating System), browser and plug-in software, which may harm security are not connected to or installed in the information processing apparatus, and so on.

Moreover, when providing such an information processing apparatus with patch software or firmware, it is necessary to ensure sufficient security between an apparatus that transmits the information and the information processing apparatus because there is a risk that the software being transmitted may be falsified by a third person. On the other hand, when the level of security is increased too high, it is hard to perform smooth transmission and reception of information.

BRIEF SUMMARY OF THE INVENTION

The present invention has been made with the aim of solving the above problems, and it is an object of the present invention to provide a safety judgment method, a safety judgment system, a safety judgment apparatus and a first authentication apparatus, which are capable of increasing security by combining authentication using biological information, authentication using an electronic certificate issued by a certificate authority (PKI authentication: Public Key Infrastructure authentication) and authentication using environment information that utilizes the class of the environment in which the information processing apparatus is used, and capable of performing smooth transmission and reception of information after ensuring proper security, and to provide a computer program product for causing a computer to function as a safety judgment apparatus.

Another object of the present invention is to provide a safety judgment system capable of realizing smooth transactions after ensuring security by changing the class of security according to the values of products in the transactions.

Still another object of the present invention is to provide a safety judgment system capable of easily distributing patch software, etc. after ensuring security by receiving the patch software, etc. with the use of receiving communicating means for reception for receiving supply of power from sub-power supplying means other than main power supplying means, and storing the patch software, etc.

According to a first aspect of the safety judgment method of the present invention, there is provided a safety judgment method for judging safety of an information processing apparatus among the information processing apparatus, a first authentication apparatus and a second authentication apparatus which are connected through a communication network, characterized by comprising the steps of receiving biological information by the information processing apparatus; authenticating the biological information by judging whether the received biological information is proper or not by the information processing apparatus, the first authentication apparatus, or the second authentication apparatus; collecting environment information including information about peripheral equipment connected to the information processing apparatus or about software installed in the information processing apparatus; transmitting the collected environment information from the information processing apparatus to the first authentication apparatus; transmitting an electronic certificate issued in advance by the second authentication apparatus and information encrypted with a secret key issued by the second authentication apparatus from the information processing apparatus to the first authentication apparatus; authenticating the electronic certificate by the first authentication apparatus by decrypting the encrypted information with a public key acquired from the transmitted electronic certificate by using a public key acquired from the second authentication apparatus, and judging whether or not the decrypted information is proper; authenticating the environment information by the first authentication apparatus by judging whether or not the transmitted environment information is proper with reference to an environment information database, which stores environment conditions classified according to information to be transmitted and received, and the transmitted information; and judging the information processing apparatus to be safe by the first authentication apparatus when all the authentications performed in the step of authenticating the biological information, the step of authenticating the environment information, and the step of authenticating an electronic certificate are successful.

According to a second aspect of the safety judgment method of the present invention, there is provided a safety judgment method for judging safety of an information processing apparatus among the information processing apparatus, a first authentication apparatus and a second authentication apparatus which are connected through a communication network, characterized by comprising the steps of receiving biological information by the information processing apparatus; authenticating the biological information by judging whether the received biological information is proper or not by the information processing apparatus, the first authentication apparatus, or the second authentication apparatus; collecting environment information including information about peripheral equipment connected to the information processing apparatus or about software installed in the information processing apparatus; encrypting the collected environment information with a secret key issued by the second authentication apparatus; transmitting an electronic certificate issued in advance by the second authentication apparatus and the environment information encrypted with the secret key from the information processing apparatus to the first authentication apparatus; authenticating the electronic certificate by the first authentication apparatus by decrypting the encrypted environment information with a public key acquired from the transmitted electronic certificate by using a public key acquired from the second authentication apparatus, and judging whether or not the decrypted environment information is proper; authenticating the environment information by the first authentication apparatus by judging whether or not the decrypted environment information is proper with reference to an environment information database, which stores environment conditions classified according to information to be transmitted and received, and the transmitted information; and judging the information processing apparatus to be safe by the first authentication apparatus when all the authentications performed in the step of authenticating the biological information, the step of authenticating the environment information, and the step of authenticating an electronic certificate are successful.

According to a third aspect of the safety judgment method of the present invention, in the first and second aspects of the safety judgment method of the present invention, the safety judgment method is characterized by further comprising the sub-steps of receiving biological information by the first authentication apparatus; authenticating the biological information by judging whether the received biological information is proper or not by the information processing apparatus, the first authentication apparatus, or the second authentication apparatus; collecting environment information including information about peripheral equipment connected to the first authentication apparatus or about software installed in the first authentication apparatus; encrypting the environment information collected in the sub-step of collecting the environment information, with a secret key issued by the second authentication apparatus; transmitting an electronic certificate issued by the second authentication apparatus and the encrypted environment information to the information processing apparatus; authenticating the electronic certificate by the information processing apparatus by decrypting the encrypted environment information with a public key, which is acquired from the transmitted electronic certificate by using a public key acquired from the second authentication apparatus, and judging whether or not the decrypted environment information is proper; authenticating the environment information by the information processing apparatus by judging whether or not the transmitted environment information is proper with reference to a sub-environment information database, which stores environment conditions classified according to information to be transmitted and received, and the decrypted environment information; and judging the information processing apparatus and the first authentication apparatus to be safe when all the authentications performed in the sub-step of authenticating the biological information, the sub-step of authenticating the environment information and the sub-step of authenticating the electronic certificate are successful and the information processing apparatus is judged safe in the step of judging the information processing apparatus to be safe.

According to a fourth aspect of the safety judgment method of the present invention, there is provided a safety judgment method for judging safety of an information processing apparatus among the information processing apparatus, a first authentication apparatus and a second authentication apparatus which are connected through a communication network, characterized by comprising the steps of receiving biological information by the information processing apparatus; authenticating the biological information by judging whether the received biological information is proper or not by the information processing apparatus, the first authentication apparatus, or the second authentication apparatus; collecting environment information including information about peripheral equipment connected to the information processing apparatus or about software installed in the information processing apparatus; transmitting the collected environment information from the information processing apparatus to the first authentication apparatus; transmitting an electronic certificate issued in advance by the second authentication apparatus and information encrypted with a secret key issued by the second authentication apparatus from the information processing apparatus to the first authentication apparatus; authenticating the environment information by the first authentication apparatus by judging whether or not the transmitted environment information is proper with reference to an environment information database that stores environment conditions classified according to information to be transmitted and received; and authenticating the electronic certificate by the information processing apparatus by decrypting the encrypted software with a public key, which is acquired from the transmitted electronic certificate by using a public key acquired from the second authentication apparatus, and judging whether or not the decrypted software is proper; and installing the decrypted software in the information processing apparatus when all the authentications performed in the step of authenticating the biological information, the step of authenticating the environment information and the step of authenticating the electronic certificate are successful.

According to a first aspect of the safety judgment system of the present invention, there is provided a safety judgment system for judging safety of an information processing apparatus among the information processing apparatus, a first authentication apparatus and a second authentication apparatus which are connected through a communication network, wherein the information processing apparatus comprises: biological information receiving means for receiving biological information; biological information authenticating means for judging whether or not the received biological information is proper; environment information collecting means for collecting environment information including information about peripheral equipment connected thereto or about software installed therein; environment information transmitting means for transmitting the environment information collected by the environment information collecting means to the first authentication apparatus; and encrypted information transmitting means for transmitting an electronic certificate issued by the second authentication apparatus and information encrypted with a secret key issued by the second authentication apparatus to the first authentication apparatus, and the first authentication apparatus comprises: electronic certificate authenticating means for decrypting the encrypted information with a public key, which is acquired from the transmitted electronic certificate by using a public key acquired from the second authentication apparatus, and judging whether or not the decrypted information is proper; environment information authenticating means for judging whether or not the transmitted environment information is proper with reference to an environment information database, which stores environment conditions classified according to information to be transmitted and received, and the transmitted information; and safety judging means for judging the information processing apparatus to be safe when all the authentications performed by the biological information authenticating means, the environment information authenticating means and the electronic certificate authenticating means are successful.

According to a second aspect of the safety judgment system of the present invention, in the first aspect of the safety judgment system of the present invention, the environment information transmitting means and the encrypted information transmitting means are constructed to encrypt the collected environment information with the secret key and transmit the encrypted environment information together with the electronic certificate to the first authentication apparatus.

According to a third aspect of the safety judgment system of the present invention, in the first aspect of the safety judgment system of the present invention, the safety judgment system is characterized by further comprising a shop computer for transmitting and receiving information relating to transactions to/from the information processing apparatus, wherein the information processing apparatus further comprises means for receiving information relating to transactions, including product information or price information, the encrypted information transmitting means is constructed to transmit an electronic certificate issued by the second authentication apparatus and the information relating to transactions encrypted with the secret key issued by the second authentication apparatus to the first authentication apparatus, the environment information authenticating means is constructed to read an environment condition related to a class corresponding to the transmitted product information or price information from the environment information database and judge whether or not the environment condition is proper, based on whether or not the transmitted environment information matches the read environment condition, and the first authentication apparatus further comprises means for transmitting information indicating that the information processing apparatus is safe to the shop computer, when the safety judging means judges that the information processing apparatus is safe.

According to a fourth aspect of the safety judgment system of the present invention, in the first aspect of the safety judgment system of the present invention, the first authentication apparatus comprises: sub-biological information receiving means for receiving biological information; sub-biological information authenticating means for judging whether or not the biological information received by the sub-biological information receiving means is proper; sub-environment information collecting means for collecting environment information including information about peripheral equipment connected thereto or about software installed therein; sub-encrypting means for encrypting the environment information collected by the sub-environment information collecting means, with a secret key issued by the second authentication apparatus; and sub-encrypted information transmitting means for transmitting an electronic certificate issued by the second authentication apparatus and the encrypted environment information to the information processing apparatus, and the information processing apparatus comprises: sub-electronic certificate authenticating means for decrypting the encrypted environment information with a public key, which is acquired from the transmitted electronic certificate by using a public key acquired from the second authentication apparatus, and judging whether or not the decrypted environment information is proper; sub-environment information authenticating means for judging whether or not the transmitted environment information is proper with reference to a sub-environment information database, which stores environment conditions classified according to information to be transmitted and received, and the decrypted environment information; and sub-safety judging means for judging the information processing apparatus and the first authentication apparatus to be safe when all the authentications performed by the sub-biological information authenticating means, the sub-environment information authenticating means and the sub-electronic certificate authenticating means are successful and the safety judging means judges that the information processing apparatus are safe.

According to a fifth aspect of the safety judgment system of the present invention, there is provided a safety judgment system for judging safety of an information processing apparatus among the information processing apparatus, a first authentication apparatus and a second authentication apparatus which are connected through a communication network, wherein the information processing apparatus comprises: biological information receiving means for receiving biological information; biological information authenticating means for judging whether or not the biological information received by the biological information receiving means is proper; environment information collecting means for collecting environment information including information about peripheral equipment connected thereto or about software installed therein; and environment information transmitting means for transmitting the environment information collected by the environment information collecting means to the first authentication apparatus, the first authentication apparatus comprises: encrypted information transmitting means for transmitting an electronic certificate issued by the second authentication apparatus and software encrypted with a secret key issued by the second authentication apparatus to the information processing apparatus; and environment information authenticating means for judging whether or not the transmitted environment information is proper with reference to an environment information database that stores environment conditions classified according to information to be transmitted and received, and the information processing apparatus further comprises: electronic certificate authenticating means for decrypting the encrypted software with a public key, which is acquired from the transmitted electronic certificate by using a public key acquired from the second authentication apparatus, and judging whether or not the decrypted software is proper; and installing means for installing the decrypted software when all the authentications performed by the biological information authenticating means, the environment information authenticating means and the electronic certificate authenticating means are successful.

According to a sixth aspect of the safety judgment system of the present invention, in the fifth aspect of the safety judgment system of the present invention, the information processing apparatus further comprises: main power supplying means; sub-power supplying means; communicating means for reception for receiving supply of power from the sub-power supplying means; and storing means for storing the electronic certificate and software encrypted with the secret key which were transmitted by the encrypted information transmitting means and received by the communicating means for reception, when power is not supplied by the main power supplying means.

According to a seventh aspect of the safety judgment system of the present invention, in the sixth aspect of the safety judgment system of the present invention, the electronic certificate authenticating means is constructed to read the electronic certificate and software stored in the storing means when power is supplied by the main power supplying means, decrypt the encrypted software with a public key which is acquired from the electronic certificate by using a public key acquired from the second authentication apparatus, and judge whether or not the decrypted software is proper.

According to an eighth aspect of the safety judgment system of the present invention, in any one of the fifth aspect through the seventh aspect of the safety judgment system of the present invention, the software is patch software for software pre-installed in the information processing apparatus.

According to a ninth aspect of the safety judgment system of the present invention, in any one of the fifth aspect through the seventh aspect of the safety judgment system of the present invention, the information processing apparatus further comprises deleting means for deleting data stored in a storage unit on and after a predetermined time, when the software installed by the installing means is executed.

According to a tenth aspect of the safety judgment system of the present invention, there is provided a safety judgment system for judging safety of an information processing apparatus among the information processing apparatus, a first authentication apparatus and a second authentication apparatus which are connected through a communication network, wherein the information processing apparatus comprises: biological information receiving means for receiving biological information; environment information collecting means for collecting environment information including information about peripheral equipment connected thereto or about software installed therein; encrypting means for encrypting the biological information received by the biological information receiving means and the environment information collected by the environment information collecting means, with a secret key issued by the second authentication apparatus; and encrypted information transmitting means for transmitting an electronic certificate issued by the second authentication apparatus and the encrypted biological information and environment information to the first authentication apparatus, and the first authentication apparatus comprises: electronic certificate authenticating means for decrypting the encrypted biological information and environment information with a public key, which is acquired from the transmitted electronic certificate by using a public key acquired from the second authentication apparatus, and judging whether or not the decrypted biological information and environment information are proper; environment information authenticating means for judging whether or not the transmitted environment information is proper with reference to an environment information database, which stores environment conditions classified according to information to be transmitted and received, and the decrypted environment information; biological information authenticating means for judging whether or not the biological information is proper by comparing the decrypted biological information with pre-stored biological information; and safety judging means for judging the information processing apparatus to be safe when all the authentications performed by the biological information authenticating means, the environment information authenticating means and the electronic certificate authenticating means are successful.

According to an eleventh aspect of the safety judgment system of the present invention, in the ninth aspect of the safety judgment system of the present invention, the first authentication apparatus comprises: sub-biological information receiving means for receiving biological information; sub-biological information authenticating means for judging whether or not the biological information received by the sub-biological information receiving means is proper; sub-environment information collecting means for collecting environment information including information about peripheral equipment connected thereto or about software installed therein; sub-encrypting means for encrypting the environment information collected by the sub-environment information collecting means, with a secret key issued by the second authentication apparatus; and sub-encrypted information transmitting means for transmitting an electronic certificate issued by the second authentication apparatus and the encrypted environment information to the information processing apparatus, and the information processing apparatus comprises: sub-electronic certificate authenticating means for decrypting the encrypted environment information with a public key, which is acquired from the transmitted electronic certificate by using a public key acquired from the second authentication apparatus, and judging whether or not the decrypted environment information is proper; sub-environment information authenticating means for judging whether or not the transmitted environment information is proper with reference to a sub-environment information database, which stores environment conditions classified according to information to be transmitted and received, and the decrypted environment information; and sub-safety judging means for judging the information processing apparatus and the first authentication apparatus to be safe when all the authentications performed by the sub-biological information authenticating means, the sub-environment information authenticating means and the sub-electronic certificate authenticating means are successful and judges that the information processing apparatus is safe.

According to a twelfth aspect of the safety judgment system of the present invention, in any one of the first aspect through the eleventh aspect of the safety judgment system of the present invention, the environment information includes information about name or version of installed software, equipment name or version of connected peripheral equipment, or device name or version of the information processing apparatus.

According to a thirteenth aspect of the safety judgment system of the present invention, in any one of the fifth aspect through the twelfth aspect of the safety judgment system of the present invention, the biological information is information about voice, fingerprint, retina, or iris.

According to a fourteenth aspect of the safety judgment system of the present invention, there is provided a safety judgment apparatus for judging safety of an information processing apparatus connected to a first authentication apparatus and a second authentication apparatus through a communication network, characterized by comprising: biological information authenticating means for judging whether or not received biological information is proper; environment information collecting means for collecting environment information including information about peripheral equipment connected to the information processing apparatus or about software installed in the information processing apparatus; environment information transmitting means for transmitting the environment information collected by the environment information collecting means to the first authentication apparatus; encrypted information transmitting means for transmitting an electronic certificate issued by the second authentication apparatus and information encrypted with a secret key issued by the second authentication apparatus to the first authentication apparatus; and safety judging means for judging the information processing apparatus to be safe when the biological information authenticating means judges proper, the first authentication apparatus judges that the environment information transmitted by the environment information transmitting means is proper, the first authentication apparatus judges that the electronic certificate and encrypted information transmitted by the encrypted information transmitting means are proper, and the safety judging means receives information indicating that the information is proper.

According to a fifteenth aspect of the safety judgment system of the present invention, there is provided a safety judgment apparatus for judging safety of an information processing apparatus connected to a first authentication apparatus and a second authentication apparatus through a communication network, characterized by comprising: biological information authenticating means for judging whether or not received biological information is proper; environment information collecting means for collecting environment information including information about peripheral equipment connected to the information processing apparatus or about software installed in the information processing apparatus; environment information transmitting means for transmitting the environment information collected by the environment information collecting means to the first authentication apparatus; electronic certificate authenticating means for, when an electronic certificate and encrypted software are received from the first authentication apparatus, decrypting the encrypted software with a public key, which is acquired from the electronic certificate by using a public key acquired from the second authentication apparatus, and judging whether or not the decrypted software is proper; and installing means for installing the decrypted software in the information processing apparatus when the authentications performed by the biological information authenticating means and the electronic certificate authenticating means are judged successful, the first authentication apparatus judges that the environment information transmitted by the environment information transmitting means is proper, and the installing means receives information indicating that the information is proper.

According to a first aspect of the first authentication apparatus of the present invention, there is provided a first authentication apparatus for judging safety of an information processing apparatus connected through a communication network, characterized by comprising: authentication information receiving means for receiving authentication information indicating whether or not biological information received by the information processing apparatus is proper; electronic certificate authenticating means for, when an electronic certificate issued by a second authentication apparatus connected through the communication network and information encrypted with a secret key issued by the second authentication apparatus are transmitted from the information processing apparatus, decrypting the encrypted information with a public key, which is acquired from the transmitted electronic certificate by using a public key acquired from the second authentication apparatus, and judging whether or not the decrypted information is proper; environment information authenticating means for, when environment information including information about peripheral equipment connected to the information processing apparatus or about software installed in the information processing apparatus is received from the information processing apparatus, judging whether or not the received environment information is proper with reference to an environment information database, which stores environment conditions classified according to information to be transmitted and received, and the transmitted information; and safety judging means for judging the information processing apparatus to be safe when the authentication information receiving means receives authentication information indicating that the biological information is proper, and authentications performed by the environment information authenticating means and the electronic certificate authenticating means are judged successful.

According to a first aspect of the computer program product of the present invention, there is provided a computer program product, within a computer readable medium, for judging safety of a computer connected to a first authentication apparatus and a second authentication apparatus through a communication network, characterized by comprising the steps of causing the computer to authenticate biological information by authenticating whether or not received biological information is proper; causing the computer to collect environment information including information about connected peripheral equipment or about installed software; causing the computer to transmit environment information by transmitting the collected environment information to the first authentication apparatus; causing the computer to transmit encrypted information by transmitting an electronic certificate issued by the second authentication apparatus and information encrypted with a secret key issued by the second authentication apparatus to the first authentication apparatus; and causing the computer to judge the computer to be safe when the biological information is judged proper in the step of authenticating the biological information, the first authentication apparatus judges that environment information transmitted in the step of transmitting environment information is proper, the first authentication apparatus judges that the electronic certificate and encrypted information transmitted in the step of transmitting the encrypted information are proper, and information indicating that the information is proper is received from the first authentication apparatus.

According to a second aspect of the computer program product of the present invention, there is provided a computer program product, within a computer readable medium, for judging safety of a computer connected to a first authentication apparatus and a second authentication apparatus through a communication network, characterized by comprising the steps of: causing the computer to authenticate biological information by authenticating whether or not received biological information is proper; causing the computer to collect environment information including information about connected peripheral equipment or about installed software; causing the computer to transmit environment information by transmitting the collected environment information to the first authentication apparatus; when an electronic certificate and encrypted software are received from the first authentication apparatus, causing the computer to authenticate the electronic certificate by decrypting the encrypted software with a public key, which is acquired from the electronic certificate by using a public key acquired from the second authentication apparatus, and judging whether or not the decrypted software is proper; and causing the computer to install the decrypted software when authentications performed in the step of authenticating the biological information and the step of authenticating the electronic certificate are judged successful, the first authentication apparatus judges that the environment information transmitted in the step of transmitting environment information is proper, and information indicating that the information is proper is received.

According to the present invention as described above, the biological information such as the fingerprint of a user is received, and a judgment is made as to whether the received biological information is proper or not. Moreover, environment information, including the information about peripheral equipment connected to the information processing apparatus or software installed in the information processing apparatus, is collected. More specifically, the device name and version of the information processing apparatus itself, the name of equipment connected to the information processing apparatus, and the installed browser name, OS name and versions correspond to the environment information. The information processing apparatus transmits the collected environment information to the first authentication apparatus.

Further, an electronic certificate issued by the second authentication apparatus, such as a certificate authority in the position of a third person, and information relating to transactions encrypted with the secret key of the information processing apparatus are transmitted to the first authentication apparatus. When the first authentication apparatus receives the electronic certificate and the encrypted information, it acquires the public key of the information processing apparatus from the transmitted electronic certificate by using the public key of the second authentication apparatus (certificate authority) acquired from the second authentication apparatus. Then, the first authentication apparatus decrypts the encrypted information with the acquired public key of the information processing apparatus, and judges whether the decrypted information is proper or not by using the message digest, etc.

The first authentication apparatus judges whether the transmitted environment information is proper or not with reference to an environment information database, which stores conditions of environment information classified according to information to be transmitted and received, and the transmitted information. Specifically, when there is a need to ensure high security for the information to be transmitted and received, the environment information of the information processing apparatus needs to satisfy a stricter (higher class) environment condition. For instance, in the case where high security is required (for example, transactions of stocks and high-priced products of not less than ¥50,000), the condition is that the OS of the information processing apparatus must be of the latest version. When the OS of the information processing apparatus is of the latest version, the first authentication apparatus judges the environment authentication is successful, while, when the OS of the information processing apparatus is not of the latest version (is of an old version), the first authentication apparatus judges the environment authentication is unsuccessful because this OS may have security holes.

On the other hand, in the case of transactions of low-priced products, since it is necessary to secure convenience rather than security, there is no need to satisfy high-class conditions. Therefore, even if an OS of old version with some security holes is installed, the environment authentication is judged successful. For example, in the case of a transaction of a product priced at around ¥100, even if the OS of the information processing apparatus is of an old version, the environment authentication is judged successful. When all the authentications by the biological information authentication, environment information authentication and electronic certificate authentication are judged successful, the information processing apparatus is judged to be safe, and, for example, a flag indicating that the information processing apparatus is safe is set, information indicating that the information processing apparatus is safe is sent to a shop computer involved in the transaction, and then transmission and reception of information between the information processing apparatus and the shop computer are performed after ensuring security. With such a structure, it is possible to realize smooth transmission and reception of information and transactions while ensuring the security of the information processing apparatus. Further, biological information authentication, electronic certificate authentication and environment authentication are also performed in the first authentication apparatus, and, only when all of the biological information authentication, electronic certificate authentication and environment authentication performed in the information processing apparatus and the biological information authentication, electronic certificate authentication and environment authentication performed in the first authentication apparatus are judged successful, both of the first authentication apparatus and the information processing apparatus are judged to be proper. Thus, it is possible to ensure higher security.

Besides, according to the present invention, the biological information such as the fingerprint of a user is received, and personal authentication is performed by judging whether or not the received biological information is proper. Then, as described above, the information processing apparatus transmits the collected environment information to the first authentication apparatus, and authentication of the environment information is performed in the first authentication apparatus. In the case of transmitting patch software or the like from the first authentication apparatus to the information processing apparatus, the first authentication apparatus transmits an electronic certificate issued by the second authentication apparatus and the software encrypted with a secret key issued by the second authentication apparatus to the information processing apparatus.

When the information processing apparatus receives the electronic certificate and the encrypted software, it makes a request for a public key to the second authentication apparatus, and acquires the public key of the first authentication apparatus from the electronic certificate by using the public key of this certificate authority. Then, the information processing apparatus decrypts the encrypted software with the acquired public key, and judges whether or not the decrypted software is proper. Finally, when all the authentications by the above-mentioned personal authentication, environment authentication and electronic certificate authentication are judged successful, the decrypted software is installed in the information processing apparatus. With such a structure, it is possible to prevent "spoofing" by a third person, and provide software such as patch software and firmware for the information processing apparatus while maintaining high security.

Further, according to the present invention, the information processing apparatus comprises main power supplying means, sub-power supplying means, and communicating means for reception that is constructed to receive supply of power from the sub-power supplying means. When the electronic certificate and software encrypted with the secret key are transmitted from the first authentication apparatus when power is not supplied by the main power supplying means, i.e., when the main power source is not ON, the communicating means for reception using sub-power supplying means receives these pieces of information and stores them. Then, when power is supplied by the main power supplying means, the stored electronic certificate and software are read, a judgment is made as to whether the transmitted software is proper or not, and personal authentication and environment authentication are performed. It is therefore possible to distribute a large amount of patch software to customers, including customers who do not turn on the power, after ensuring security. In particular, as the software to be provided, when software that deletes data stored on and after a predetermined time from the storage unit is provided, it is possible to effectively prevent the use of software as a stepping-stone for DDoS attacks.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanatory view showing the record layout of environment information DB;

FIG. 6 is an explanatory view showing the displayed state of a Web page;

DETAILED DESCRIPTION OF THE PREFERRED EMBODIMENTS

The following description will explain the present invention in detail, based on the drawings illustrating preferred embodiments thereof.

Embodiment 1

Embodiment 1 illustrates a case where an information processing apparatus is a mobile phone, and a safety judgment system of the present invention is applied to a transaction using a mobile phone. Note that the information processing apparatus is not necessarily limited to a mobile phone, and may be a personal computer, copying machine, printer, FAX, refrigerator, TV, apparatus, PDA (Personal Digital Assistant), air conditioner, microwave oven, robot, etc.

Figure 1:
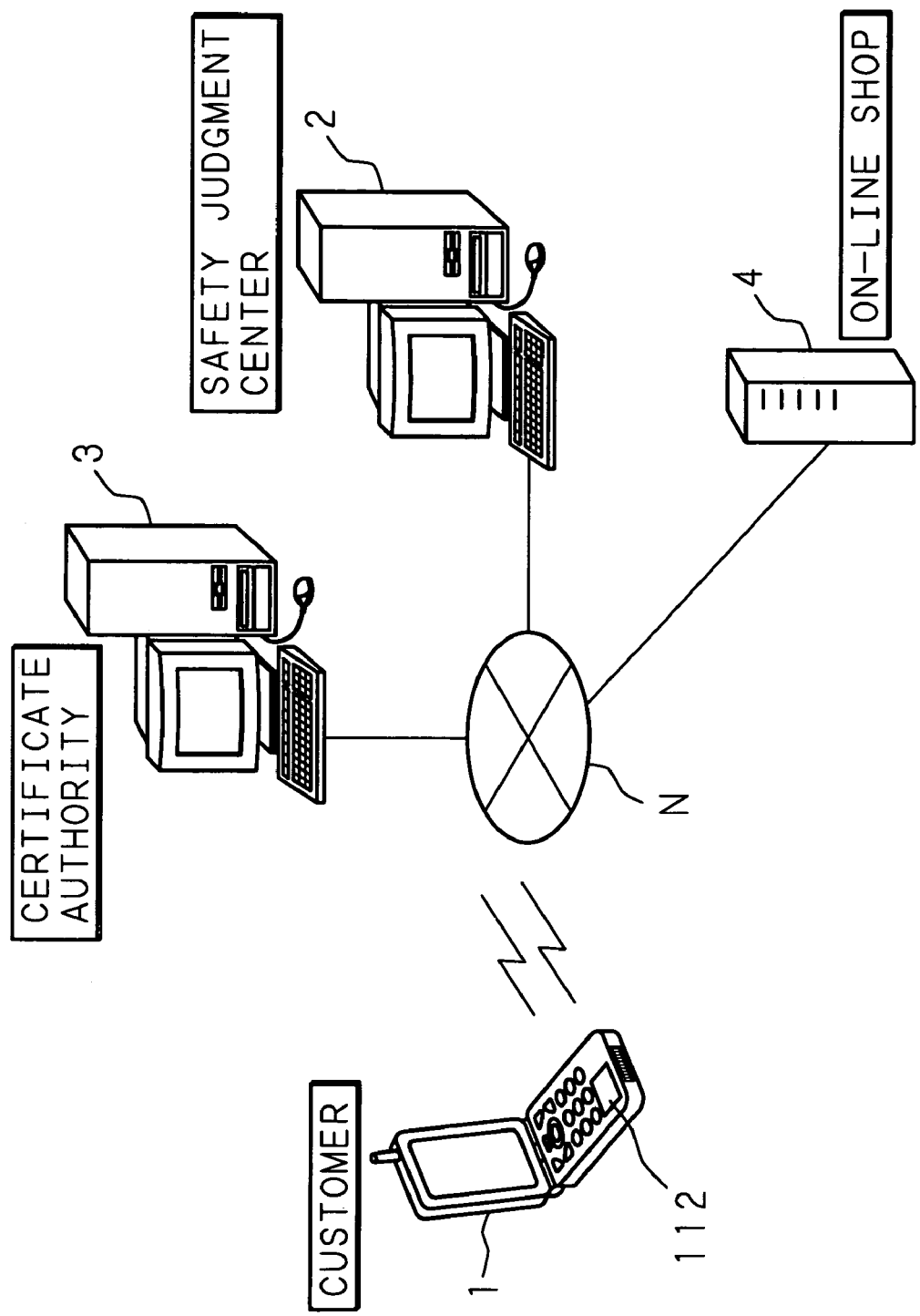
FIG. 1 is a schematic view showing the outline of a safety judgment system according to the present invention.

FIG. 1 is a schematic view showing the outline of the safety judgment system according to the present invention. In FIG. 1, numeral 1 is a mobile phone as an information processing apparatus, 3 is a second authentication apparatus (hereinafter referred to as a certificate authority server) of a certificate authority which is a third party who issues an electronic certificate, 2 is a center server as a first authentication apparatus which is a safety judgment center for judging the safety of the mobile phone 1, and 4 is a shop computer (hereinafter referred to as a Web server) of an on-line shop that sells products on-line. The mobile phone 1 is connected to a communication network (hereinafter referred to as the Internet) N through a mobile phone network (not shown), and similarly the certificate authority server 3, the center server 2 and the Web server 4 are connected to the Internet N. The mobile phone 1 comprises a fingerprint acquisition unit 112 as biological information receiving means, and has the function of capturing fingerprint information acquired by scanning the fingerprint of a customer into the mobile phone 1.

Figure 2:
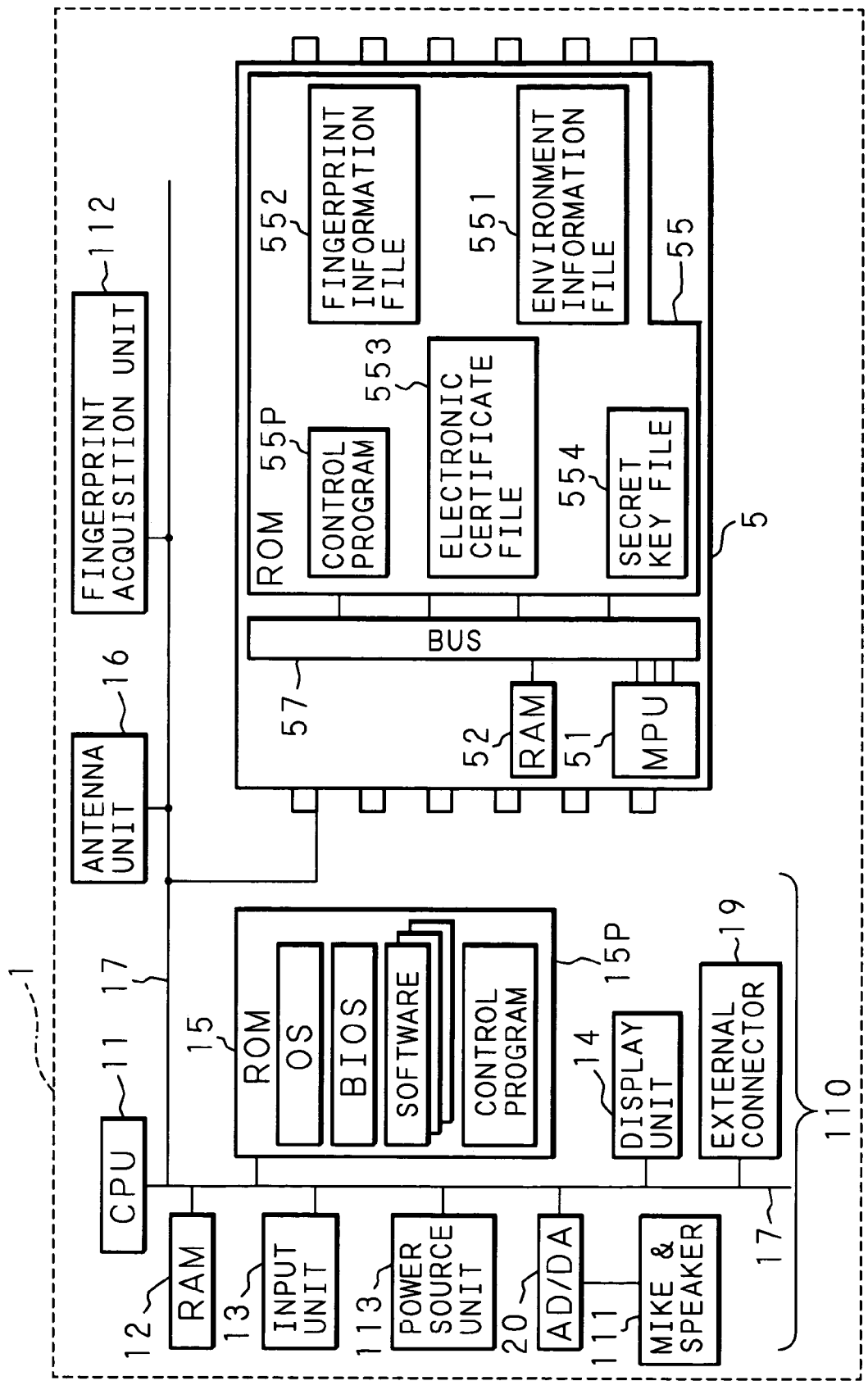
FIG. 2 is a block diagram showing the hardware structure of a mobile phone.

FIG. 2 is a block diagram showing the hardware structure of the mobile phone 1. The mobile phone 1 as an information processing apparatus comprises a mobile phone engine unit 110 for performing normal functions, such as the call function and the transmission and reception of character and image data, and a safety judgment apparatus 5 of the present invention. In Embodiment 1, the safety judgment apparatus (hereinafter referred to as the security chip) 5 is an LSI (Large Scale Integrated Circuit) chip and mounted in the mobile phone 1.

The following description will explain the hardware structure of the mobile phone engine unit 110. As shown in FIG. 1, a RAM 12, a ROM 15, an antenna unit 16, a power source unit 113, a microphone (mike) and speaker 111, an AD/DA converter 20, an external connector 19, a display unit 14 such as a liquid crystal display for data display, and an input unit 13, including numeric keys, cursor keys and selection and define keys, are connected to a CPU (Central Processing Unit) 11 through a bus 17. The CPU 11 is connected through the bus 17 to various hardware units of the mobile phone 1 as described above, controls such hardware units, and executes various software functions according to a control program 15P stored in the ROM 15.

The external connector 19 is an interface composed of 16 conductors, for example, and is connected through a USB cable or the like to a personal computer or peripheral equipment (both not shown). The RAM 12 is constructed by an SRAM (Static Random Access Memory), a flush memory, or the like, and stores temporary data created during the execution of software. The ROM 15 is constructed by an EEPROM (Electrically Erasable and Programmable ROM), for example, and stores an OS (Operating System) that provides a basic operation environment of the mobile phone 1, a BIOS (Basic Input/Output System) that controls the peripheral equipment connected to the external connector 19, and software downloaded or pre-installed, such as Java®.

In addition to the input unit 13 of the mobile phone engine unit 110, the fingerprint acquisition unit 112 for acquiring fingerprint information of a customer is provided in the vicinity of the input unit 13 of the mobile phone 1. The fingerprint acquisition unit 112 outputs the fingerprint information read by scanning to the security chip 5. Note that in Embodiment 1, although a fingerprint is used as biological information, the biological information is not necessarily limited to the fingerprint and may be the information about voice, retina, or iris. In the case of voice, for example, authentication is performed by acquiring voice from the microphone and speaker 11, converting the voice into a digital signal with the AD/DA converter 20, outputting the voice to the CPU 11, and comparing the voice with pre-stored customer's own voice data.

Next, the hardware structure of the security chip 5 will be explained. The security chip 5 comprises a microprocessor (hereinafter referred to as an MPU) 51, a RAM 52, and a ROM 55 such as EEPROM. The MPU 51 is connected through a bus 57 to the RAM 52 and ROM 55, controls them, and executes various software functions according to a control program 55P stored in the ROM 55. In the ROM 55, an electronic certificate file 553 storing an electronic certificate received from the certificate authority server 3; a secret key file 554 storing the secret key of the mobile phone 1 itself; a fingerprint information file 552 storing the fingerprint information of the customer in advance; and an environment information file 551 storing the device name and version of the mobile phone 1, the equipment name and version of peripheral equipment, and the name and version of installed software are prepared. Note that the secret key of the mobile phone 1 is issued by the certificate authority server 3, and the public key that forms a pair with this secret key is managed by the certificate authority server 3.

The MPU 51 of the security chip 5 collects the environment information about the mobile phone 1, and stores the environment information in the environment information file 551. The MPU 51 reads the pre-stored device name and version of the mobile phone 1 from the ROM 15 to acquire the own information of the mobile phone 1. For example, when the information processing apparatus is a mobile phone, the device name and version are acquired, whereas when the information processing apparatus is a microwave oven, the manufacturer's name, device name, model number, etc. are acquired. Moreover, the MPU 51 acquires the information about equipment connected to the external connector 19 with reference to the BIOS of the ROM 15, and stores the information as one of the environment information in the environment information file 551. For example, when a computer (not shown) is connected to the external connector 19, the equipment name and the like of the computer is acquired. On the other hand, when the information processing apparatus is a personal computer, when a PC card is connected to a PC card slot functioning as the external connector 19, the equipment name of the PC card is acquired.

Additionally, the information about software installed in the mobile phone 1 corresponds to the environment information. The MPU 51 acquires the name and version of the installed software with reference to the OS and software in the ROM 15. When the information processing apparatus is a personal computer, as the environment information about the installed software, for example, Windows® or Linux is acquired as the name of the OS, the "second edition" is acquired as the version of the OS, Internet Explorer® is acquired as the browser, and "SP2" is acquired as the version of the browser. In addition, the name of software written in Java® downloaded through the Internet N corresponds to the environment information. Thus, the MPU 51 always monitors the BIOS, OS, etc. in the ROM, and when new software is installed or when new equipment is connected to the external connector 19, the MPU 51 collects and stores the information about the software or the equipment as environment information in the environment information file 551.

The fingerprint information file 552 is used for personal authentication. For example, when a customer purchases a mobile phone 1, the customer's fingerprint information is acquired and initially registered in the fingerprint information file 552 in the ROM 55 at that shop. When the fingerprint information is read and outputted from the fingerprint acquisition unit 112, the MPU 51 compares the outputted fingerprint information with the fingerprint information stored in the fingerprint information file 552 so as to judge whether or not it is proper. Note that in Embodiment 1, the fingerprint information file 552 for use in authentication is stored in the mobile phone 1, but it is not necessarily be stored in the mobile phone 1, and may be stored in the center server 2 or the certificate authority server 3 and used for authentication in the center server 2 or the certificate authority server 3. In this case, the fingerprint information encrypted by the secret key stored in the secret key file 554 is transmitted together with an electronic certificate to the center server 2 or the certificate authority server 3 for authentication.

The electronic certificate file 533 stores an electronic certificate issued by the certificate authority server 3, and similarly the secret key file 554 stores the secret key for the mobile phone 1 issued by the certificate authority server 3. Note that the public key for the mobile phone 1 is stored in the certificate authority server 3. The MPU 51 encrypts the data relating to a transaction, environment information, fingerprint information, etc., which are to be transmitted and received together with a message digest with the secret key, and transmits the encrypted data and the electronic certificate to the center server 2, etc. through the Internet N.

Figure 3:
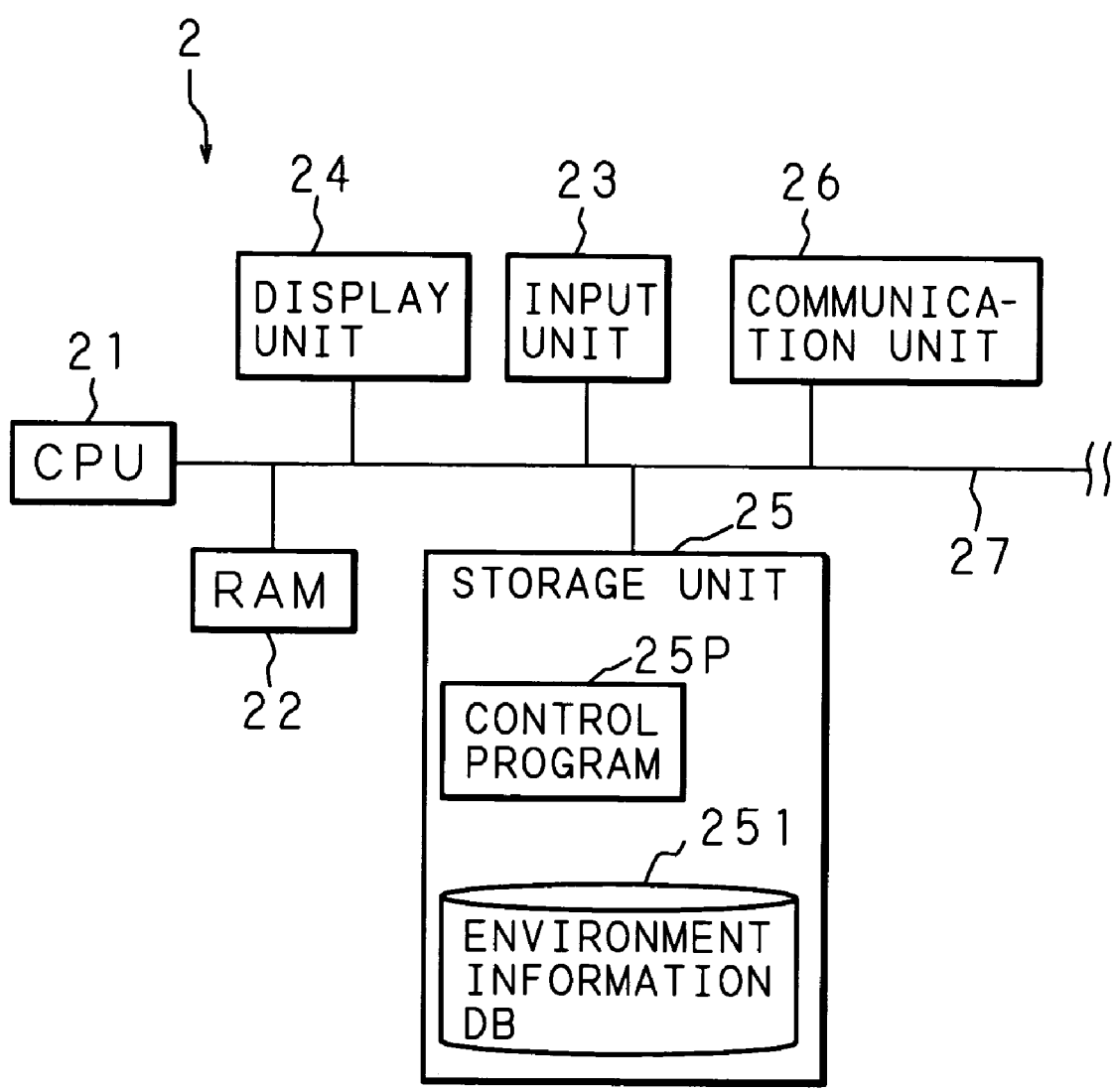
FIG. 3 is a block diagram showing the hardware structure of a center server.

FIG. 3 is a block diagram showing the hardware structure of the center server 2. As shown in FIG. 3, a RAM 22; a storage unit 25 such as a hard disk; a communication unit 26 such as a gateway and a LAN card for transmitting and receiving information to/from the mobile phone 1, certificate authority server 3, Web server 4, etc.; a display unit 24 such as a liquid crystal display; and an input unit 23 such as a keyboard and a mouse are connected to a CPU (Central Processing Unit) 21 through a bus 27. The CPU 21 is connected through the bus 27 to various hardware units of the center server 2 as described above, controls them, and executes various software functions according to a control program 25P stored in the storage unit 25. Moreover, in the storage unit 25, an environment information database (hereinafter referred to as the environment information DB) 251 storing environment conditions according to the classes of security of information to be transmitted and received is provided.

FIG. 4 is an explanatory view showing the record layout of the environment information DB 251. As shown in FIG. 4, conditions of environment information corresponding to the classes of security are registered according to a preset security policy. The class field is classified into class 1 to class 6 according to the degree of security of information to be transmitted and received, and class 1 represents the highest security level, while class 6 represents the lowest security level. As shown in the price information field and the product information field, when the transaction deals with a small sum such as ¥100, or when the subject product is a low-priced product such as a call signal with melodies (hereinafter referred to as "Chakumero"), it is necessary to place priority on smooth transaction rather than on security, and therefore such a product is classified into class 6. On the other hand, when the transaction deals with a high-priced product not less than ¥50,000, or when the subject product is a stock certificate or the like, it is necessary to ensure high security, and therefore such a product is classified into class 1.

In the device information field within the environment condition field, the device names and versions of customers' mobile phones 1 are registered according to their classes. In class 1, for example, the condition specifies the latest models S004, F004, and N004 of mobile phones 1, and when a mobile phone 1 does not satisfy this condition as the environment information, this mobile phone 1 is not judged proper by environment authentication. In particular, in the case of model S004, there is also a condition that the version of the mobile phone 1 must be 2.0 or higher version. On the other hand, in class 6, when the model number of a mobile phone 1 is any one of S001, S002, S003 and S004, including old model S001, and F001 through F004, and N001 through N004, this mobile phone 1 is similarly judged proper.

In the peripheral equipment field, similarly, the equipment name and version of peripheral equipment are registered for each class, and they are used for environment authentication. For example, in class 6, even when peripheral equipment XX, XY, etc. are connected, they are judged proper. On the other hand, in class 1, since no condition is stored for corresponding peripheral equipment, when the information about peripheral equipment is transmitted as the environment information from a mobile phone 1, it is not judged proper. In other word, in class 1, whatever peripheral equipment is connected, it is judged improper. Note that information provided by respective vendors is registered as such information.

Similarly, in the software field, the software names and versions are registered according to the classes. In class 1, when software is software C and its version is 3.0 or higher, this software is judged proper. Whereas in class 6, when software is software C and its version is 1.0 or higher, this software is judged proper. The reason for judging the safety by setting classes in such a manner is to take into account the balance between smooth transaction and security maintenance. For example, when the information processing apparatus is a personal computer, the installed browser differs depending on each customer. For instance, in the case of Internet Explorer® of Microsoft®, there is a plurality of versions, and the higher the version number, the less the security holes, i.e., the higher the security.

When high security is required, there may be an approach in which environment information is acquired, and, only when the acquired environment information belongs to a browser of the latest version with no security holes, this environment information is judged proper and subsequent transactions are permitted. In such case, however, since customers who do not install the latest version cannot perform transactions at all, this approach is inappropriate. Therefore, in the case of low-priced products for which high security is not required, the class of authentication is set low, and even a browser that is of quite old version is judged to be proper under certain conditions to allow transactions.

Figure 5:
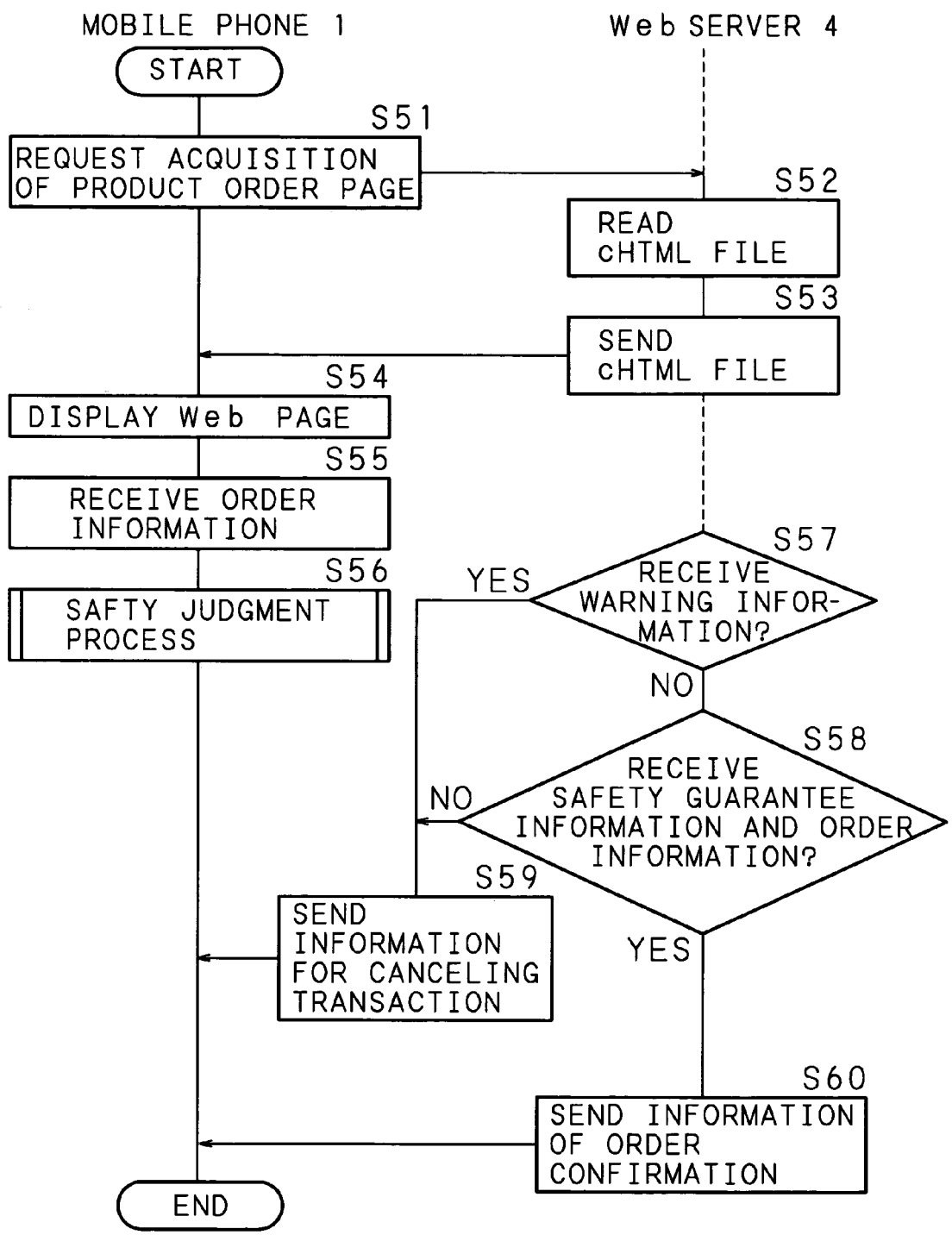
FIG. 5 is a flowchart showing the procedure of transaction between a Web server and a mobile phone.
Figure 7:
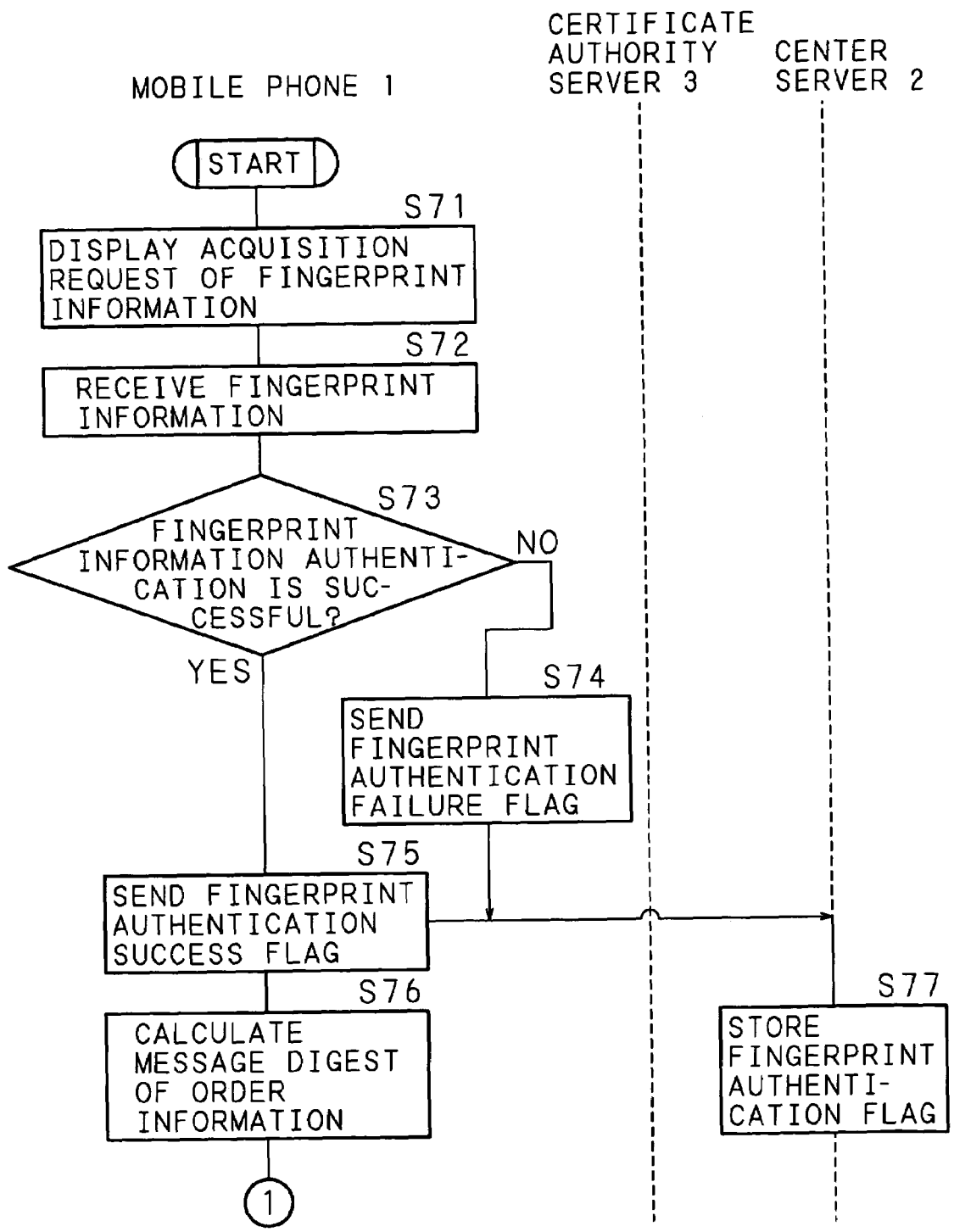
FIG. 7 is a flowchart showing the procedure of a safety judgment process.
Figure 8:
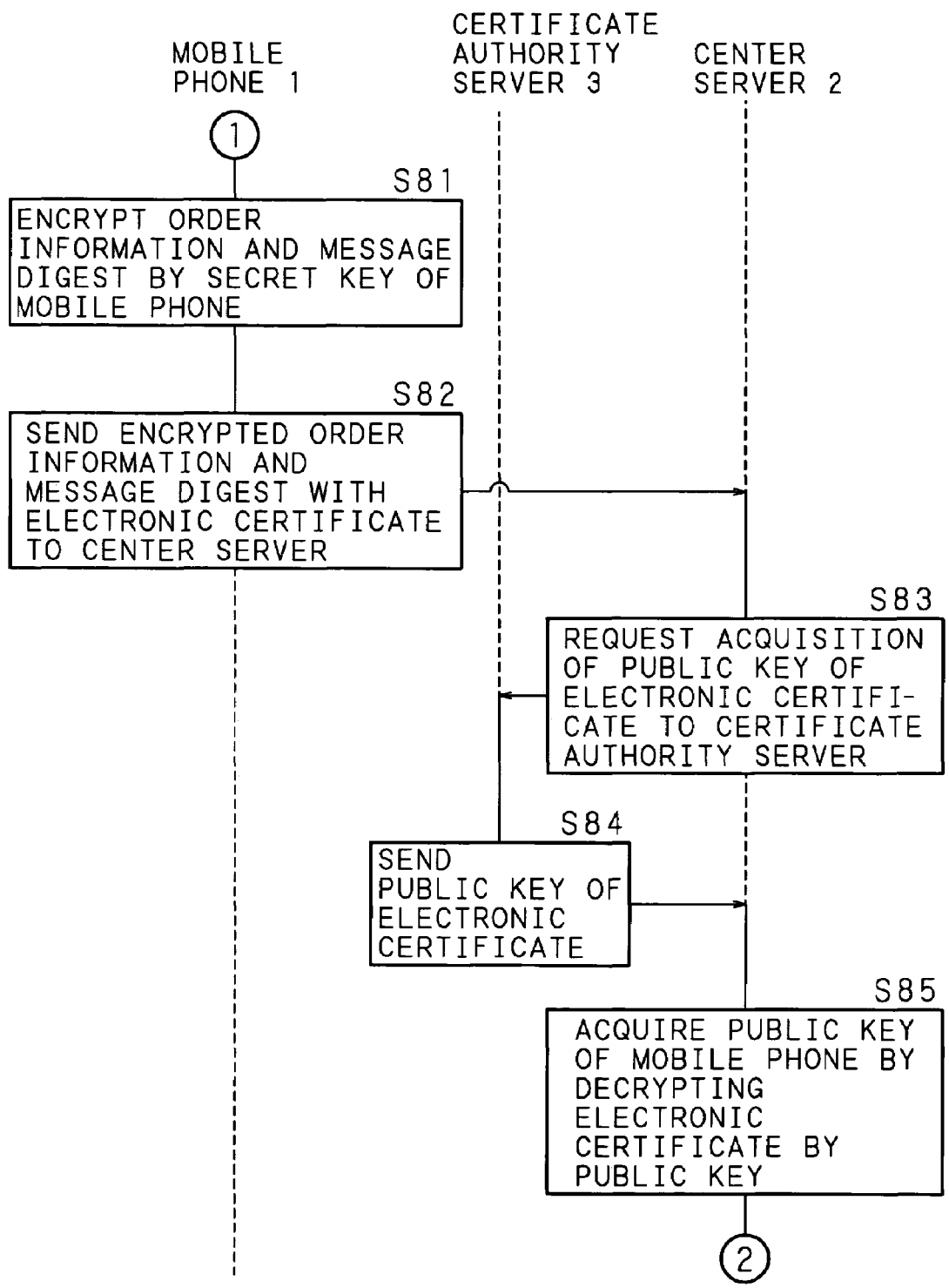
FIG. 8 is a flowchart showing the procedure of the safety judgment process.
Figure 9:
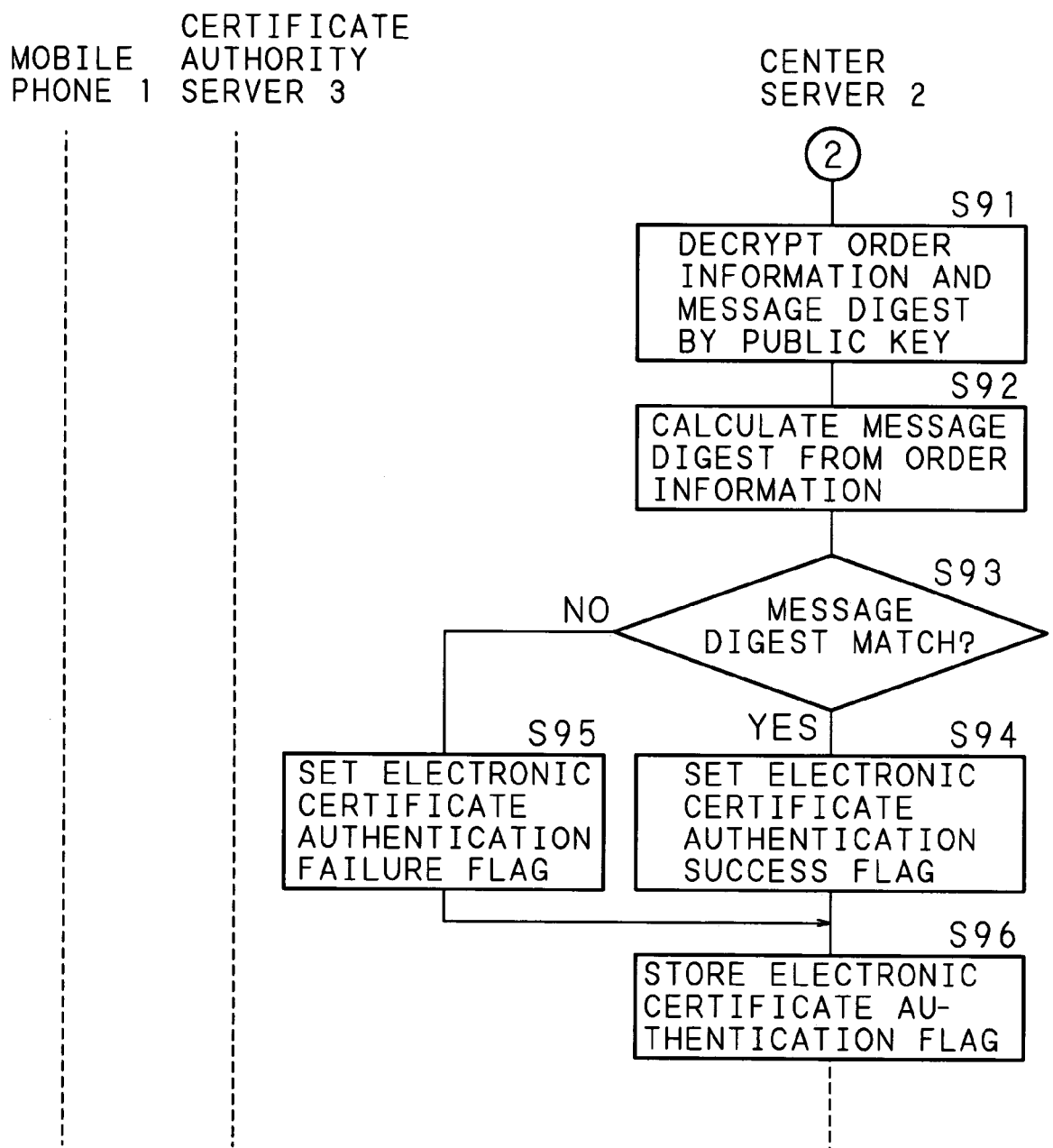
FIG. 9 is a flowchart showing the procedure of the safety judgment process.
Figure 10:
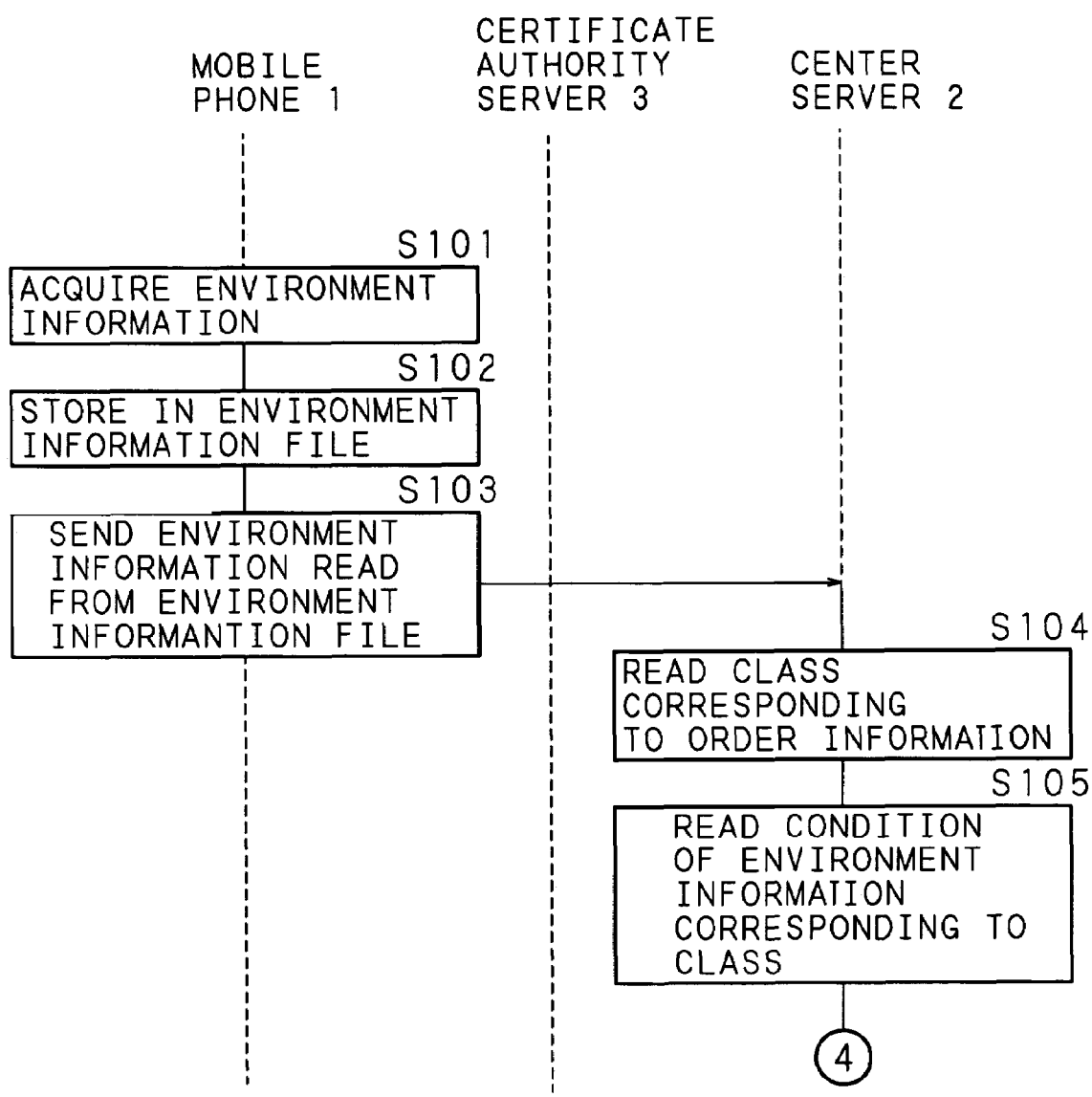
FIG. 10 is a flowchart showing the procedure of the safety judgment process.

With reference to a flowchart, the following description will explain the procedure of the safety judgment process of the present invention executed on the above-described hardware structure. FIG. 5 is a flowchart showing the procedure of transaction between a Web server 4 and a mobile phone 1. First, the customer inputs the URL (Uniform Resource Locater) of the Web server 4 of the on-line shop, which is the counter party of the transaction, through the input unit 13 of the mobile phone 1 and requests the Web server 4 for the product order page (step S51). The Web server 4 as a HTTP (Hypertext Transfer Protocol) server reads a corresponding cHTML (compact Hypertext Markup Language) file from a storage unit (not shown) (step S52), and transmits the read cHTML file to the mobile phone 1 (step S53).

The CPU 11 of the mobile phone 1 analyzes the received cHTML file with the browser software stored in the ROM 15, and displays the Web page for transaction on the display unit 14 as shown in FIG. 6 (step S54). FIG. 6 is an explanatory view showing the displayed state of the Web page. As shown in FIG. 6, the information about products, number, and prices is displayed on the display unit 14. The customer selects a product and number to be ordered on the screen of the display unit 14 by operating the input unit 13. When the product is selected, the CPU 11 executes the Java script that was transmitted together with the cHTML file, and calculates and displays the total price. The on-line shop in Embodiment 1 sells computer-related equipment such as personal computers, printers, and disk drives, and FIG. 6 shows the input results when the customer ordered one inkjet printer priced at ¥29,800. In short, the customer inputs the price information or the product information as the order information concerning the transaction. In addition, the customer may input the address, phone number, name, ID, password, etc.

When the order information is inputted from the input unit 13 in such a manner, the CPU 11 receives this order information (step S55). Then, when the "BUY" button shown in FIG. 6 is selected, the CPU 11 jumps to the safety judgment process (step S56). Referring to the flowchart, the following description will explain the subroutine of the safety judgment process of step S56 which is the characteristic of the present invention. Note that the processes after step S57 will be described later.

FIG. 7 through FIG. 12 show a flowchart of the procedure of the subroutine of the safety judgment process (step S56). When the order information is inputted, the MPU 51 of the security chip 5 executes the control program 55P, and displays a fingerprint information acquisition request on the display unit 14 (step S71). The contents displayed at this time are pre-stored in the ROM 55, and, for example, information such as "Place your thumb on the fingerprint acquisition unit" may be read and outputted to the display unit 14. When the fingerprint information is inputted from the fingerprint acquisition unit 112, the MPU 51 of the security chip 5 receives the fingerprint information (step S72), and stores it temporarily in the RAM 52. Then, the MPU 51 reads fingerprint information that was registered in advance in the fingerprint information file 552 in the ROM 55 when the customer purchased the mobile phone 1, and compares these pieces of fingerprint information and judges whether the registered information matches the fingerprint information received and stored in the RAM 52 in step S72, i.e., whether the fingerprint information authentication is successful or not (step S73).

When these pieces of fingerprint information match and the fingerprint information authentication is judged successful (YES in step S73), the MPU 51 sets the fingerprint authentication success flag, and transmits the set fingerprint authentication success flag to the center server 2 (step S75). On the other hand, when these pieces of fingerprint information do not match and the fingerprint information authentication is judged unsuccessful (NO in step S73), the MPU 51 sets the fingerprint authentication failure flag, and transmits the set fingerprint authentication failure flag to the center server 2 (step S74). The CPU 21 of the center server 2 stores the transmitted fingerprint authentication flag (the fingerprint authentication success flag, or the fingerprint authentication failure flag) in the storage unit 25 (step S77). Consequently, the biological authentication using fingerprint information is completed.

Note that although Embodiment 1 employs a structure in which biological authentication using fingerprint information is executed in the mobile phone 1, it may be possible to register the fingerprint information collected beforehand in the certificate authority server 3 or the center server 2, and transmit fingerprint information that is received and stored in the RAM 52 in step S72 from the mobile phone 1, for judgment in the certificate authority server 3 or in the center server 2.

Subsequently, the procedure jumps to authentication using an electronic certificate. The MPU 51 of the security chip 5 calculates a message digest by using the hush function stored in the ROM 55, for the order information received in step S55 (step S76). The MPU 51 reads from the secret key file 554 the secret key of the mobile phone 1 issued in advance by the certificate authority server 3, and encrypts the order information and the message digest (step S81). Further, the MPU 51 reads the electronic certificate issued in advance by the certificate authority server 3 from the electronic certificate file 553, attaches the electronic certificate to the encrypted order information and the message digest, and transmits them to the center server 2 (step S82). The CPU 21 of the center server 2 stores the transmitted electronic certificate and encrypted order information and message digest in the RAM 22.

The CPU 21 of the center server 2 accesses the certificate authority server 3 described in the electronic certificate, and makes a request for acquiring the public key of the received electronic certificate (the public key of the certificate authority) (step S83). The certificate authority server 3 transmits the public key of the electronic certificate to the center server 2 in response to this request (step S84). The CPU 21 of the center server 2 reads the stored electronic certificate from the RAM 22, decrypts the electronic certificate by using the public key of the certificate authority transmitted from the certificate authority server 3, and acquires the public key of the mobile phone 1 (step S85).

The CPU 21 of the center server 2 decrypts the encrypted order information and message digest by using the public key of the mobile phone 1 acquired from the certificate authority server 3 (step S91). Further, the CPU 21 calculates a message digest by using the hush function stored in the storage unit 25 of the center server 2, for the decrypted order information (step S92). The CPU 21 of the center server 2 judges whether or not the message digest decrypted in step S91 matches the message digest calculated in step S92, i.e., whether the order information was not falsified during the transmission, and also judges whether or not the information was transmitted and received to/from the mobile phone 1 of an authorized customer (step S93).

When these message digests do not match (NO in step S93), the CPU 21 judges that some falsification or "spoofing" was made, and sets the failure flag for the electronic certificate authentication (step S95). On the other hand, when these message digests match (YES in step S93), the CPU 21 judges that "spoofing" or falsification was not made, and sets the success flag for the electronic certificate authentication (step S94). Then, the CPU 21 of the center server 2 stores the flag for the electronic certificate authentication (the electronic certificate authentication success flag, or the electronic certificate authentication failure flag) in the storage unit 25 (step S96). Consequently, the authentication using the electronic certificate is completed.

Next, environment authentication will be explained. The MPU 51 of the security chip 5 acquires the environment information about the mobile phone 1 (step S101). The MPU 51 collects the environment information by always monitoring the OS, BIOS and software installed in the ROM 15 of the mobile phone 1 and collecting the device name of the mobile phone 1, the name and version of the OS, the equipment name and version of the peripheral equipment connected to the external connector 19, the name and version of the installed software such as a browser as described above. The collected environment information is stored in the environment information file 551 (step S102).

The MPU 51 reads the collected environment information from the environment information file 551, and transmits it to the center server 2 (step S103). The CPU 21 of the center server 2 stores the transmitted environment information in the RAM 22. The CPU 21 of the center server 2 reads a class corresponding to the order information decrypted in step S91, with reference to the environment information DB 251 (step S104). Specifically, with reference to the price information or product information field, the CPU 21 reads the corresponding class from the class field, based on the price or product in the order information to be traded in the transaction. For example, when the price of an ordered product is more than ¥50,000, class 1 is selected.

The CPU 21 of the center server 2 reads the condition of environment information corresponding to the read class from the environment information DB 251 (step S105). Specifically, based on the read class, the device name and version of the corresponding mobile phone 1, the name and version of the corresponding software, the equipment name and version of the corresponding peripheral equipment are read from the environment condition field of the environment information DB 251. Then, the CPU 21 judges whether or not the received environment information stored in the RAM 22 satisfies the condition of environment information read from the environment information DB 251 (step S111). When the condition is not satisfied (NO in step S111) (for example, when the class is 1 and version 2.0 of software C is transmitted as the environment information, this software does not satisfy the condition that version must be 3.0 or higher), then the CPU 21 sets the environment authentication failure flag (step S112). On the other hand, when the condition is satisfied (YES in step S111), the CPU 21 sets the environment authentication success flag (step S113). For instance, when class 1 is set as a condition, when the environment information shows "latest model F004 and version 2.0 for the device name and version of mobile phone 1, software C and version 5.0 for the installed software, and no equipment for the connected peripheral equipment", then the CPU 21 judges that the environment is proper. The CPU 21 of the center server 2 stores the flag for the environment authentication (the environment authentication success flag, or the environment authentication failure flag) in the storage unit 25 (step S114). Consequently, the environment authentication is completed.

The CPU 21 reads the fingerprint authentication flag, electronic certificate flag, and environment authentication flag stored in the storage unit 25, and judges whether or not all of the fingerprint authentication success flag, electronic certificate authentication success flag and environment authentication success flag are set in the AND condition (step S115). When all the success flags are set (YES in step S115), the CPU 21 judges that the mobile phone 1 is safe, and sets the safe flag (step S121). In other words, the mobile phone 1 is judged to be proper only when it is judged proper in all of biological authentication, electronic certificate authentication (PKI authentication), and environment authentication. In this case, the CPU 21 of the center server 2 transmits safety guarantee information indicating that the mobile phone 1 is safe, and the order information to the Web server 4 (step S122), and terminates the subroutine of safety judgment (step S56).

On the other hand, when the failure flag is set in at least one of the biological authentication, electronic certificate authentication (PKI authentication) and environment authentication, then the CPU 21 sets the failure flag (step S123). In this case, the CPU 21 transmits warning information indicating that the mobile phone 1 is dangerous to the Web server 4 (step S124), and terminates the subroutine of safety judgment (step S56).

In FIG. 5, the Web server 4 judges whether or not warning information about the mobile phone 1 has been received from the center server 2 (step S57). When the warning information has not been received (NO in step S57), the Web server 4 judges whether or not the safety guarantee information and the order information have been received (step S58). When the safety guarantee information and the order information have not been received (NO in step S58), or when YES in step S57, the Web server 4 judges that there is a high possibility that the mobile phone 1 is fraudulent, and then transmits information for canceling the transaction to the mobile phone 1 (step S59). On the other hand, when the safety guarantee information and the order information have been received (YES in step S58), it is regarded that the safety of the mobile phone 1 is warranted, and then the Web server 4 formally receives the order and transmits order confirmation information indicating that the order was received to the mobile phone 1 (step S60). Thus, in Embodiment 1, sufficient security is ensured by performing personal authentication, PKI authentication and environment authentication prior to transactions, and smooth transactions can be realized by changing the authentication level according to the value of product to be traded.

Embodiment 2

Figure 13:
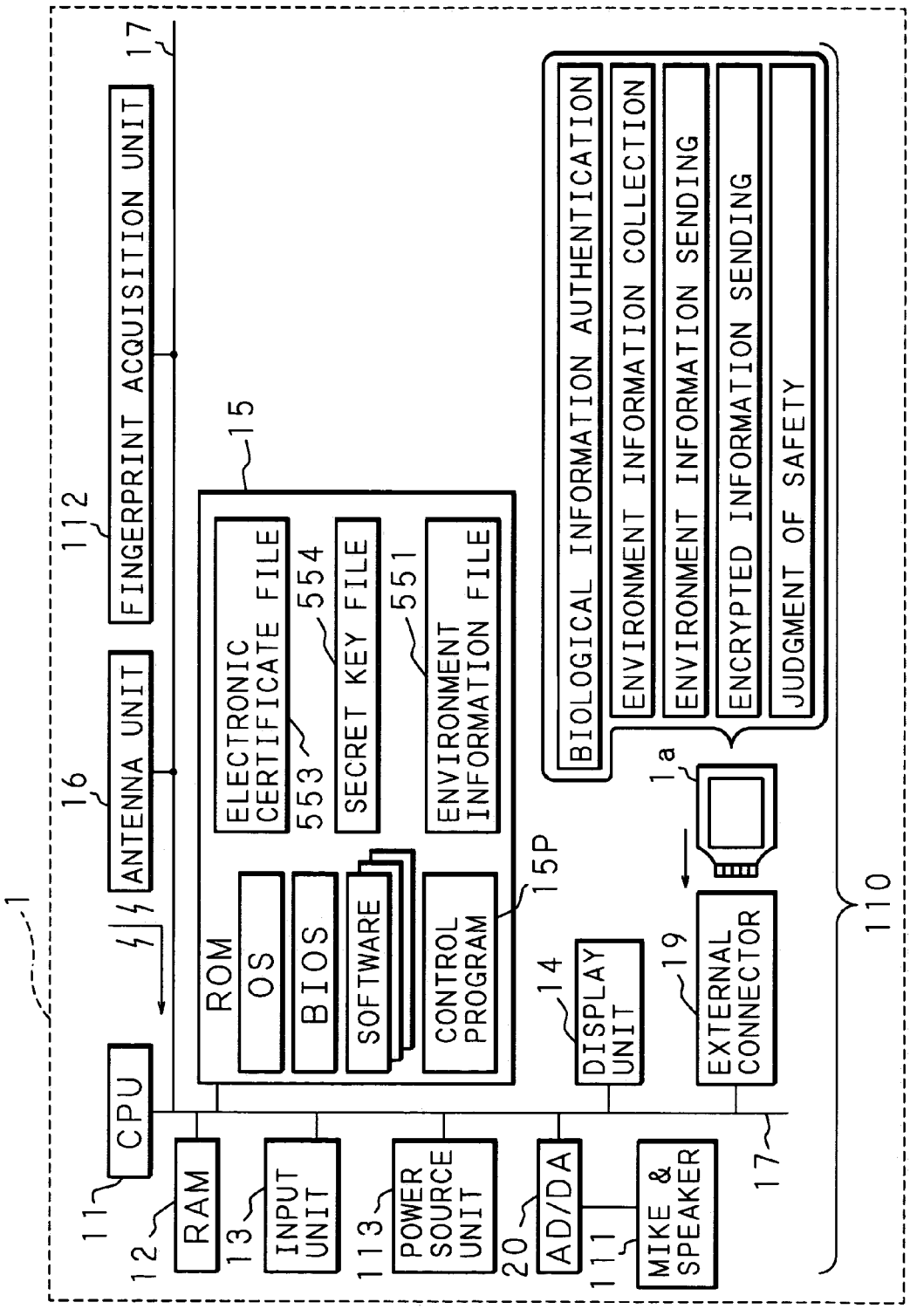
FIG. 13 is a block diagram showing the hardware structure of a mobile phone according to Embodiment 2.

FIG. 13 is a block diagram showing the hardware structure of the mobile phone 1 according to Embodiment 2 of the present invention. The computer program for executing the processing of the mobile phone 1 of Embodiment 1 can be provided by pre-installing it in the mobile phone 1 as in Embodiment 2, or provided using a removable recording medium such as a CD-ROM, MO, or memory card. Further, it is also possible to provide the computer program by transmitting it as a carrier wave via a line. Specifically, in Embodiment 2, instead of mounting the security chip 5, the computer program having the same function as the security chip 5 is installed in the ROM 15 of the mobile phone 1. The contents of the program will be explained below.

Programs for authenticating biological information, collecting environment information, transmitting environment information, transmitting encrypted information and judging safety are installed in the ROM 15 of the mobile phone 1 shown in FIG. 13 from a recording medium 1a (such as a CD-ROM, MO, memory card, or DVD-ROM) on which the programs are recorded. As the installation method, the recording medium 1a such as a memory card connectable to the external connector 19 is connected to the external connector 19, and the programs are installed. However, it may be possible to download the programs of the present invention from the center server 2. These programs are executed after being loaded temporarily in the RAM 12 of the mobile phone 1. Consequently, the mobile phone 1 functions as the information processing apparatus of Embodiment 1 of the present invention as described above.

Embodiment 3

In Embodiment 1 described above, although the authentication of biological information is performed in the security chip 5, it may be executed in the center server 2 or the certificate authority server 3. Embodiment 3 employs a structure in which the authentication of biological information is performed in the center server 2, and illustrates an example in which the present invention is applied to a case where a security policy is predetermined.

Figure 14:
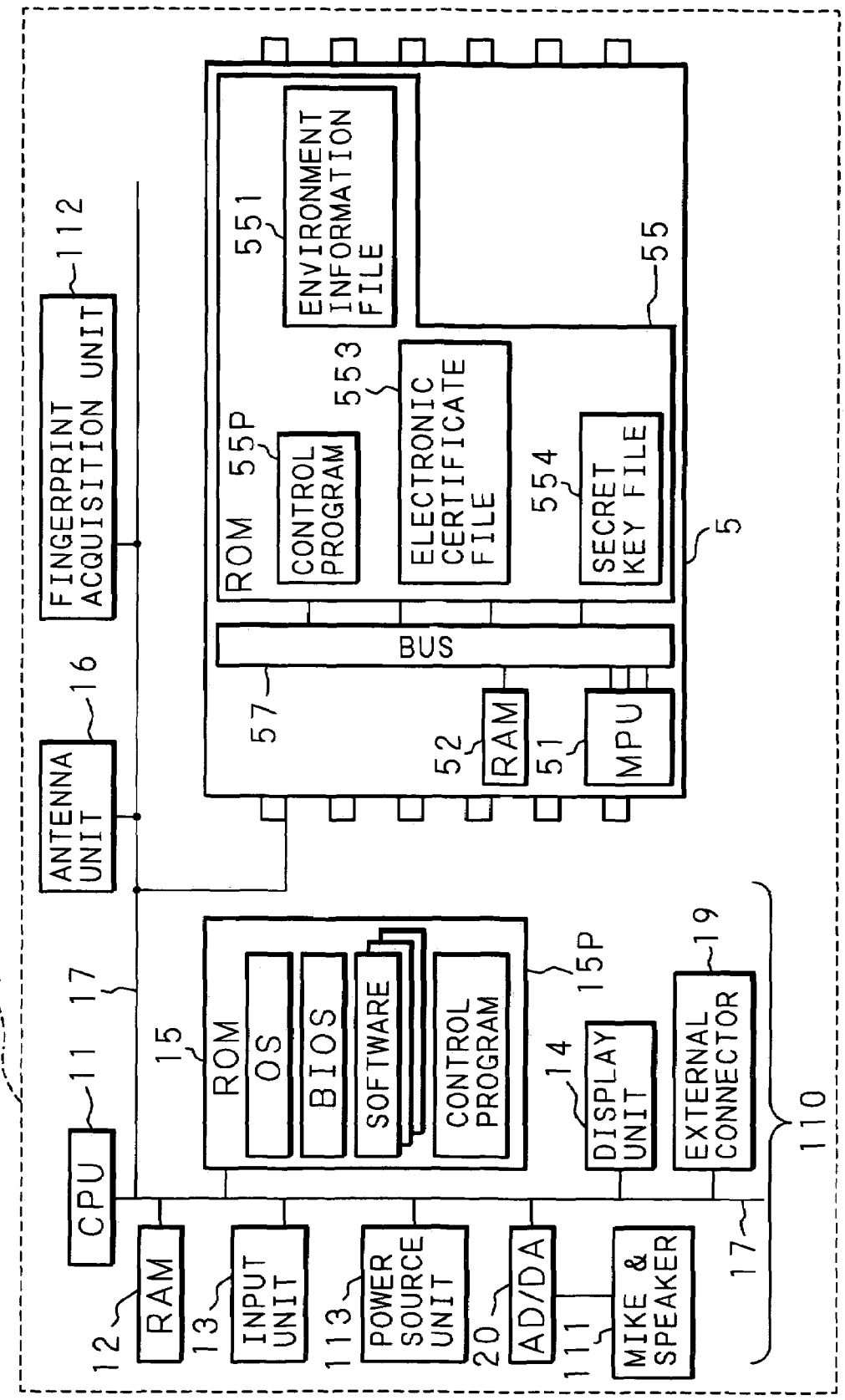
FIG. 14 is a block diagram showing the hardware structure of a mobile phone according to Embodiment 3.
Figure 15:
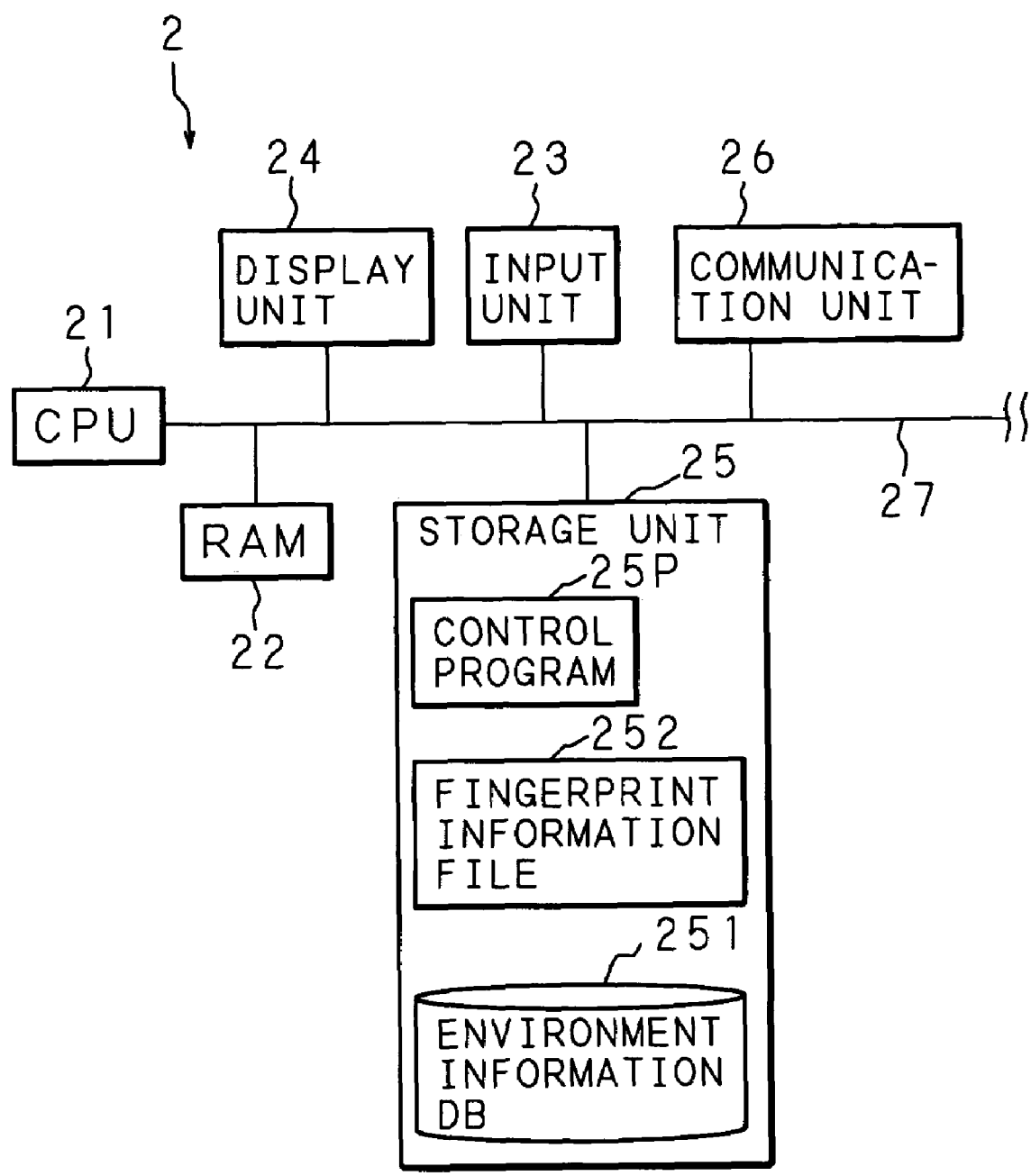
FIG. 15 is a block diagram showing the hardware structure of a center server according to Embodiment 3.
Figure 16:
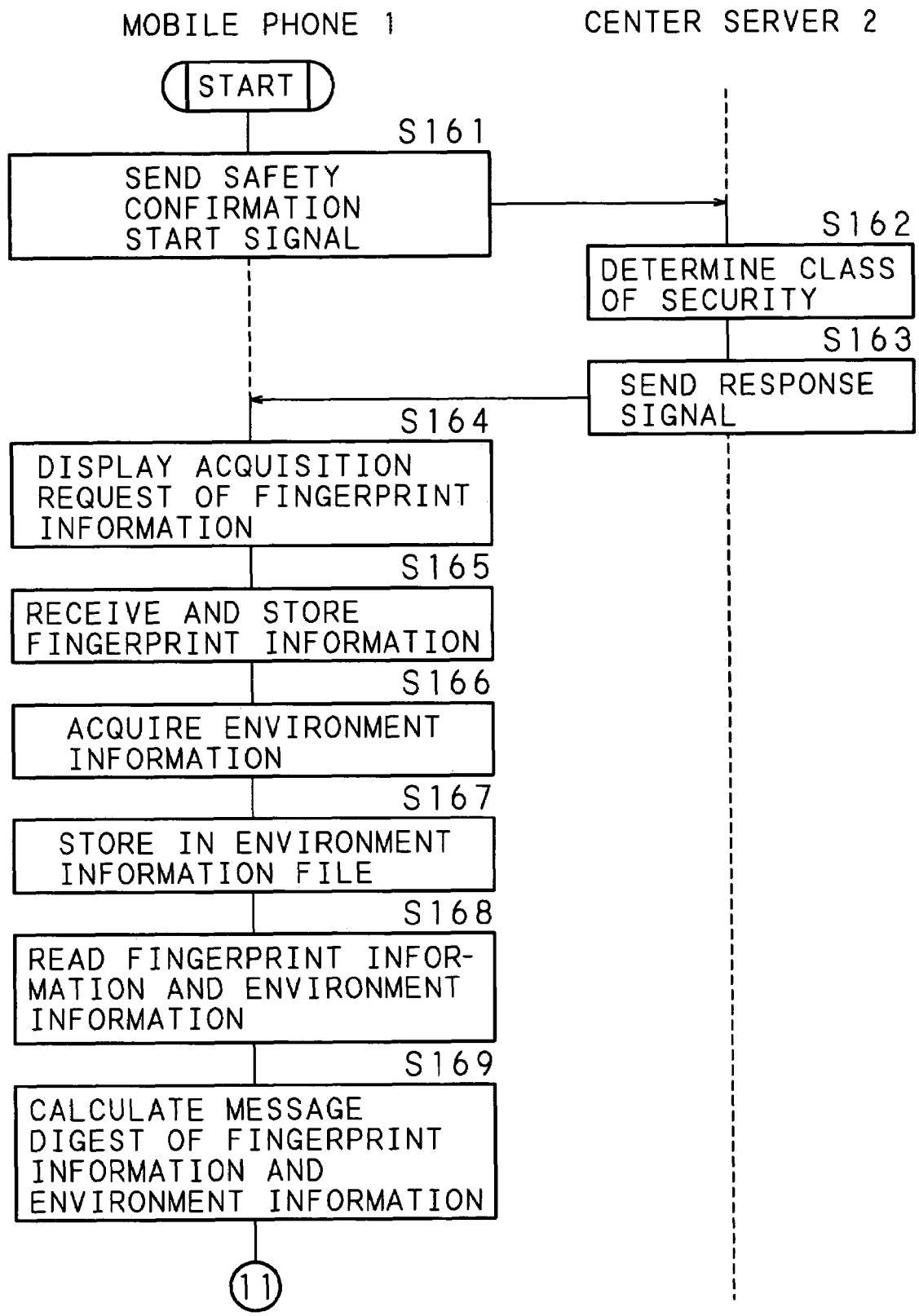
FIG. 16 is a flowchart showing the procedure of a safety judgment process according to Embodiment 3.
Figure 17:
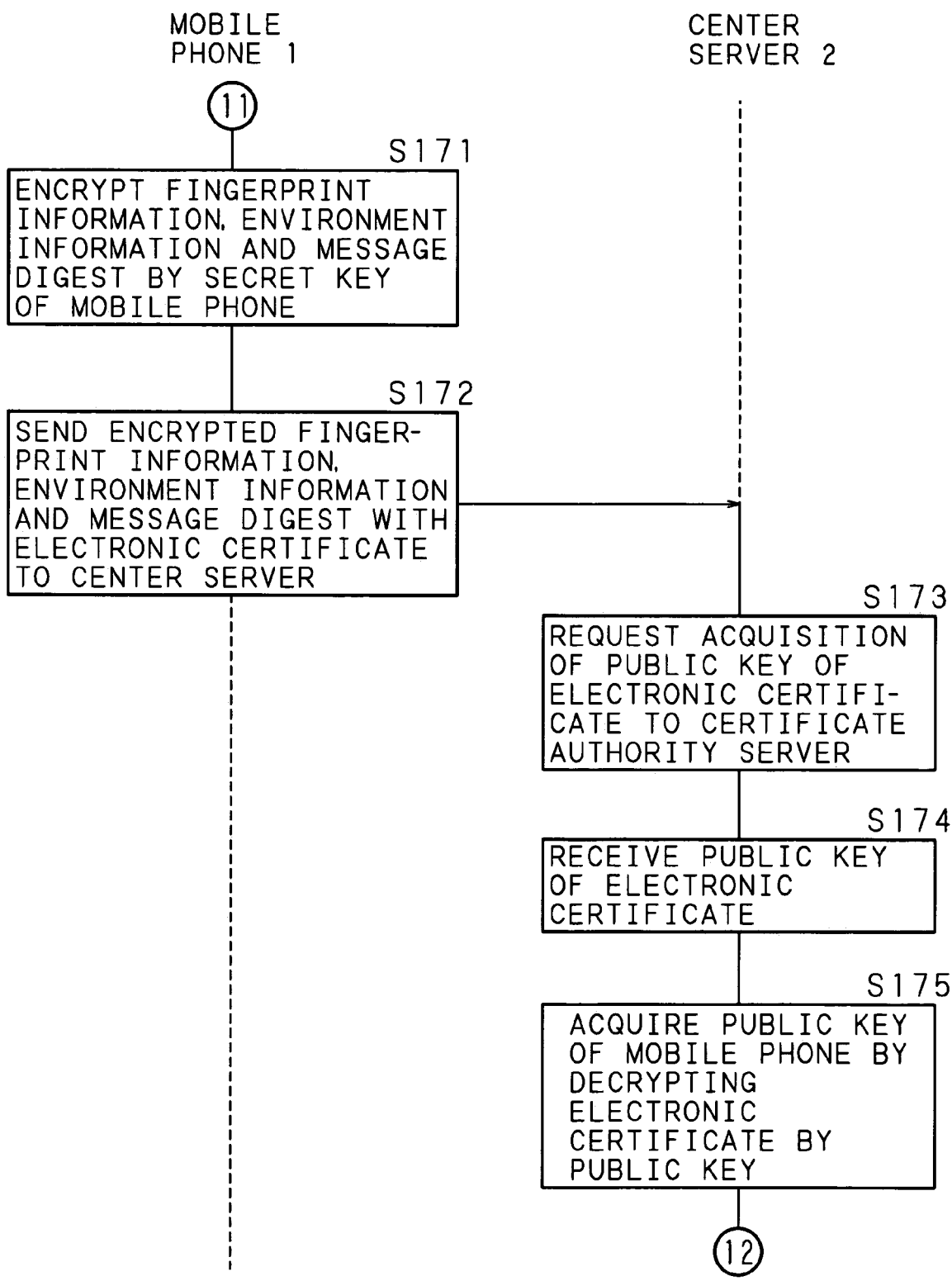
FIG. 17 is a flowchart showing the procedure of the safety judgment process according to Embodiment 3.
Figure 18:
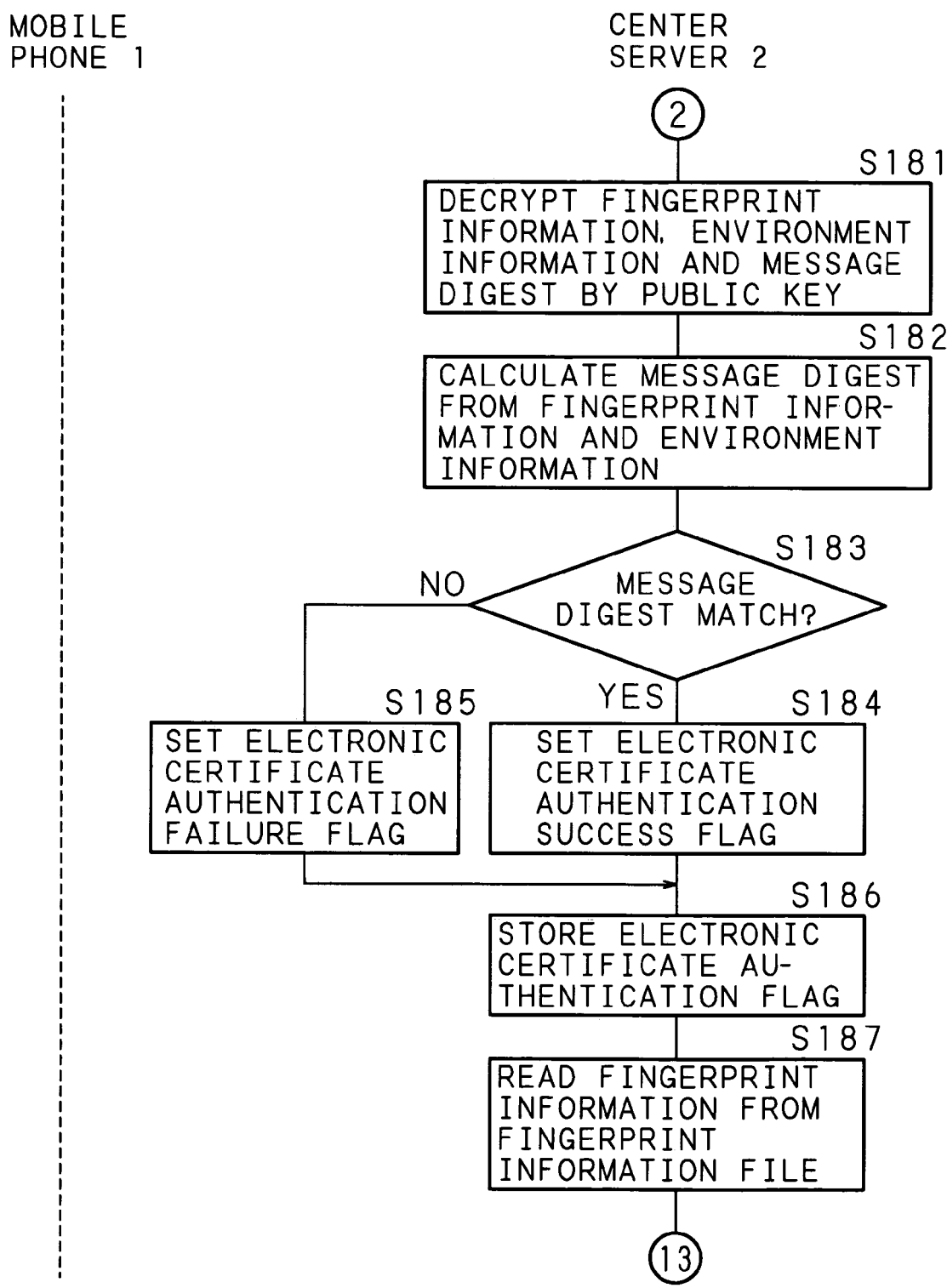
FIG. 18 is a flowchart showing the procedure of the safety judgment process according to Embodiment 3.
Figure 19:
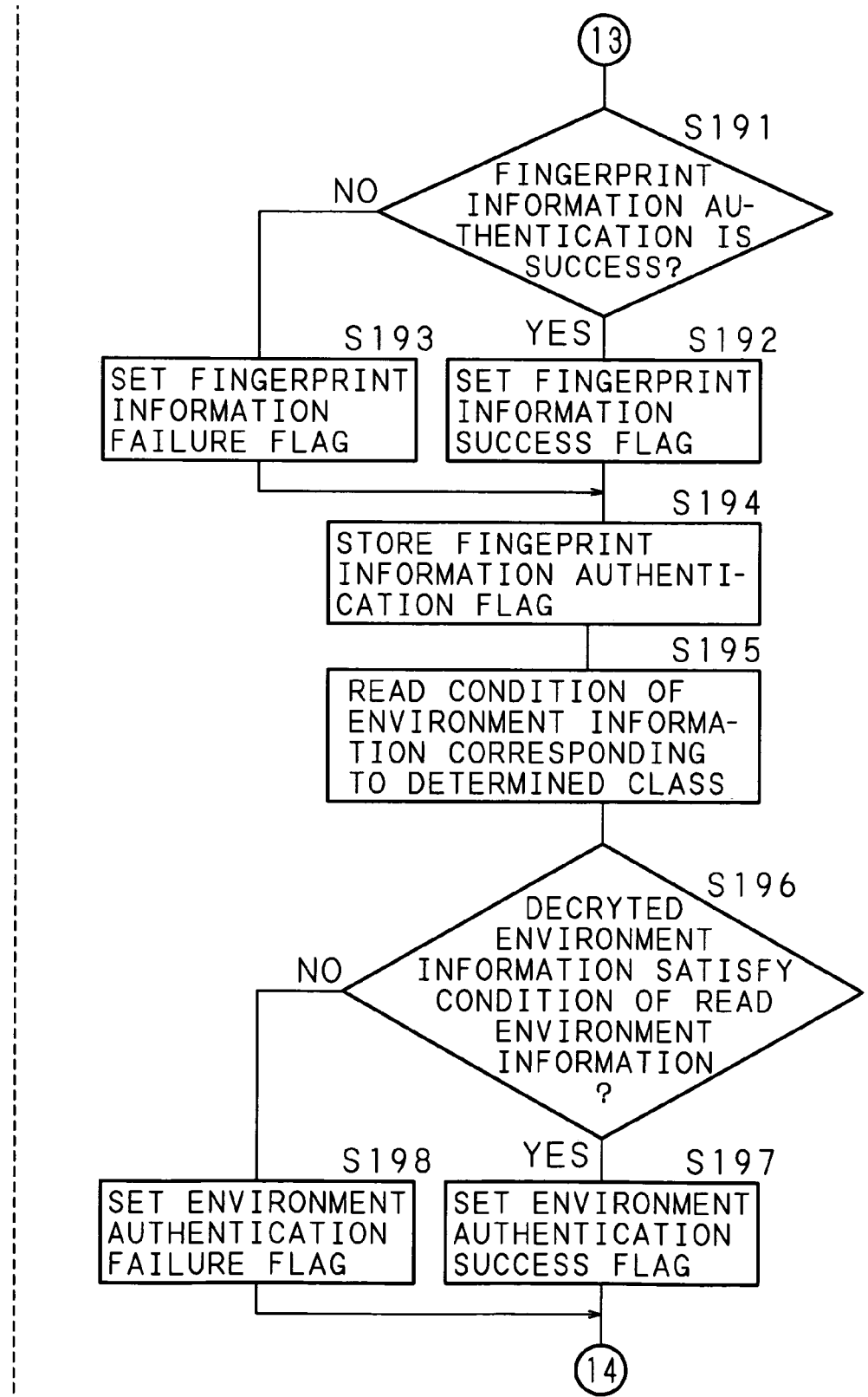
FIG. 19 is a flowchart showing the procedure of the safety judgment process according to Embodiment 3.
Figure 20:
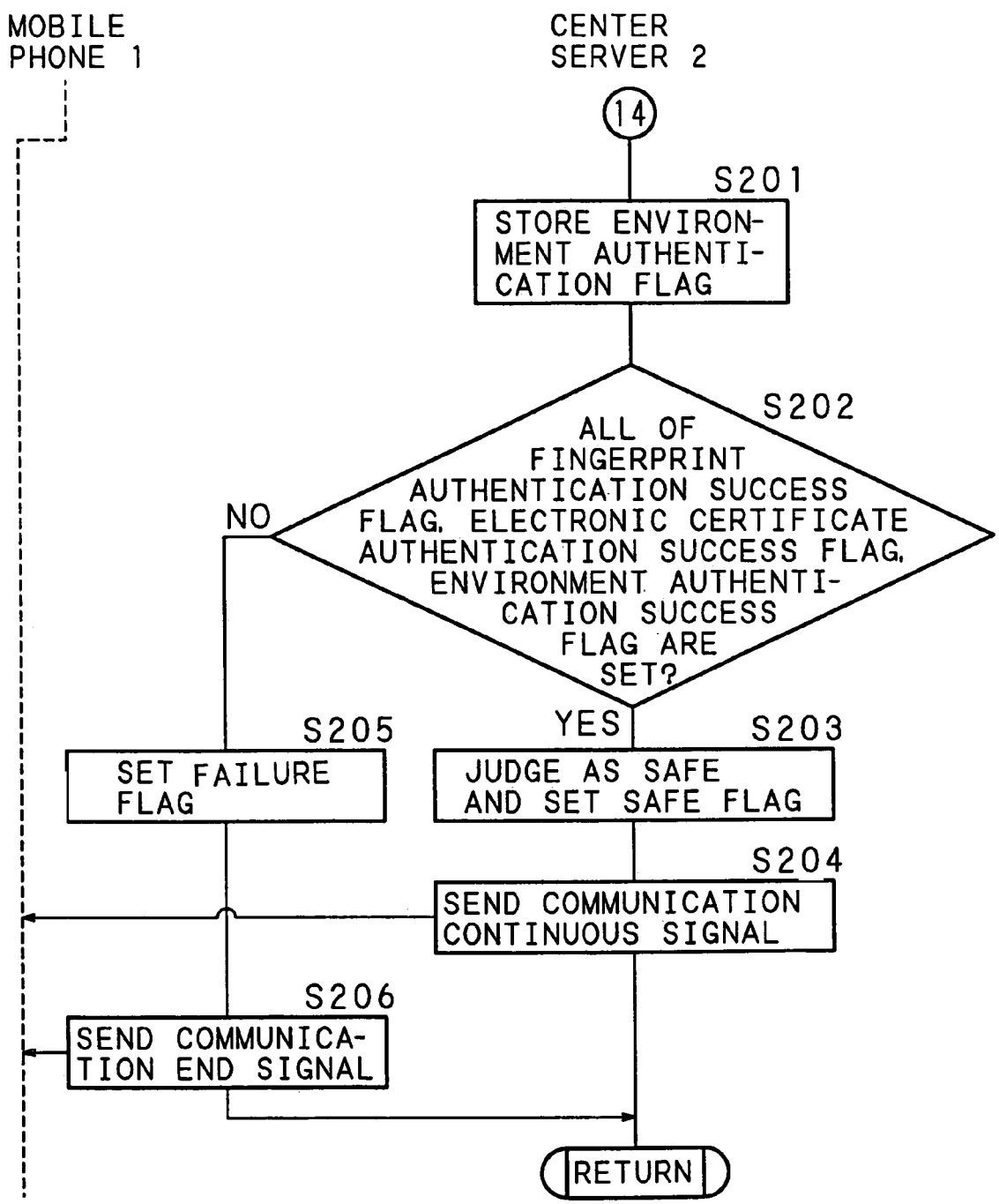
FIG. 20 is a flowchart showing the procedure of the safety judgment process according to Embodiment 3.

FIG. 14 is a block diagram showing the hardware structure of the mobile phone 1 according to Embodiment 3 of the present invention. FIG. 15 is a block diagram showing the hardware structure of the center server 2 according to Embodiment 3. Since Embodiment 3 employs the structure in which authentication of biological information is executed in the center server 2 as shown in FIG. 14 and FIG. 15, the fingerprint information file 252 for authentication is stored in the storage unit 25 of the center server 2, instead of the inside of the mobile phone 1. Other structures are the same as those in Embodiment 1 shown in FIG. 2 and FIG. 3. Note that the initial registration of fingerprint information for authentication may be carried out by asking the customer to visit a shop or a service center before authentication, confirming the personal identification based on a driving license, passport, etc., and reading his/her fingerprint on the spot.

FIG. 16 through FIG. 20 show a flowchart of the procedure of a safety judgment process (the subroutine of step S56 in FIG. 5) according to Embodiment 3. First, in order to perform a subsequent communication, the MPU 51 of the security chip 5 transmits a safety confirmation start signal to the center server 2 (step S161). When the CPU 21 of the center server 2 receives the confirmation start signal, it determines the class of security of communication (step S162). When determining the class, the class is determined under a predetermined security policy. For example, when the subsequent communication is a communication requiring high security, such as issuance of a resident card or transaction of stocks, the class is determined to be class 1, whereas when the subsequent communication is a communication which does not require high security, such as Chakumero or the image data of standby display, the class is determined to be class 6. Besides, for the payment of public utility charges, in order to ensure middle-level security, the class is determined to be class 3.

After determining the class, the CPU 21 of the center server 2 transmits a response signal corresponding to the confirmation start signal to the mobile phone 1 (step S163). When the response signal is received, the MPU 51 of the security chip 5 executes the control program 55P, and displays a fingerprint information acquisition request on the display unit 14 (step S164). The contents displayed at this time are pre-stored in the ROM 55, and, for example, information such as "Place your thumb on the fingerprint acquisition unit" may be read and outputted to the display unit 14. When the fingerprint information is inputted from the fingerprint acquisition unit 112, the MPU 51 of the security chip 5 receives the fingerprint information and stores it temporarily in the RAM 52 (step S165).

Next, the MPU 51 of the security chip 5 acquires the environment information about the mobile phone 1 (step S166). The MPU 51 collects the environment information by always monitoring the OS, BIOS and software installed in the ROM 15 of the mobile phone 1 and collecting the device name of the mobile phone 1, the name and version of the OS, the equipment name and version of the peripheral equipment connected to the external connector 19, the name and version of the installed software such as a browser as described above. The collected environment information is stored in the environment information file 551 (step S167).

The MPU 51 of the security chip 5 reads the biological information stored in the RAM 52 and the environment information stored in the environment information file 551 (step S168). The MPU 51 of the security chip 5 calculates a message digest by using the hush function stored in the ROM 55, for the read biological information and environment information (step S169). The MPU 51 reads the secret key of the mobile phone 1 issued in advance by the certificate authority server 3 from the secret key file 554, and encrypts the biological information, environment information and message digest (step S171). Further, the MPU 51 reads the electronic certificate issued in advance by the certificate authority server 3 from the electronic certificate file 553, attaches the electronic certificate to the encrypted biological information, environment information and message digest, and transmits them to the center server 2 (step S172). The CPU 21 of the center server 2 stores the transmitted electronic certificate and encrypted biological information, environment information and message digest in the RAM 22. Note that in Embodiment 3, although both of the biological information and the environment information are encrypted and transmitted, it may be possible to encrypt either the biological information or the environment information.

The CPU 21 of the center server 2 accesses the certificate authority server 3 described in the electronic certificate, and makes a request for acquiring the public key of the received electronic certificate (the public key of the certificate authority) (step S173). The certificate authority server 3 transmits the public key of the electronic certificate to the center server 2 in response to this request, and the center server 2 receives the transmitted public key of the electronic certificate (step S174). The CPU 21 of the center server 2 reads the stored electronic certificate from the RAM 22, decrypts the electronic certificate by using the public key of the certificate authority transmitted from the certificate authority server 3, and acquires the public key of the mobile phone 1 (step S175).

The CPU 21 of the center server 2 decrypts the encrypted biological information, environment information and message digest by using the public key of the mobile phone 1 acquired from the certificate authority server 3 (step S181). Further, the CPU 21 calculates a message digest by using the hush function stored in the storage unit 25 of the center server 2, for the decrypted biological information and environment information (step S182). The CPU 21 of the center server 2 judges whether or not the message digest decrypted in step S181 matches the message digest calculated in step S182, i.e., whether the biological information and the environment information were not falsified during the transmission, and also judges whether or not the information was transmitted and received to/from the mobile phone 1 of an authorized customer (step S183).

When these message digests do not match (NO in step S183), the CPU 21 judges that some falsification or "spoofing" was made, and sets the failure flag for the electronic certificate authentication (step S185). On the other hand, when these message digests match (YES in step S183), the CPU 21 judges that "spoofing" or falsification was not made, and sets the success flag for the electronic certificate authentication (step S184). Then, the CPU 21 of the center server 2 stores the flag for the electronic certificate authentication (the electronic certificate authentication success flag, or the electronic certificate authentication failure flag) in the storage unit 25 (step S186).

Subsequently, the CPU 21 of the center server 2 reads the pre-registered fingerprint information for authentication from the fingerprint information file 252 (step S187). The CPU 21 compares the decrypted fingerprint information with the read fingerprint information for authentication, and judges whether these pieces of fingerprint information match or not, i.e., whether the fingerprint information authentication is successful or not (step S191).

When these pieces of fingerprint information match and the fingerprint information authentication is judged successful (YES in step S191), the CPU 21 sets the fingerprint authentication success flag (step S192). On the other hand, when these pieces of fingerprint information do not match and the fingerprint information authentication is judged unsuccessful (NO in step S191), the CPU 21 sets the fingerprint authentication failure flag (step S193). The CPU 21 of the center server 2 stores the fingerprint authentication flag (the fingerprint authentication success flag, or the fingerprint authentication failure flag) in the storage unit 25 (step S194).

The CPU 21 of the center server 2 reads the condition of environment information corresponding to the class determined in step S162 from the environment information DB 251 (step S195). Then, the CPU 21 judges whether or not the decrypted environment information satisfies the condition of environment information read from the environment information DB 251 in step S195 (step S196). When the condition is not satisfied (NO in step S196), the CPU 21 sets the environment authentication failure flag (step S198). On the other hand, when the condition is satisfied (YES in step S196), the CPU 21 sets the environment authentication success flag (step S197). The CPU 21 of the center server 2 stores the flag for environment authentication (the environment authentication success flag, or the environment authentication failure flag) in the storage unit 25 (step S201).

The CPU 21 reads the fingerprint authentication flag, electronic certificate flag, and environment authentication flag stored in the storage unit 25, and judges whether or not all of the fingerprint authentication success flag, electronic certificate authentication success flag and environment authentication success flag are set in the AND condition (step S202). When all the success flags are set (YES in step S202), the CPU 21 judges that the mobile phone 1 is safe, and sets the safe flag (step S203). In other words, the mobile phone 1 is judged to be proper only when it is judged proper in all of the biological authentication, electronic certificate authentication (PKI authentication) and environment authentication. In this case, the CPU 21 of the center server 2 transmits a signal instructing to continue the communication to the mobile phone 1 or the Web server 4 (step S204), and terminates the subroutine of safety judgment (step S56).

On the other hand, when the failure flag is set in at least one of the biological authentication, electronic certificate authentication (PKI authentication) and environment authentication, the CPU 21 sets the failure flag (step S205). In this case, the CPU 21 transmits a signal instructing to end the communication to the mobile phone 1 or the Web server 4 (step S206), and terminates the subroutine of safety judgment (step S56).

Embodiment 4

Embodiment 4 of the present invention relates to a safety judgment system which is applied in the case where patch software and firmware are provided. In PDAs, mobile phones, refrigerators, air conditioners and printers, bugs are sometimes found in the installed software. In this case, it is necessary to provide patch software. Besides, there is a case where firmware having additional functions is provided. Embodiment 4 illustrates a safety judgment system capable of providing software after ensuring security.

Figure 21:
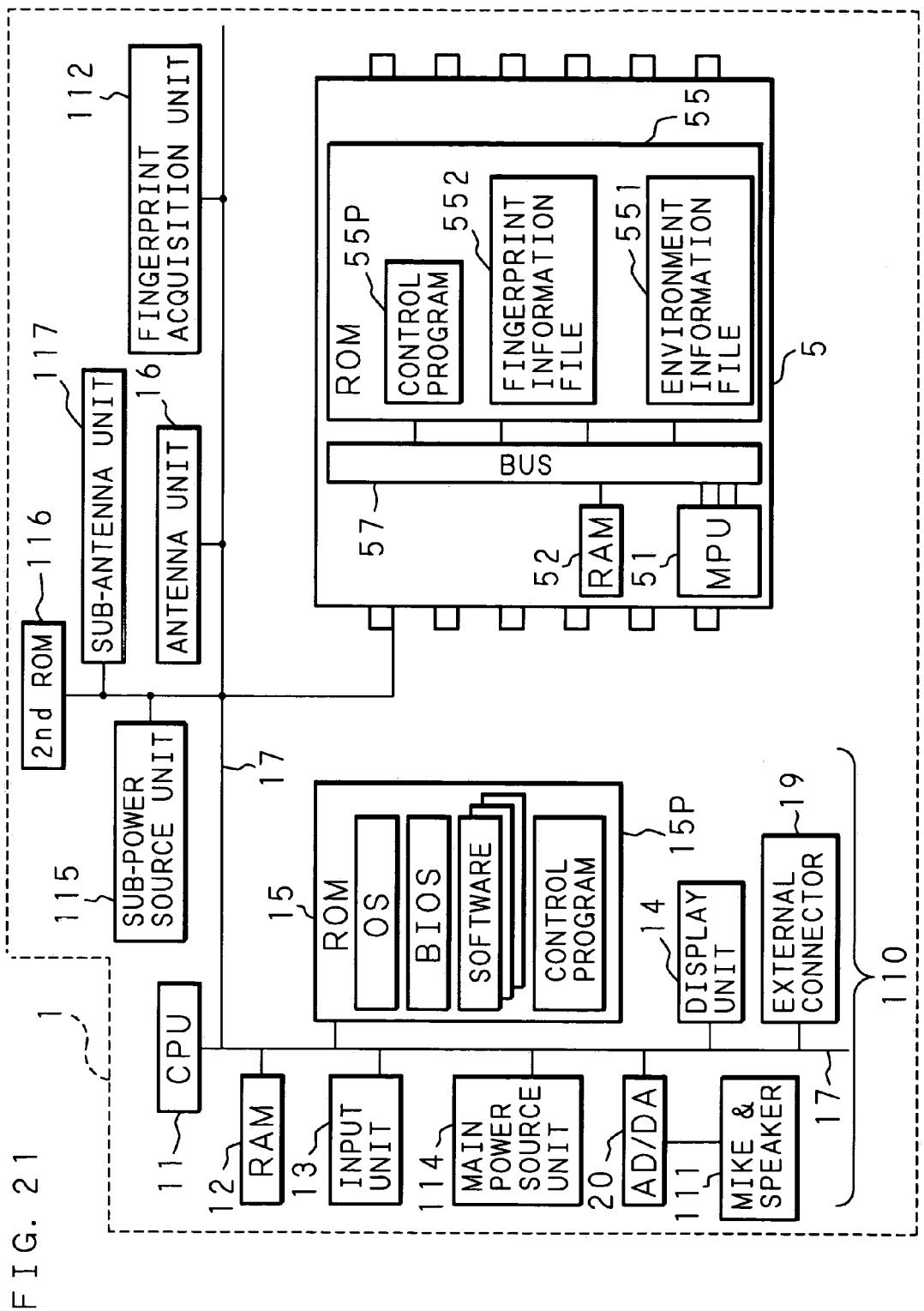
FIG. 21 is a block diagram showing the hardware structure of a mobile phone according to Embodiment 4.

FIG. 21 is a block diagram showing the hardware structure of the mobile phone 1 according to Embodiment 4. Numeral 114 in FIG. 21 represents main power supplying means (hereinafter referred to as the main power source unit) for supplying power to the mobile phone engine unit 110, and this main power source unit 114 uses a lithium battery or the like. By operating the ON button (not shown) of the input unit 13, power is supplied from the main power source unit 114 to the mobile phone engine unit 110 and the security chip 5. On the other hand, by operating the OFF button (not shown), supply of power from the main power source unit 114 to the mobile phone engine unit 110 and the security chip 5 is cut off, and the power of the mobile phone 1 is turned off.

Whereas sub-power supplying means (hereinafter referred to as the sub-power source unit) 115 uses, for example, a coin-shaped lithium battery, and supplies power to a second ROM 116 functioning as storing means and to a sub-antenna unit 117 functioning as receiving and communicating means even when power is not supplied to the mobile phone engine unit 110 and the security chip 5 by the main power source unit 114. In the case where power is supplied by the main power source unit 114, i.e., the power of the mobile phone 1 is ON, when software is transmitted from the center server 2, this software is received by the antenna unit 16, and the CPU 11 stores the software in the ROM 15. In this case, power is not supplied by the sub-power source unit 115.

In the case where power is not supplied by the main power source unit 114, i.e., the power of the mobile phone 1 is OFF, power is supplied to the sub-antenna unit 117 and the second ROM 116 by the sub-power source unit 115. Then, when software is transmitted from the center server 2, this software is received by the sub-antenna unit 117, and the received software is temporarily stored in the second ROM 116. At the time power is supplied by the main power source unit 114, the software stored in the second ROM 116 is written in the ROM 15. Note that, as the sub-antenna unit 117, it is possible to use, for example, a known FM character multi-channel broadcast receiving module. In this case, the center server 2 transmits FM multiplex broadcasting containing software through an FM broadcast station. When the FM character multi-channel broadcast receiving module functioning as the sub-antenna unit 117 receives the FM multiplex broadcasting, data of software described by the character code of DARC (Data Radio Channel) standard is converted into, for example, a source code described by C language or Java. Finally, after performing personal authentication, PKI authentication and environment authentication, the MPU 51 of the security chip 5 installs the software in the ROM 15.

Figure 22:
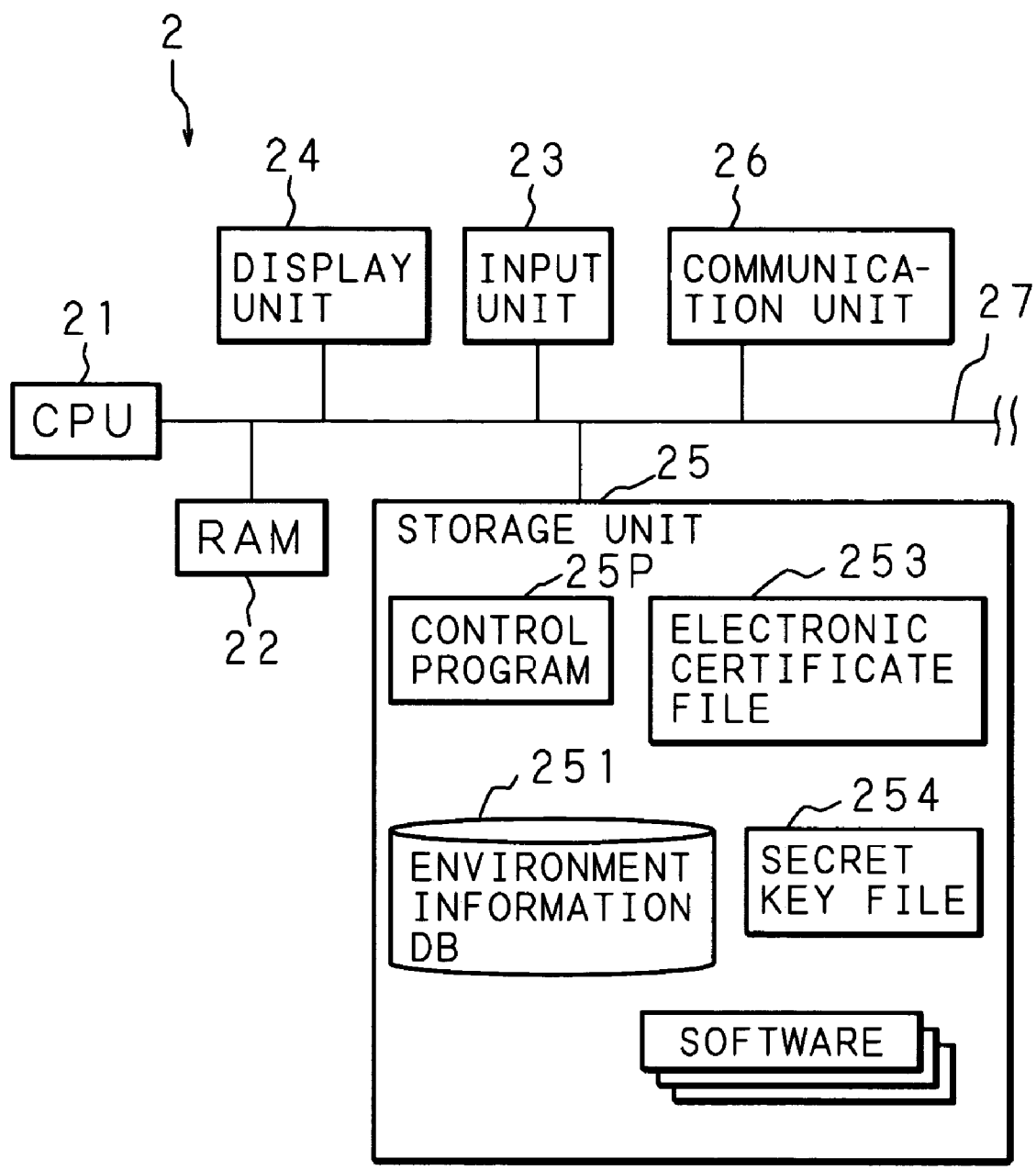
FIG. 22 is a block diagram showing the hardware structure of a center server according to Embodiment 4.
Figure 23:
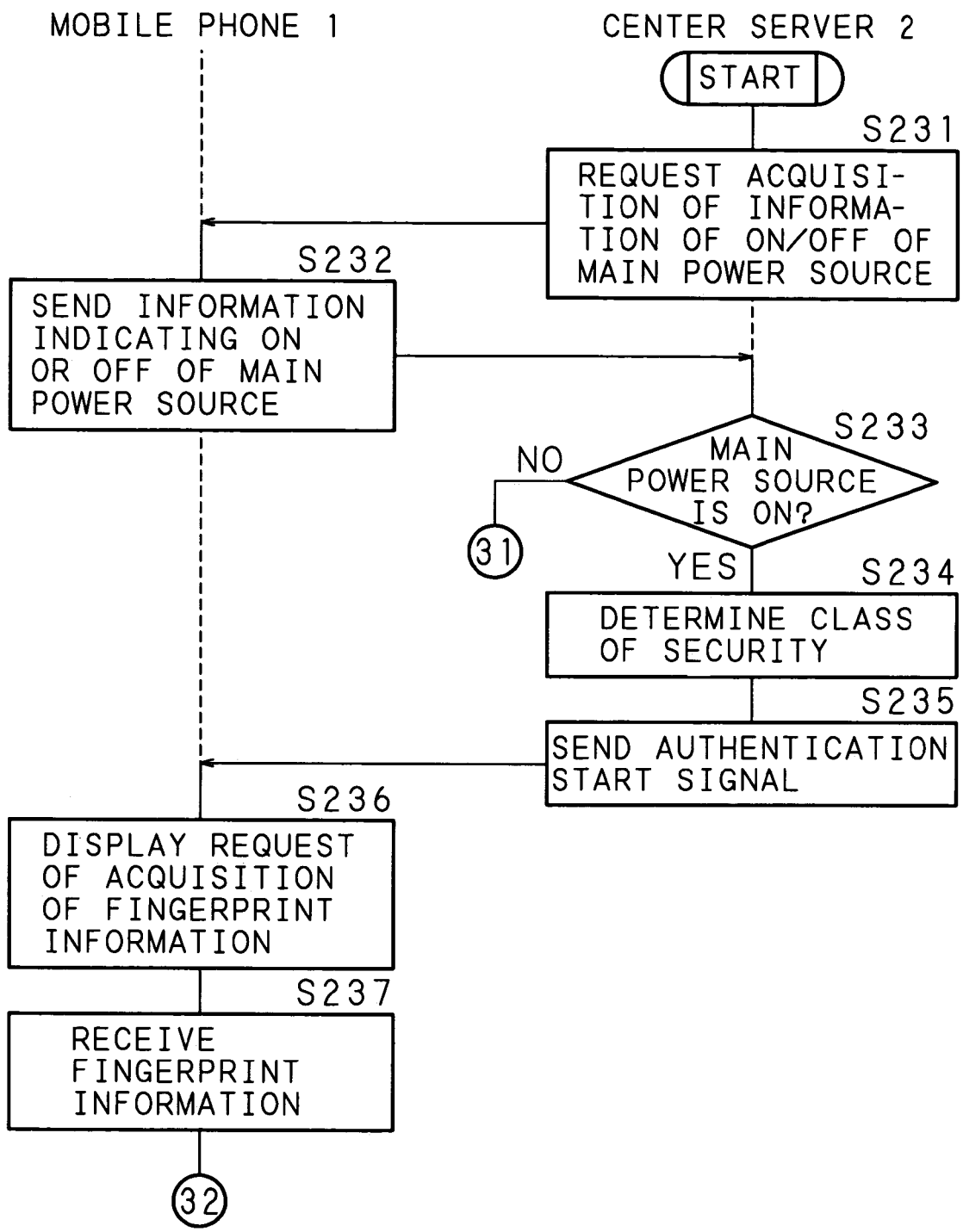
FIG. 23 is a flowchart showing the procedure of a software providing process according to Embodiment 4.
Figure 24:
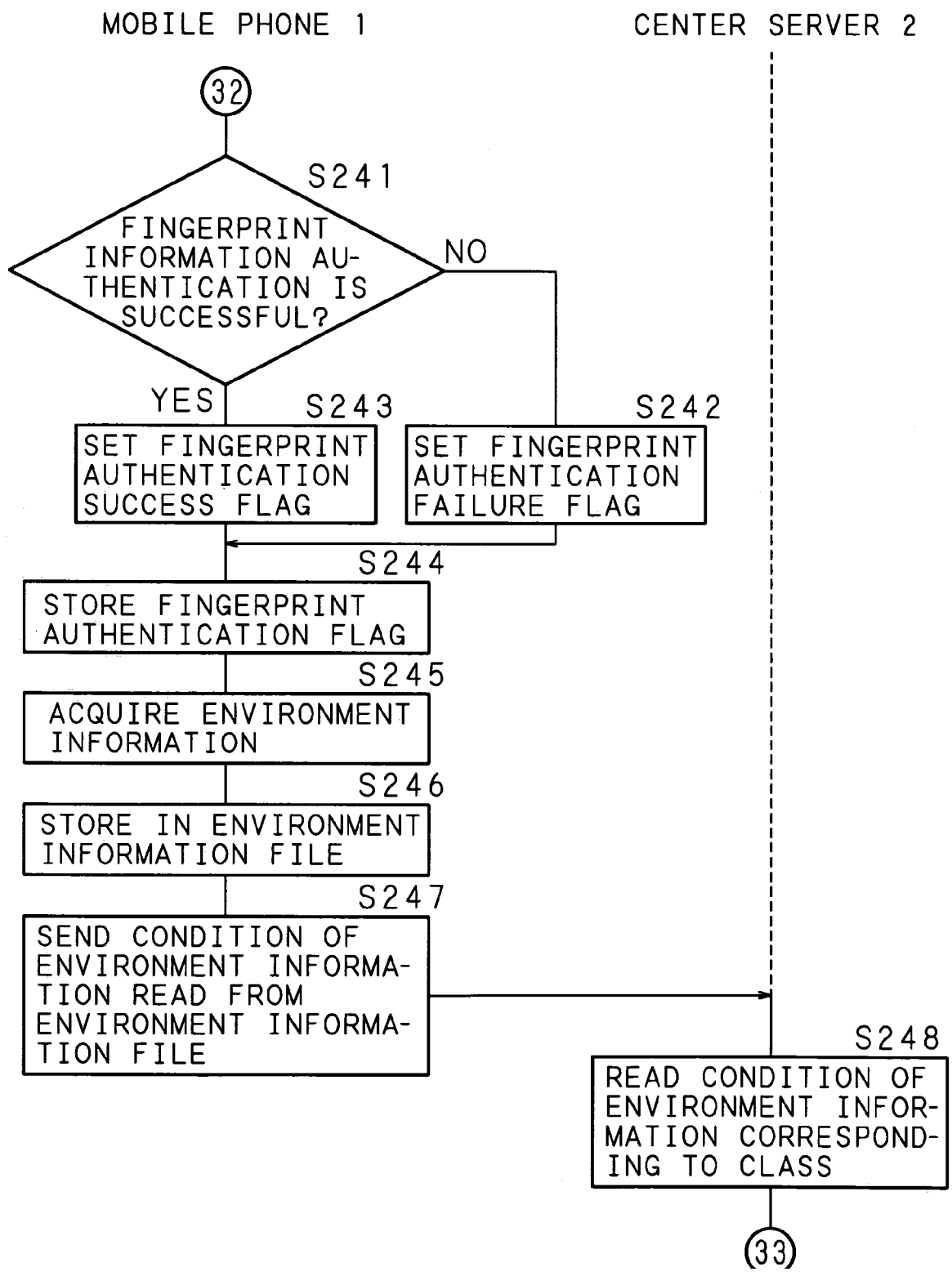
FIG. 24 is a flowchart showing the procedure of the software providing process according to Embodiment 4.
Figure 25:
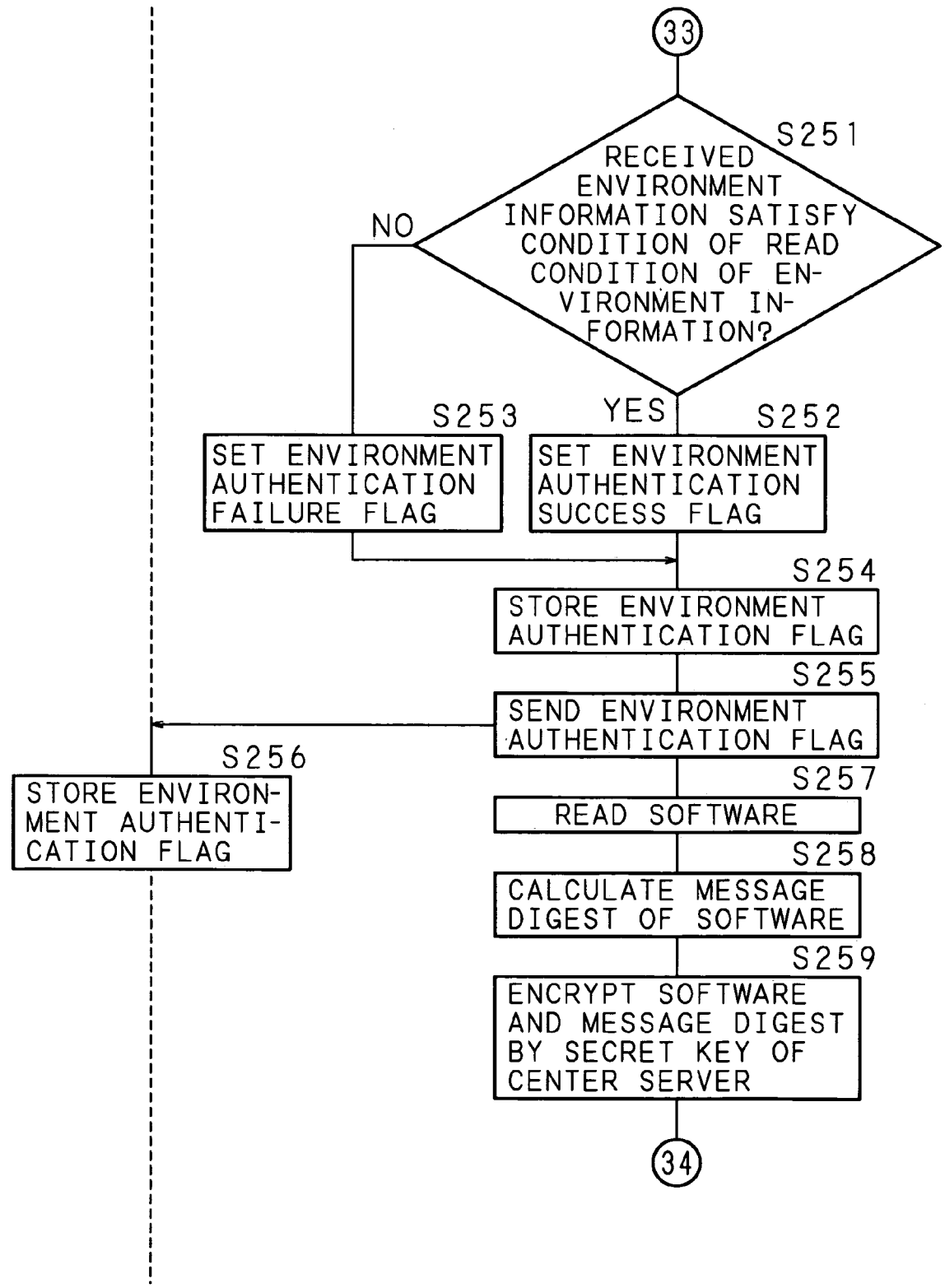
FIG. 25 is a flowchart showing the procedure of the software providing process according to Embodiment 4.
Figure 26:
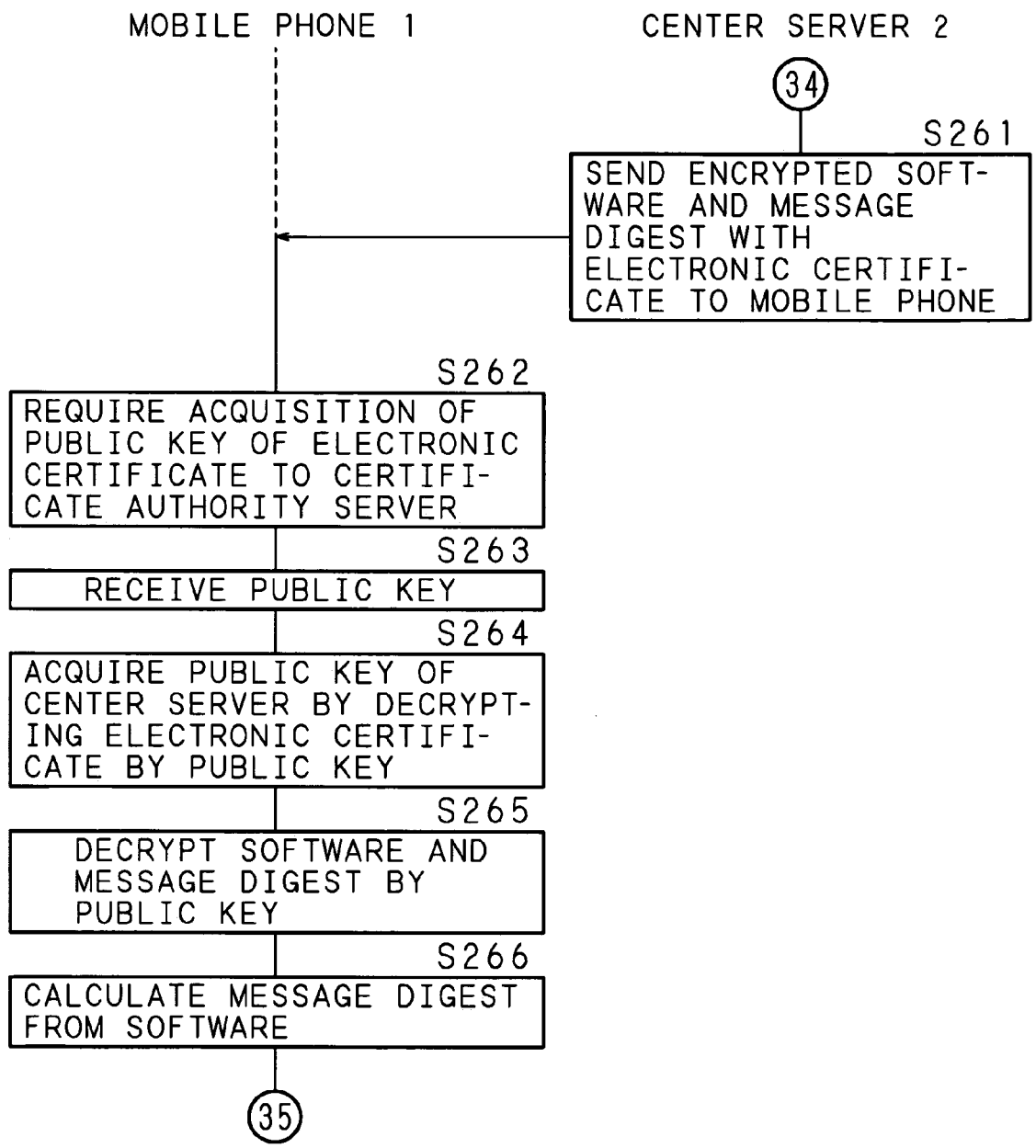
FIG. 26 is a flowchart showing the procedure of the software providing process according to Embodiment 4.
Figure 27:
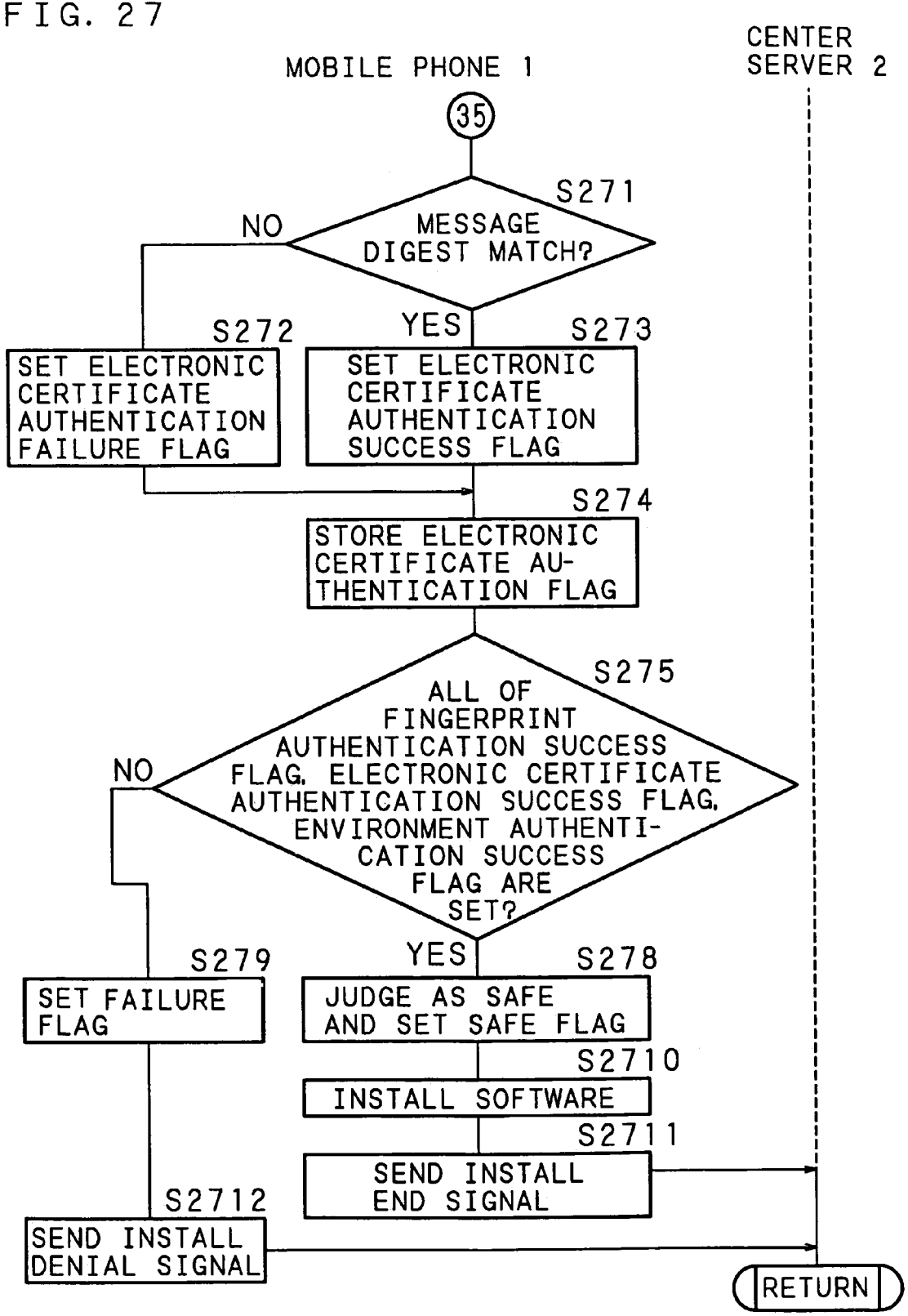
FIG. 27 is a flowchart showing the procedure of the software providing process according to Embodiment 4.
Figure 28:
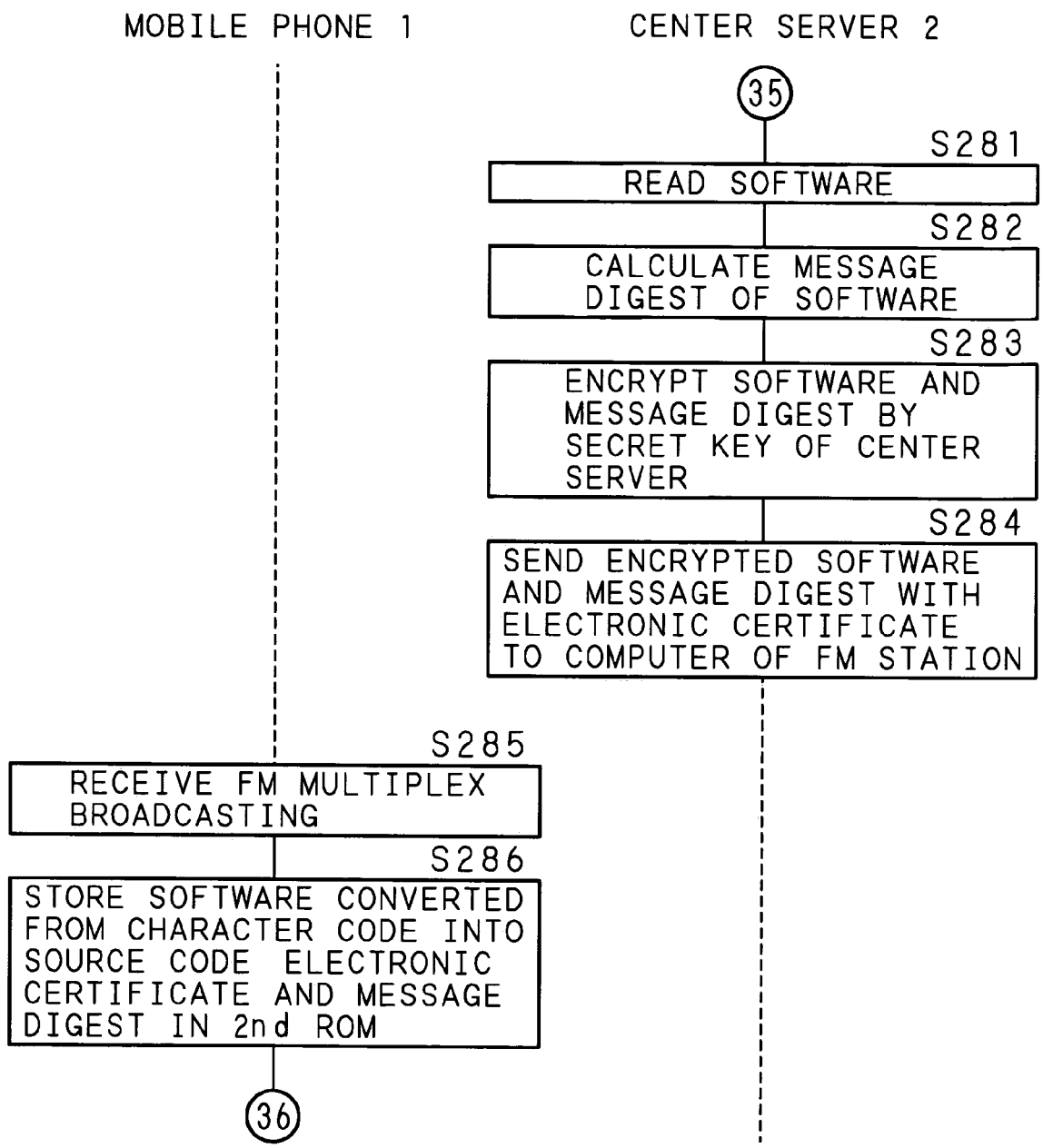
FIG. 28 is a flowchart showing the procedure of the software providing process according to Embodiment 4.
Figure 29:
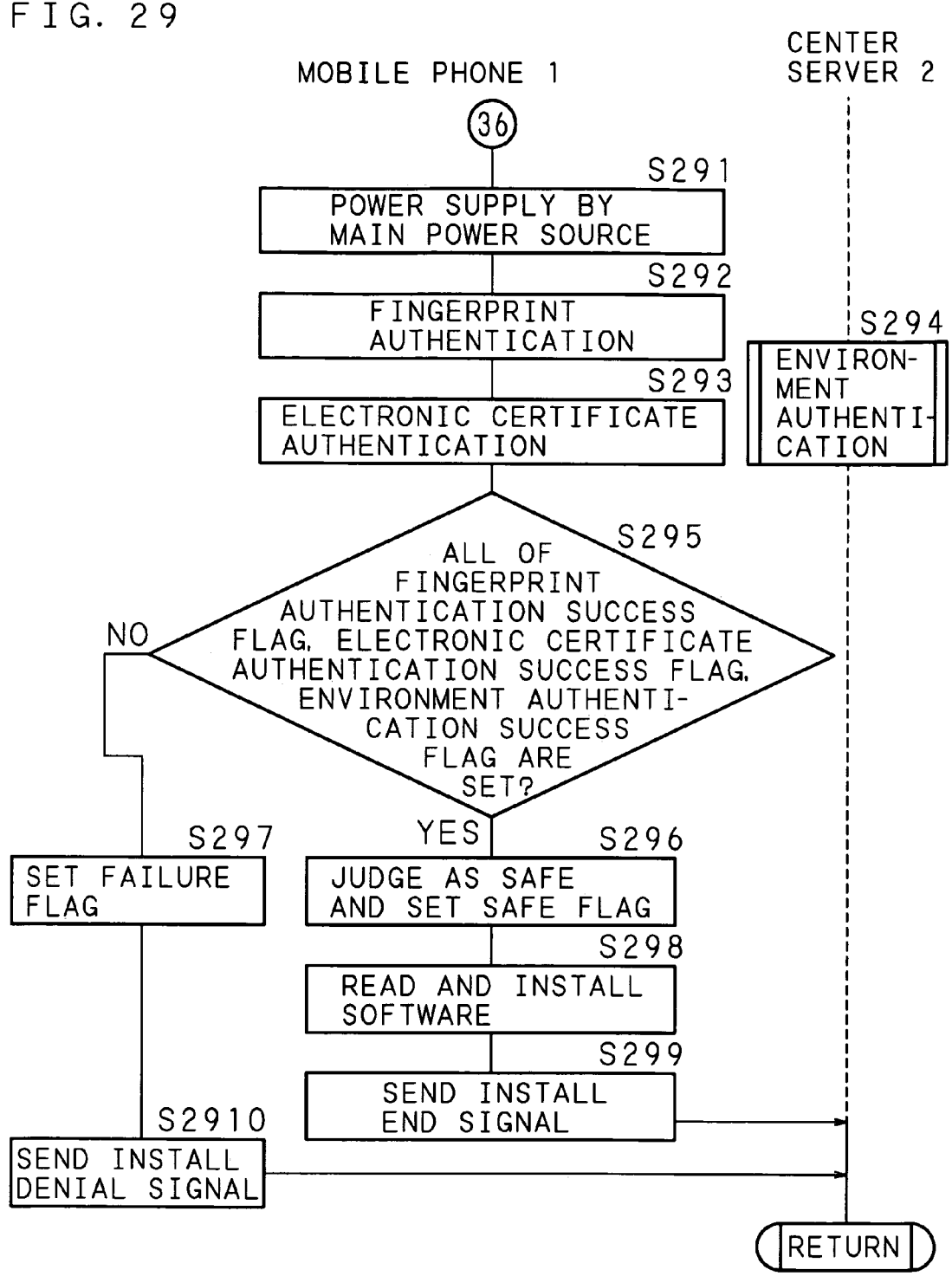
FIG. 29 is a flowchart showing the procedure of the software providing process according to Embodiment 4.

FIG. 22 is a block diagram showing the hardware structure of the center server 2 of Embodiment 4. As shown in FIG. 22, the storage unit 25 stores a variety of software, such as patch software, firmware, plug-in software and vaccine software certified by the certificate authority server 3. Note that these pieces of software can be provided by Software House. An electronic certificate file 253 stores the electronic certificate of the center server 2 which was issued by the certificate authority server 3 in advance, while a secret key file 254 stores the secret key of the center server 2 issued similarly by the certificate authority server 3.

Referring to a flowchart, the following description will explain a process of providing safety-warranted software, which is executed on the hardware structure of the center server 2 according to Embodiment 4 of the present invention. FIG. 23 through FIG. 29 show a flowchart of the procedure of the software providing process according to Embodiment 4. First, the CPU 21 of the center server 2 makes a request to acquire information indicating whether the main power source of the mobile phone 1 is ON or OFF by calling the mobile phone 1 or other method (step S231). The mobile phone 1 transmits information indicating whether the main power source is ON or OFF (step S232). The center server 2 judges whether or not the main power of the mobile phone 1 is ON (step S233). When the main power of the mobile phone 1 is ON (YES in step S233), the class of security is determined in the same manner as in step S162 mentioned above (step S234). The security may be determined by the manager according to the importance of software to be provided. For example, when the software is patch software or vaccine software, the class is determined to be class 1 so as to increase security, while software that requires low security, such as game software, is determined to be class 6.

The CPU 21 of the center server 2 transmits an authentication start signal to the mobile phone 1 (step S235). The MPU 51 of the security chip 5 of the mobile phone 1 who received the authentication start signal executes the control program 55P, and displays a fingerprint information acquisition request on the display unit 14 (step S236). When fingerprint information is inputted from the fingerprint acquisition unit 112, the MPU 51 of the security chip 5 receives the fingerprint information (step S237), and stores it temporarily in the RAM 52. Then, the MPU 51 reads the fingerprint information which was registered in the fingerprint information file 552 in the ROM 55 when the customer purchased the mobile phone 1, and compares these pieces of fingerprint information so as to judge whether the registered information matches the fingerprint information received and stored in the RAM 52 in step S237, i.e., whether the fingerprint information authentication is successful or not (step S241).

When these pieces of fingerprint information match and the fingerprint information authentication is judged successful (YES in step S241), the MPU 51 sets the fingerprint authentication success flag (step S243). On the other hand, when these pieces of fingerprint information do not match and the fingerprint information authentication is judged unsuccessful (NO in step S241), the MPU 51 sets the fingerprint authentication failure flag (step S242). The MPU 51 stores the transmitted fingerprint authentication flag (the fingerprint authentication success flag, or the fingerprint authentication failure flag) in the storage unit 55 (step S244).

Next, the MPU 51 of the security chip 5 acquires the environment information about the mobile phone 1 (step S245). The collected environment information is stored in the environment information file 551 (step S246). The MPU 51 reads the collected environment information from the environment information file 551, and transmits it to the center server 2 (step S247). The CPU 21 of the center server 2 stores the transmitted environment information in the RAM 22. The CPU 21 of the center server 2 reads a condition of environment information corresponding to the class determined in step S162 from the environment information DB 251 (step S248).

Then, the CPU 21 judges whether or not the received environment information stored in the RAM 22 satisfies the condition of environment information read from the environment information DB 251 (step S251). When the condition is not satisfied (NO in step S251), the CPU 21 sets the environment authentication failure flag (step S253). On the other hand, when the condition is satisfied (YES in step S251), the CPU 21 sets the environment authentication success flag (step S252). The CPU 21 of the center server 2 stores the flag for the environment authentication (the environment authentication success flag, or the environment authentication failure flag) in the storage unit 25 (step S254), and transmits it to the mobile phone 1 (step S255). The MPU 51 of the security chip 5 that received the environment authentication flag stores the environment authentication flag (the environment authentication success flag, or the environment authentication failure flag) in the storage unit 55 (step S256).

Further, the CPU 21 of the center server 2 reads from the storage unit 25 the software to be provided (step S257), which is stored in the storage unit 25. The CPU 21 calculates a message digest by using the hush function stored in the storage unit 25, for the read software (step S258). The CPU 21 reads the secret key of the center server 2 issued in advance by the certificate authority server 3 from the secret key file 254, and encrypts the software and the message digest (step S259). Further, the CPU 21 reads an electronic certificate issued in advance by the certificate authority server 3 from the electronic certificate file 253, attaches the electronic certificate to the encrypted software and message digest, and transmits them to the mobile phone 1 (step S261). The MPU 51 of the security chip 5 stores the transmitted electronic certificate and encrypted software and message digest in the RAM 52.

The MPU 51 of the security chip 5 accesses the certificate authority server 3 described in the electronic certificate, and makes a request for acquiring the public key of the received electronic certificate (the public key of the certificate authority) (step S262). The certificate authority server 3 transmits the public key of the electronic certificate to the mobile phone 1 in response to this request, and the MPU 51 of the security chip 5 receives the transmitted public key (step S263). The MPU 51 reads the stored electronic certificate from the RAM 52, decrypts the electronic certificate by using the public key of the certificate authority transmitted from the certificate authority server 3, and acquires the public key of the center server 2 (step S264).

The MPU 51 of the security chip 5 decrypts the encrypted software and message digest by using the public key of the center server 2 acquired from the certificate authority server 3 (step S265). Further, the MPU 51 calculates a message digest by using the hush function stored in the ROM 55 of the security chip 5, for the decrypted software (step S266). The MPU 51 judges whether or not the message digest decrypted in step S265 matches the message digest calculated in step S266, i.e., whether the software was not falsified during the transmission, and also judges whether or not the information was transmitted and received to/from an authorized center server 2 (step S271).

When these message digests do not match (NO in step S271), the MPU 51 judges that some falsification or "spoofing" was made, and sets the failure flag for the electronic certificate authentication (step S272). On the other hand, when these message digests match (YES in step S271), the MPU 51 judges that "spoofing" or falsification was not made, and sets the success flag for the electronic certificate authentication (step S273). Then, the MPU 51 of the security chip 5 stores the electronic certificate authentication flag (the electronic certificate authentication success flag, or the electronic certificate authentication failure flag) in the ROM 55 (step S274).

The MPU 51 reads the fingerprint authentication flag, the electronic certificate flag and the environment authentication flag stored in the ROM 55, and judges whether or not all of the fingerprint authentication success flag, electronic certificate authentication success flag and environment authentication success flag are set in the AND condition (step S275). When all the success flags are set (YES in step S275), the MPU 51 judges that the transmitted software is safe, and sets the safe flag (step S278). The MPU 51 of the security chip 5 installs the software decrypted in step S265 in the ROM 15 of the mobile phone engine unit 110 (step S2710). Then, the MPU 51 transmits a signal indicating the end of installation to the center server 2 (step S2711), and terminates the subroutine of safety judgment (step S56).

On the other hand, when the failure flag is set in at least one of the biological authentication, electronic certificate authentication (PKI authentication) and environment authentication (NO in step S275), the MPU 51 sets the failure flag (step S279). In this case, the MPU 51 transmits a signal indicating denial of installation to the center server 2 (step S2712), and terminates the subroutine of safety judgment (step S56).

When NO in step S233, i.e., when the main power of the mobile phone 1 is OFF, the CPU 21 of the center server 2 reads from the storage unit 25 the software to be provided (step S281), which is stored in the storage unit 25. The CPU 21 calculates a message digest by using the hush function stored in the storage unit 25, for the read software (step S282). The CPU 21 reads the secret key of the center server 2 issued in advance by the certificate authority server 3 from the secret key file 254, and encrypts the software and the message digest (step S283). Further, the CPU 21 reads an electronic certificate issued in advance by the certificate authority server 3 from the electronic certificate file 253, attaches the electronic certificate to the encrypted software and message digest, and transmits them to a computer (not shown) of the FM broadcast station (step S284).

The computer of the FM broadcast station converts the electronic certificate and the encrypted software and message digest into broadcast data according to DARC standard, and multiplexes FM music data and broadcast data by FM multiplex broadcasting multiplexer circuit (not shown). These data are FM-modulated by an FM modulation oscillator and broadcasted. The mobile phone 1 receives the FM multiplex broadcasting by the sub-antenna unit 117 (step S285), and converts the data described in a character code of the DCRC standard so as to acquire the electronic certificate and the encrypted software and message digest. Note that, for example, the techniques relating to the FM multiplex broadcasting using the DARC standard are disclosed in Japanese Patent Application Laid-Open No. 10-116237 (1998).

The converted electronic certificate, software and message digest are stored in the second ROM 116 (step S286). Then, when the customer operates the input unit 13 to start the supply of power by the main power source unit 114 (step S291), fingerprint authentication is performed in the same manner as in steps S236 through S244 described above (step S292), environment authentication is performed through the same process explained in steps S245 through S256 (step S294), and authentication using an electronic certificate is performed in the same manner as in steps S262 through S274 (step S293). When performing the authentication using an electronic certificate, the CPU 51 reads the electronic certificate and the encrypted software and message digest stored in the second ROM 116, stores them temporarily in the RAM 52, and then perform the authentication using the electronic certificate. In short, the public key is acquired from the electronic certificate by using the public key acquired from the certificate authority server 3, the encrypted software is decrypted with the acquired public key, and then a judgment is made as to whether the decrypted software is proper or not.

The MPU 51 reads the fingerprint authentication flag, electronic certificate flag and environment authentication flag stored in the ROM 55, and judges whether or not all of the fingerprint authentication success flag, electronic certificate authentication success flag and environment authentication success flag are set in the AND condition (step S295). When all the success flags are set (YES in step S295), the MPU 51 judges that the transmitted software is safe, and sets the safe flag (step S296). The MPU 51 of the security chip 5 installs the decrypted software in the ROM 15 of the mobile phone engine unit 110 (step S298). Then, the MPU 51 transmits a signal indicating completion of installation to the center server 2 (step S299), and terminates the subroutine of safety judgment (step S56).

On the other hand, when the failure flag is set in at least one of the biological authentication, electronic certificate authentication (PKI authentication) and environment authentication (NO in step S295), the MPU 51 sets the failure flag (step S297). In this case, the MPU 51 transmits a signal indicating denial of installation to the center server 2 (step S2910), and terminates the subroutine of safety judgment (step S56).

The software to be provided by the center server 2 may be patch software or software for deleting software in the mobile phone 1 which was targeted by a DDoS (Distributed Denial of Service) attack. For example, when software (a program) for causing a DDoS attack on a predetermined Web server several days later is set in the mobile phone 1 for some reason, software that went through the authentications of the present invention is provided. The software to be provided stores time information, and all data stored on and after this stored time are deleted by installing and executing this software.

Figure 30:
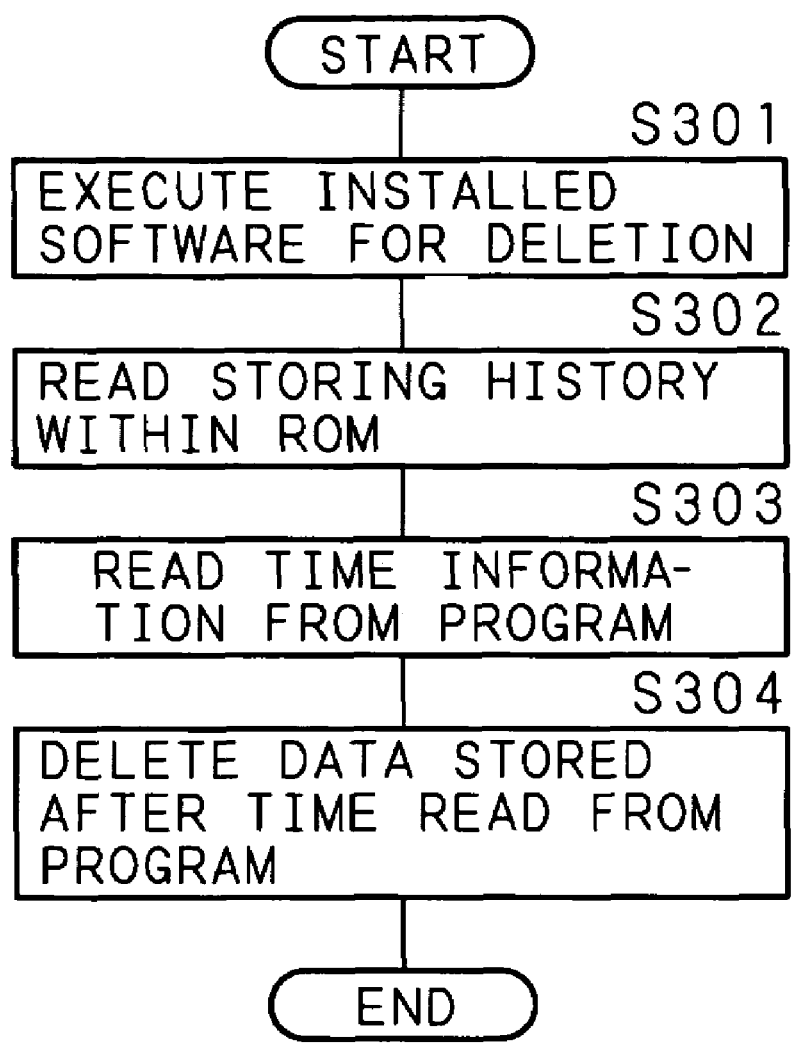
FIG. 30 is a flowchart showing the processing content of installed deleting software.

FIG. 30 is a flowchart showing the processing content of the installed deleting software. The deleting software is installed in the ROM 15 in step S298. The customer causes the CPU 11 to execute the deleting software by operating the input unit 13 (step S301). The CPU 11 reads the storing history in the ROM 15 (step S302). More specifically, the CPU 11 reads data such as the stored files and the installed software, and further reads the information about the time at which these data were stored. The CPU 11 reads the time information from the program of the deleting software (step S303). Then, the CPU 11 refers to the read storing history, and deletes all the data stored on and after the read time (step S304). Accordingly, it is possible to prevent the mobile phone 1 which was made a stepping-stone for the DDoS attack from being used for the attack.

Embodiment 5

Figure 31:
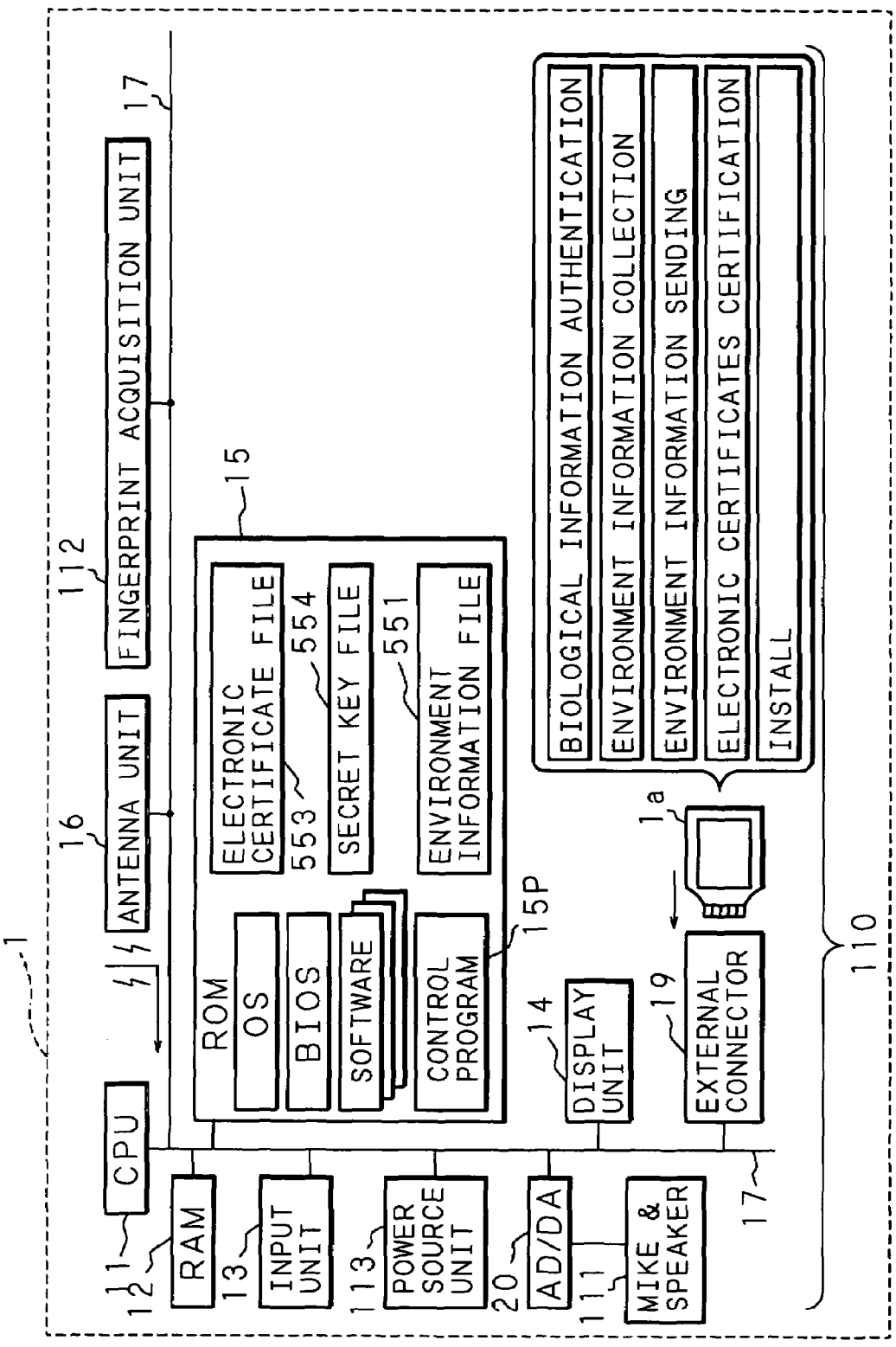
FIG. 31 is a block diagram showing the hardware structure of a mobile phone according to Embodiment 5.

FIG. 31 is a block diagram showing the hardware structure of the mobile phone 1 according to Embodiment 5 of the present invention. The computer program for executing the processing of the mobile phone 1 of Embodiment 4 can be provided by installing it in the mobile phone 1 as in Embodiment 5, or provided using a removable recording medium such as a CD-ROM, MO, or memory card. Further, it is also possible to provide the computer program by transmitting it as a carrier wave via a line. Specifically, in Embodiment 5, instead of mounting the security chip 5, a computer program having the same function as the security chip 5 is installed in the ROM 15 of the mobile phone 1. The contents of the program will be explained below.

Programs for causing the mobile phone 1 to authenticate biological information, collect environment information, transmit environment information, perform authentication using an electronic certificate, and install software are installed in the ROM 15 of the mobile phone 1 from a recording medium 1a (such as a CD-ROM, MO, memory card, or DVD-ROM) on which the programs are recorded. As the installation method, the recording medium 1a such as a memory card connectable to the external connector 19 is connected to the external connector 19, and the programs are installed. However, it may be possible to download the programs of the present invention from the center server 2. These programs are executed after being loaded temporarily in the RAM 12 of the mobile phone 1. Consequently, the mobile phone 1 functions as the information processing apparatus of Embodiment 4 of the present invention as described above.

Embodiment 6

Embodiment 6 of the present invention explains a technique in which, when all of the biological information authentication, environment authentication, and electronic certificate authentication are judged successful in both of the mobile phone 1 and the center server 2, the mobile phone 1 and the center server 2 are judged to be safe, and subsequent transmission and reception of information are permitted.

Figure 32:
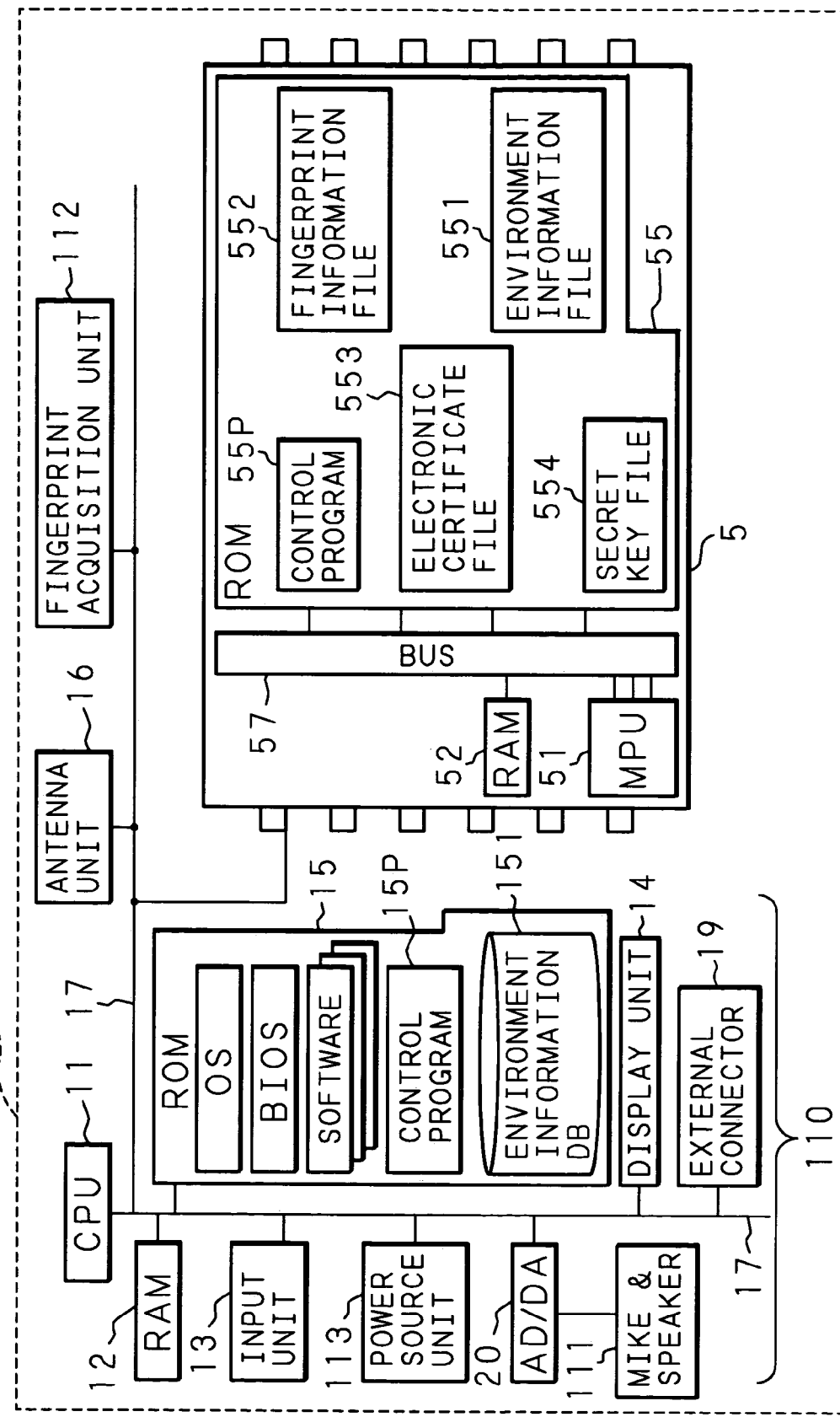
FIG. 32 is a block diagram showing the hardware structure of a mobile phone according to Embodiment 6.
Figure 33:
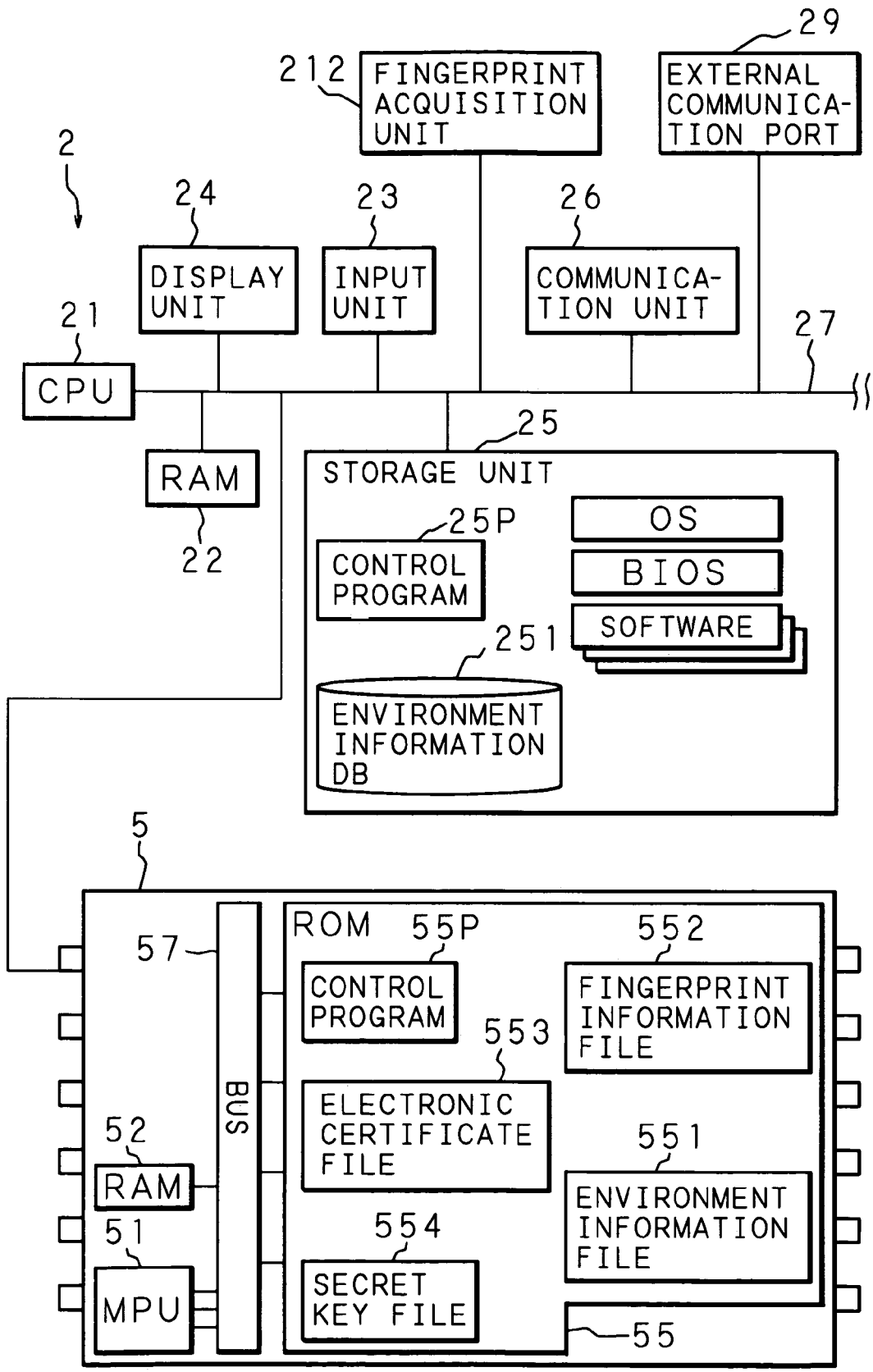
FIG. 33 is a block diagram showing the hardware structure of a center server according to Embodiment 6.
Figure 34:
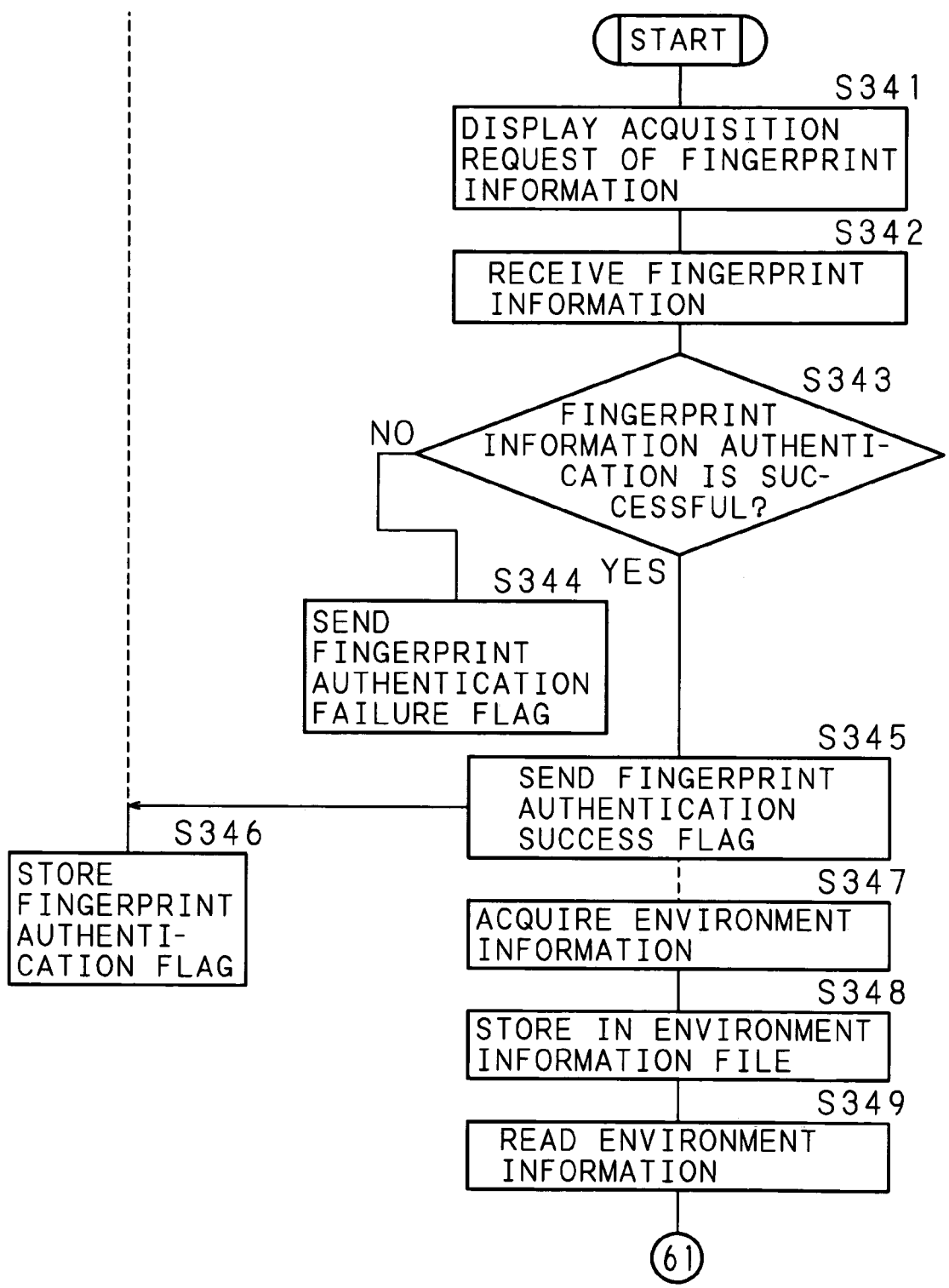
FIG. 34 is a flowchart showing the procedure of an authentication process according to Embodiment 6.
Figure 35:
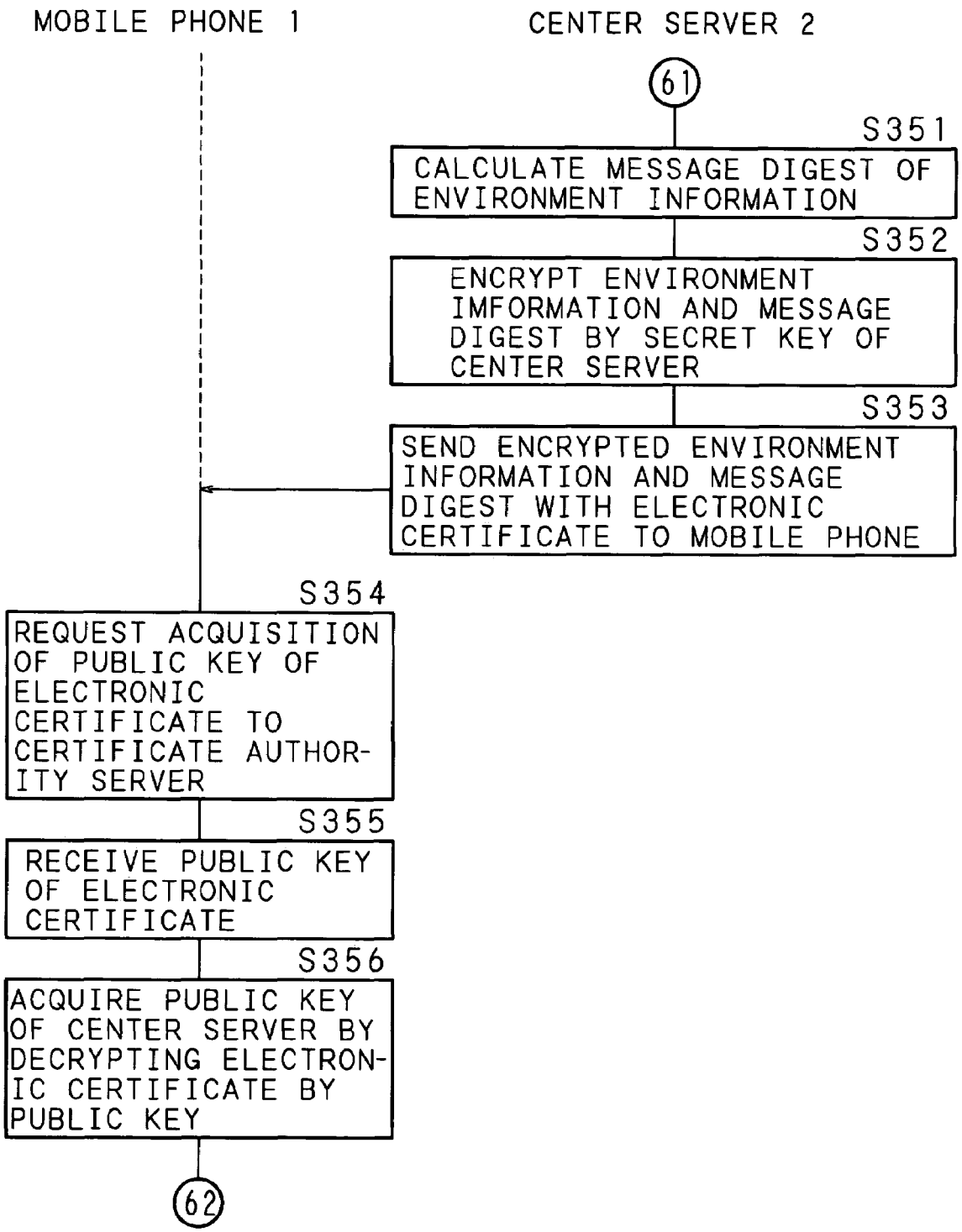
FIG. 35 is a flowchart showing the procedure of the authentication process according to Embodiment 6.
Figure 36:
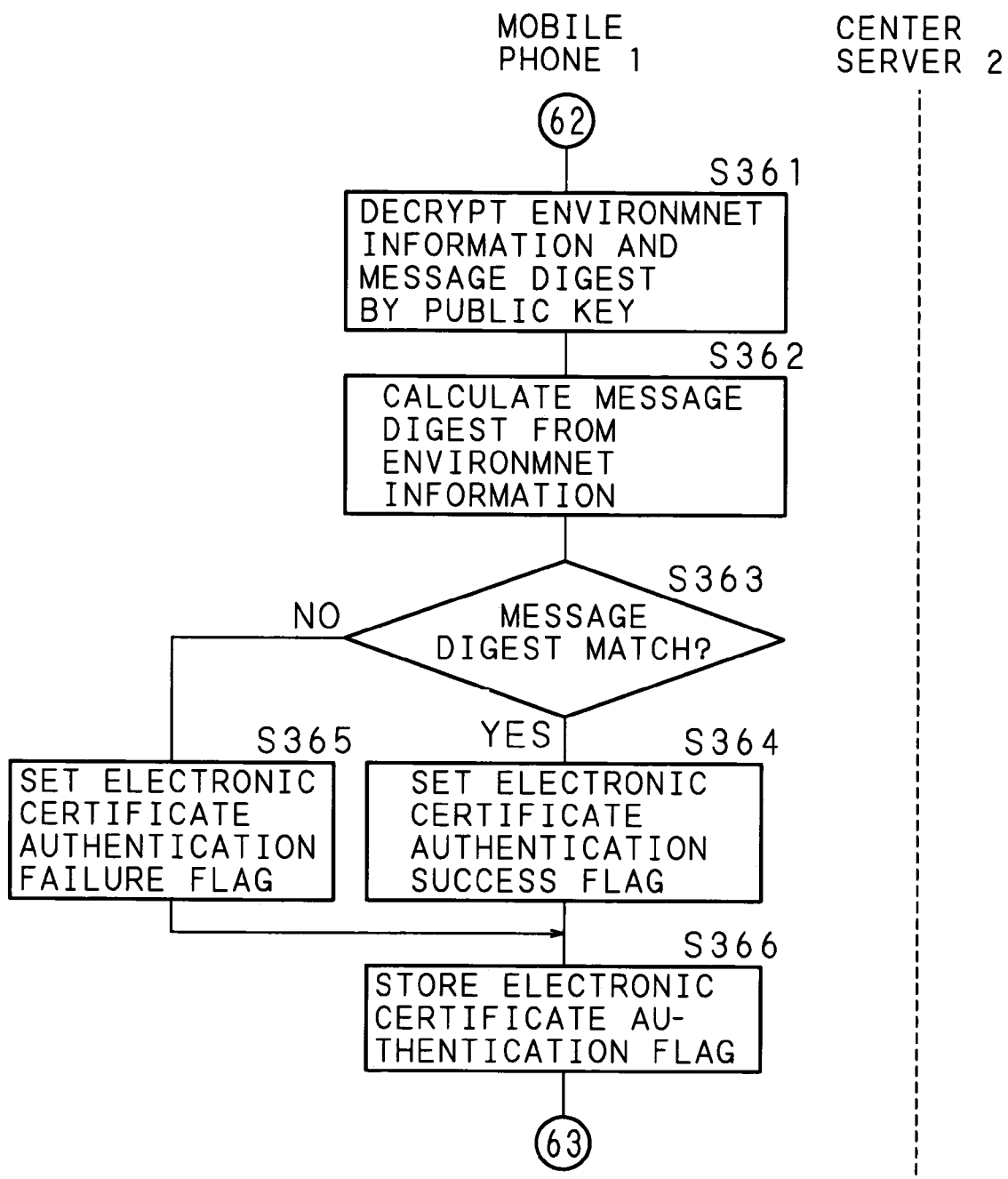
FIG. 36 is a flowchart showing the procedure of the authentication process according to Embodiment 6.
Figure 37:
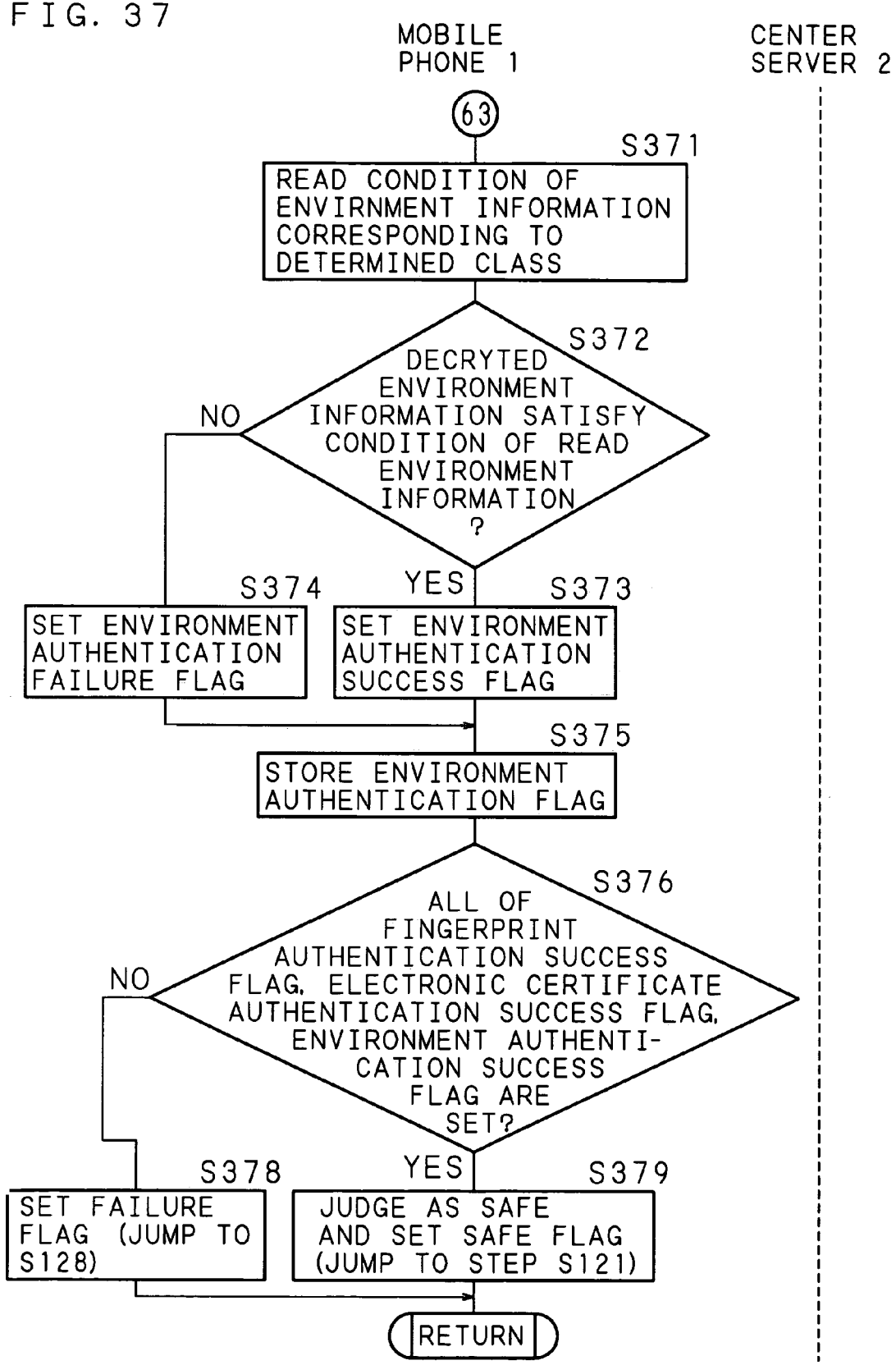
FIG. 37 is a flowchart showing the procedure of the authentication process according to Embodiment 6.

FIG. 32 is a block diagram showing the hardware structure of the mobile phone 1 according to Embodiment 6 of the present invention, and FIG. 33 is a block diagram showing the hardware structure of the center server 2 according to Embodiment 6. As shown in FIG. 32, in Embodiment 6, the environment authentication of the center server 2 is also performed in the mobile phone 1, and therefore an environment information DB 151 is prepared in the ROM 15 of the mobile phone 1. In this environment information DB 151, in the same manner as explained in FIG. 4, conditions for the environment information about the peripheral equipment connected to an external communication port 29 of the center server 2, PC card (not shown), and installed OS and software are registered according to the classes of the security policy.

In order for the center server 2 to receive authentication by the mobile phone 1, a fingerprint acquisition unit 212 and the security chip 5 are connected to the CPU 21 through a bus 27. Note that since the details of them are the same as those explained in Embodiment 1, the detailed explanation is omitted. Besides, numeral 29 represents an external communication port such as a USB port and RS232C port, and peripheral equipment such as a printer, a mouse, a hard disk, and an MO drive is connected to the external communication port 29.

Figure 11:
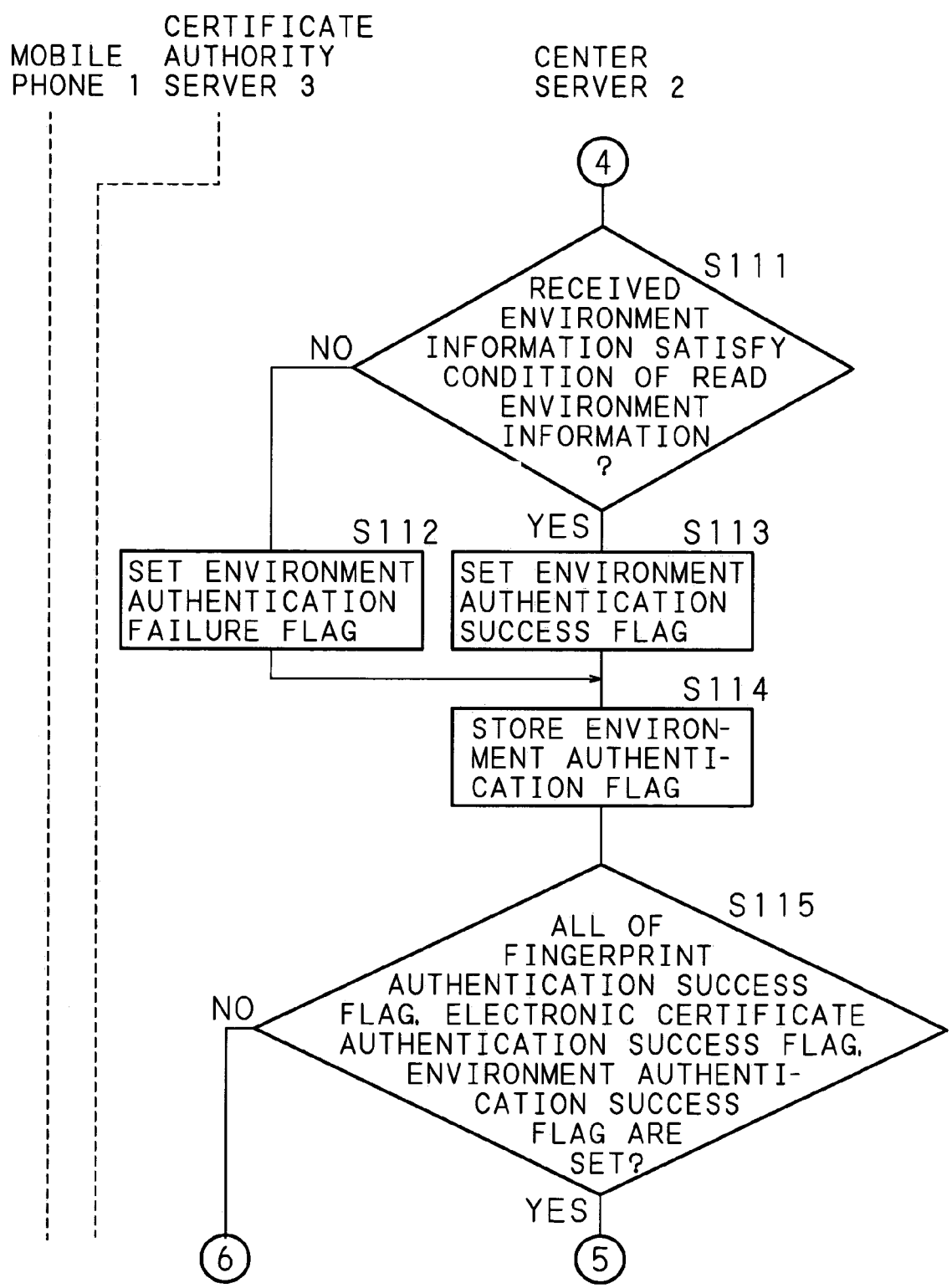
FIG. 11 is a flowchart showing the procedure of the safety judgment process.
Figure 12:
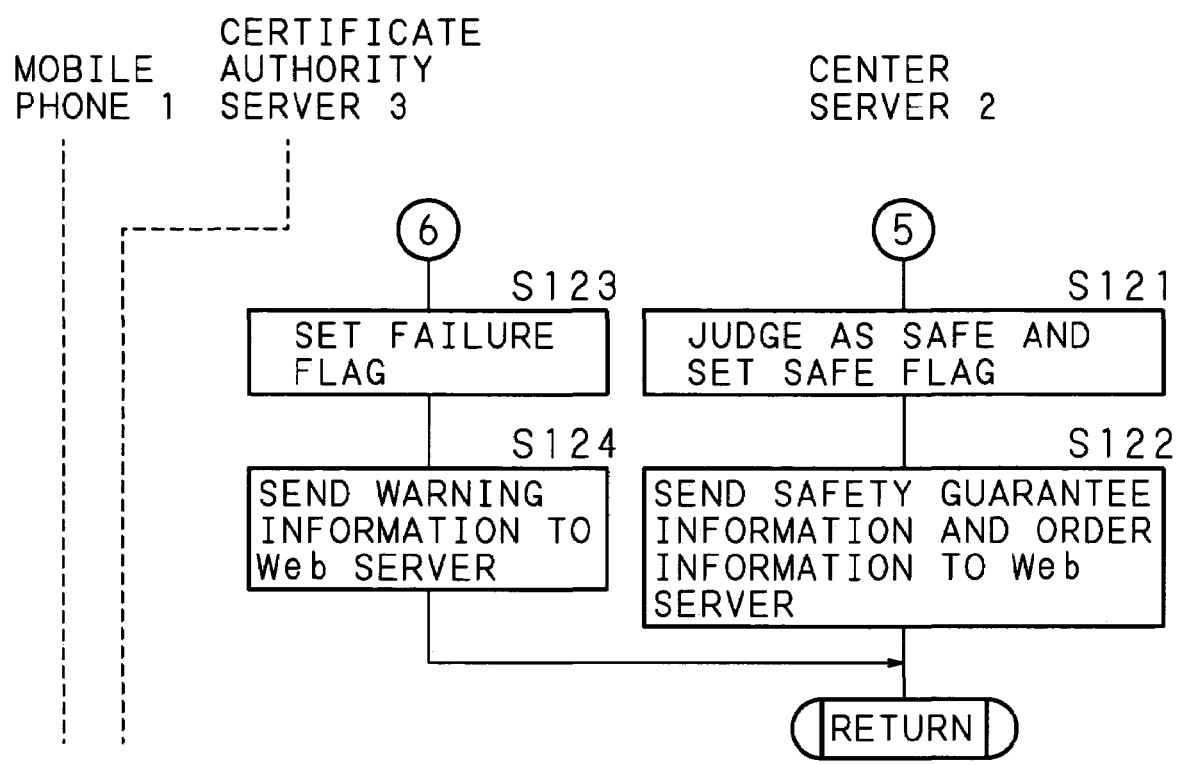
FIG. 12 is a flowchart showing the procedure of the safety judgment process.

In Embodiment 6, when all of the biological information authentication, environment authentication and electronic certificate authentication are judged successful in both of the mobile phone 1 and the center server 2, the mobile phone 1 and the center server 2 are judged to be safe, and subsequent transmission and reception of information are permitted. Thus, when the judgment result in step S115 shown in FIG. 11 is "YES", i.e., after the safety of the mobile phone 1 is confirmed, the following process is additionally performed.

FIG. 34 through FIG. 37 show a flowchart of the procedure of the authentication process according to Embodiment 6. When the judgment result in step S115 is "YES", the MPU 51 of the security chip 5 of the center server 2 executes the control program 55P, and displays a fingerprint information acquisition request on the display unit 24 (step S341). When the fingerprint information is inputted from the fingerprint acquisition unit 212, the MPU 51 of the security chip 5 receives the fingerprint information (step S342), and stores it temporarily in the RAM 52. Then, the MPU 51 reads the fingerprint information which was registered in the fingerprint information file 552 in the ROM 55 beforehand when the customer purchased the mobile phone 1, and compares these pieces of fingerprint information so as to judge whether the registered information matches the fingerprint information received and stored in the RAM 52 in step S342, i.e., whether the fingerprint information authentication is successful or not (step S343).

When these pieces of fingerprint information match and the fingerprint information authentication is judged successful (YES in step S343), the MPU 51 sets the fingerprint authentication success flag, and transmits the set fingerprint authentication success flag to the mobile phone 1 (step S345). On the other hand, when these pieces of fingerprint information do not match and the fingerprint information authentication is judged unsuccessful (NO in step S343), the MPU 51 sets the fingerprint authentication failure flag, and transmits the set fingerprint authentication failure flag to the mobile phone 1 (step S344). The CPU 11 of the mobile phone 1 stores the transmitted fingerprint authentication flag (the fingerprint authentication success flag, or the fingerprint authentication failure flag) in the ROM 15 (step S346). Consequently, the biological authentication using fingerprint information is completed.

Note that although this embodiment employs a structure in which biological authentication using fingerprints is executed in the center server 2, it may be possible to register the previously acquired fingerprint information in the certificate authority server 3 or the mobile phone 1, and transmit newly acquired fingerprint information from the center server 2 for judgment in the certificate authority server 3 or the mobile phone 1.

Next, the MPU 51 of the security chip 5 acquires the environment information about the center server 2 (step S347). The MPU 51 collects the environment information by always monitoring the OS, BIOS and software installed in the storage unit 25 of the center server 2 as described above and collecting the device name of the center server 2, the name and version of the OS, the equipment name and version of the peripheral equipment connected to the external communication port 29, and the name and version of the installed software such as a browser. The collected environment information is stored in the environment information file 551 (step S348).

The MPU 51 of the security chip 5 reads the environment information stored in the environment information file 551 in the RAM 52 (step S349). The MPU 51 of the security chip 5 calculates a message digest by using the hush function stored in the ROM 55, for the read environment information (step S351). The MPU 51 reads the secret key of the center server 2 issued in advance by the certificate authority server 3 from the secret key file 554, and encrypts the environment information and the message digest (step S352). Further, the MPU 51 reads an electronic certificate issued in advance by the certificate authority server 3 from the electronic certificate file 553, attaches the electronic certificate to the encrypted environment information and message digest, and transmits them to the mobile phone 1 (step S353). The CPU 11 of the mobile phone 1 stores the transmitted electronic certificate and encrypted environment information and message digest in the RAM 12.

The CPU 11 of the mobile phone 1 accesses the certificate authority server 3 written in the electronic certificate, and makes a request for acquiring the public key of the received electronic certificate (the public key of the certificate authority) (step S354). The certificate authority server 3 transmits the public key of the electronic certificate to the mobile phone 1 in response to this request, and the mobile phone 1 receives the transmitted public key of the electronic certificate (step S355). The CPU 11 of the mobile phone 1 reads the stored electronic certificate from the RAM 12, decrypts the electronic certificate by using the public key of the certificate authority transmitted from the certificate authority server, and acquires the public key of the center server 2 (step S356).

The CPU 11 of the mobile phone 1 decrypts the encrypted environment information and message digest by using the public key of the center server 2 acquired from the certificate authority server 3 (step S361). Further, the CPU 11 calculates a message digest by using the hush function stored in the ROM 55 of the mobile phone 1, for the decrypted environment information (step S362). The CPU 11 of the mobile phone 1 judges whether or not the message digest decrypted in step S361 matches the message digest calculated in step S362, i.e., whether the environment information was not falsified during the transmission, and also judges whether or not the information was transmitted and received to/from an authorized center server 2 (step S363).

When these message digests do not match (NO in step S363), the CPU 11 judges that some falsification or "spoofing" was made, and sets the failure flag for the electronic certificate authentication (step S365). On the other hand, when these message digests match (YES in step S363), the CPU 11 judges that "spoofing" or falsification was not made, and sets the success flag for the electronic certificate authentication (step S364). Then, the CPU 11 of the mobile phone 1 stores the electronic certificate authentication flag (the electronic certificate authentication success flag, or the electronic certificate authentication failure flag) in the ROM 15 (step S366).

The CPU 11 of the mobile phone 1 reads a condition of environment information corresponding to the class determined in step S104 from the environment information DB 151 (step S371). Then, the CPU 11 judges whether or not the decrypted environment information satisfies the condition of environment information read from the environment information DB 151 in step S371 (step S372). When the condition is not satisfied (NO in step S372), the CPU 11 sets an environment authentication failure flag (step S374). On the other hand, when the condition is satisfied (YES in step S372), the CPU 11 sets the environment authentication success flag (step S373). The CPU 11 of the mobile phone 1 stores the environment authentication flag (the environment authentication success flag, or the environment authentication failure flag) in the ROM 15 (step S375).

The CPU 11 reads the fingerprint authentication flag, electronic certificate flag and environment authentication flag stored in the ROM 15, and judges whether or not all of the fingerprint authentication success flag, electronic certificate success flag and environment authentication success flag are set in the AND condition (step S376). When all the success flags are set (YES in step S376), the CPU 11 judges that the center server 2 is safe, sets the safe flag, and jumps to step S121 (step S377).

On the other hand, when the failure flag is set in at least one of the biological authentication, electronic certificate authentication (PKI authentication) and environment authentication, the CPU 11 sets the failure flag and jumps to step S123 (step S378). Thus, only when all of the biological information authentication, environment authentication and electronic certificate authentication are judged successful in both of the mobile phone 1 and the center server 2, the mobile phone 1 and the center server 2 are judged to be safe, and subsequent transmission and reception of information are permitted. It is therefore possible to provide communication environment with higher security.

Embodiment 6 explains the technique in which, when all the biological information authentication, environment authentication, and electronic certificate authentication are judged successful in both of the mobile phone 1 and the center server 2, the mobile phone 1 and the center server 2 are judged to be safe and subsequent transmission and reception of information are permitted. Similarly, needless to say, when all the biological information authentication, environment authentication and electronic certificate authentication are judged successful in both of the mobile phone 1 and the Web server 4 of an on-line shop (or other mobile phone, a washing machine, or an information processing apparatus such as a personal computer, not shown), it is possible to judge that the mobile phone 1 and the Web server 4 are safe, and permit subsequent transmission and reception of information.

Embodiment 2 through Embodiment 6 have the above-described structures. Since other structures and functions are the same as those in Embodiment 1, the corresponding parts are designated with the same reference numbers and the detailed explanation thereof is omitted.

As described in detail above, according to the present invention, biological information such as the fingerprint of a user is received, and a judgment is made as to whether the received biological information is proper or not. Moreover, environment information, including the information about peripheral equipment connected to the information processing apparatus or software installed in the information processing apparatus, is collected. The information processing apparatus transmits the collected environment information to the first authentication apparatus. Further, the information processing apparatus transmits an electronic certificate issued by the second authentication apparatus and information relating to transactions encrypted with the secret key of the information processing apparatus to the first authentication apparatus. When the first authentication apparatus receives the electronic certificate and the encrypted information, it acquires the public key of the information processing apparatus from the transmitted electronic certificate by using the public key of the second authentication apparatus (certificate authority) acquired from the second authentication apparatus. Then, the first authentication apparatus decrypts the encrypted information with the acquired public key of the information processing apparatus, and judges whether the decrypted information is proper or not.

The first authentication apparatus refers to an environment information database, which stores conditions of environment information classified according to information to be transmitted and received, and the transmitted information, and judges whether the transmitted environment information is proper or not. When all the biological information authentication, environment information authentication and electronic certificate authentication are judged successful, the first authentication apparatus judges that the information processing apparatus is safe. With such a structure, the present invention can realize smooth transmission and reception of information and transactions while ensuring the security of the information processing apparatus. Further, the biological information authentication, electronic certificate authentication and environment authentication are also performed in the first authentication apparatus, and, only when all of the biological information authentication, electronic certificate authentication and environment authentication performed in the information processing apparatus and the biological information authentication, electronic certificate authentication and environment authentication performed in the first authentication apparatus are judged successful, both of the first authentication apparatus and the information processing apparatus are judged to be proper. Thus, it is possible to ensure higher security.

Besides, according to the present invention, the biological information about the user is received, and personal authentication is performed by judging whether or not the received biological information is proper. Then, the information processing apparatus transmits the collected environment information to the first authentication apparatus, and authentication of the environment information is performed in the first authentication apparatus. In the case where patch software or the like is transmitted from the first authentication apparatus to the information processing apparatus, the first authentication apparatus transmits an electronic certificate issued by the second authentication apparatus and the software encrypted with a secret key issued by the second authentication apparatus to the information processing apparatus. When the information processing apparatus receives the electronic certificate and the encrypted software, it makes a request for a public key to the second authentication apparatus, and acquires the public key of the first authentication apparatus from the electronic certificate by using the public key of this certificate authority. Then, the information processing apparatus decrypts the encrypted software with the acquired public key, and judges whether or not the decrypted software is proper. Finally, when all the authentications by the above-mentioned personal authentication, environment authentication and electronic certificate authentication are judged successful, the decrypted software is installed in the information processing apparatus. With such a structure, the present invention can prevent "spoofing" by a third person, and provide software, such as patch software and firmware, for the information processing apparatus while maintaining high security.

Further, according to the present invention, the information processing apparatus comprises main power supplying means, sub-power supplying means, and communicating means for reception that is constructed to receive supply of power from the sub-power supplying means. In the case where power is not supplied by the main power supplying means, i.e., when the main power source is not ON, when the electronic certificate and software encrypted with the secret key are transmitted from the first authentication apparatus, the communicating means for reception using sub-power supplying means receives these pieces of information and stores them temporarily in a memory. Then, when power is supplied by the main power supplying means, the stored electronic certificate and software are read, a judgment is made as to whether the transmitted software is proper or not, and personal authentication and environment authentication are performed. With such a structure, the present invention can distribute a large amount of patch software to customers, including customers who do not turn on their information processing apparatuses, after ensuring security. In particular, by providing software for deleting data stored on and after a predetermined time from the storage unit, the present invention can have the advantageous effects, such as the effect of effectively preventing the use of software as a stepping-stone for DDoS attacks.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A safety judgment method for judging safety of an information processing apparatus among the information processing apparatus, a first authentication apparatus and a second authentication apparatus which are connected through a communication network, comprising the steps of:
receiving biological information by said information processing apparatus;
authenticating the biological information by judging whether the received biological information is proper or not by said information processing apparatus, said first authentication apparatus, or said second authentication apparatus;
collecting environment information including information about peripheral equipment connected to said information processing apparatus or about software installed in said information processing apparatus;
transmitting the collected environment information from said information processing apparatus to said first authentication apparatus;
transmitting an electronic certificate issued in advance by said second authentication apparatus and information encrypted with a secret key issued by said second authentication apparatus from said information processing apparatus to said first authentication apparatus;
authenticating the electronic certificate by said first authentication apparatus by decrypting the encrypted information with a public key acquired from the transmitted electronic certificate by using a public key acquired from said second authentication apparatus, and judging whether or not the decrypted information is proper;
authenticating the environment information by said first authentication apparatus by judging whether or not the transmitted environment information is proper with reference to an environment information database, which stores environment conditions classified according to information to be transmitted and received, and the transmitted information; and
judging said information processing apparatus to be safe by said first authentication apparatus when all the authentications performed in the step of authenticating the biological information, the step of authenticating the environment information, and the step of authenticating an electronic certificate are successful.

2. The safety judgment method as set forth in claim 1, further comprising the sub-steps of:
receiving biological information by said first authentication apparatus;
authenticating the biological information by judging whether the received biological information is proper or not by said information processing apparatus, said first authentication apparatus, or said second authentication apparatus;
collecting environment information including information about peripheral equipment connected to said first authentication apparatus or about software installed in said first authentication apparatus;

encrypting the environment information collected in the sub-step of collecting the environment information, with a secret key issued by said second authentication apparatus;

transmitting an electronic certificate issued by said second authentication apparatus and the encrypted environment information to said information processing apparatus;

authenticating the electronic certificate by said information processing apparatus by decrypting the encrypted environment information with a public key, which is acquired from the transmitted electronic certificate by using a public key acquired from said second authentication apparatus, and judging whether or not the decrypted environment information is proper;

authenticating the environment information by said information processing apparatus by judging whether or not the transmitted environment information is proper with reference to a sub-environment information database, which stores environment conditions classified according to information to be transmitted and received, and the decrypted environment information; and judging said information processing apparatus and said first authentication apparatus to be safe when all the authentications performed in the sub-step of authenticating the biological information, the sub-step of authenticating the environment information and the sub-step of authenticating the electronic certificate are successful and said information processing apparatus is judged safe in the step of judging said information processing apparatus to be safe.

3. A safety judgment method for judging safety of an information processing apparatus among the information processing apparatus, a first authentication apparatus and a second authentication apparatus which are connected through a communication network, comprising the steps of:

receiving biological information by said information processing apparatus;

authenticating the biological information by judging whether the received biological information is proper or not by said information processing apparatus, said first authentication apparatus, or said second authentication apparatus;

collecting environment information including information about peripheral equipment connected to said information processing apparatus or about software installed in said information processing apparatus;

encrypting the collected environment information with a secret key issued by said second authentication apparatus;

transmitting an electronic certificate issued in advance by said second authentication apparatus and the environment information encrypted with the secret key from said information processing apparatus to said first authentication apparatus;

authenticating the electronic certificate by said first authentication apparatus by decrypting the encrypted environment information with a public key acquired from the transmitted electronic certificate by using a public key acquired from said second authentication apparatus, and judging whether or not the decrypted environment information is proper;

authenticating the environment information by said first authentication apparatus by judging whether or not the decrypted environment information is proper with reference to an environment information database, which stores environment conditions classified according to information to be transmitted and received, and the transmitted information; and judging said information processing apparatus to be safe by said first authentication apparatus when all the authentications performed in the step of authenticating the biological information, the step of authenticating the environment information, and the step of authenticating an electronic certificate are successful.

4. The safety judgment method as set forth in claim 3, further comprising the sub-steps of:

receiving biological information by said first authentication apparatus;

authenticating the biological information by judging whether the received biological information is proper or not by said information processing apparatus, said first authentication apparatus, or said second authentication apparatus;

collecting environment information including information about peripheral equipment connected to said first authentication apparatus or about software installed in said first authentication apparatus;

encrypting the environment information collected in the sub-step of collecting the environment information, with a secret key issued by said second authentication apparatus;

transmitting an electronic certificate issued by said second authentication apparatus and the encrypted environment information to said information processing apparatus;

authenticating the electronic certificate by said information processing apparatus by decrypting the encrypted environment information with a public key, which is acquired from the transmitted electronic certificate by using a public key acquired from said second authentication apparatus, and judging whether or not the decrypted environment information is proper;

authenticating the environment information by said information processing apparatus by judging whether or not the transmitted environment information is proper with reference to a sub-environment information database, which stores environment conditions classified according to information to be transmitted and received, and the decrypted environment information; and judging said information processing apparatus and said first authentication apparatus to be safe when all the authentications performed in the sub-step of authenticating the biological information, the sub-step of authenticating the environment information and the sub-step of authenticating the electronic certificate are successful and said information processing apparatus is judged safe in the step of judging said information processing apparatus to be safe.

5. A safety judgment method for judging safety of an information processing apparatus among the information processing apparatus, a first authentication apparatus and a second authentication apparatus which are connected through a communication network, comprising the steps of:

receiving biological information by said information processing apparatus;

authenticating the biological information by judging whether the received biological information is proper or not by said information processing apparatus, said first authentication apparatus, or said second authentication apparatus;

collecting environment information including information about peripheral equipment connected to said information processing apparatus or about software installed in said information processing apparatus;

transmitting the collected environment information from said information processing apparatus to said first authentication apparatus;

transmitting an electronic certificate issued in advance by said second authentication apparatus and information encrypted with a secret key issued by said second authentication apparatus from said information processing apparatus to said first authentication apparatus;

authenticating the environment information by said first authentication apparatus by judging whether or not the transmitted environment information is proper with reference to an environment information database that stores environment conditions classified according to information to be transmitted and received; and authenticating the electronic certificate by said information processing apparatus by decrypting the encrypted software with a public key, which is acquired from the transmitted electronic certificate by using a public key acquired from said second authentication apparatus, and judging whether or not the decrypted software is proper; and installing the decrypted software in said information processing apparatus when all the authentications performed in the step of authenticating the biological information, the step of authenticating the environment information and the step of authenticating the electronic certificate are successful.

6. A safety judgment system for judging safety of an information processing apparatus among the information processing apparatus, a first authentication apparatus and a second authentication apparatus which are connected through a communication network, wherein said information processing apparatus comprises: biological information receiving means for receiving biological information; biological information authenticating means for judging whether or not the received biological information is proper; environment information collecting means for collecting environment information including information about peripheral equipment connected thereto or about software installed therein; environment information transmitting means for transmitting the environment information collected by said environment information collecting means to said first authentication apparatus; and encrypted information transmitting means for transmitting an electronic certificate issued by said second authentication apparatus and information encrypted with a secret key issued by said second authentication apparatus to said first authentication apparatus, and said first authentication apparatus comprises: electronic certificate authenticating means for decrypting the encrypted information with a public key, which is acquired from the transmitted electronic certificate by using a public key acquired from said second authentication apparatus, and judging whether or not the decrypted information is proper; environment information authenticating means for judging whether or not the transmitted environment information is proper with reference to an environment information database, which stores environment conditions classified according to information to be transmitted and received, and the transmitted information; and safety judging means for judging said information processing apparatus to be safe when all the authentications performed by said biological information authenticating means, said environment information authenticating means and said electronic certificate authenticating means are successful.

7. The safety judgment system as set forth in claim 6, wherein said environment information transmitting means and said encrypted information transmitting means are constructed to encrypt the collected environment information with said secret key and transmit the encrypted environment information together with said electronic certificate to said first authentication apparatus.

8. The safety judgment system as set forth in claim 6, further comprising a shop computer for transmitting and receiving information relating to transactions to/from said information processing apparatus, wherein said information processing apparatus further comprises means for receiving information relating to transactions, including product information or price information, said encrypted information transmitting means is constructed to transmit an electronic certificate issued by said second authentication apparatus and the information relating to transactions encrypted with said secret key issued by said second authentication apparatus to said first authentication apparatus, said environment information authenticating means is constructed to read an environment condition related to a class corresponding to the transmitted product information or price information from said environment information database and judge whether or not the environment condition is proper, based on whether or not the transmitted environment information matches the read environment condition, and said first authentication apparatus further comprises means for transmitting information indicating that said information processing apparatus is safe to said shop computer, when said safety judging means judges that said information processing apparatus is safe.

9. The safety judgment system as set forth in claim 6, wherein said first authentication apparatus comprises: sub-biological information receiving means for receiving biological information; sub-biological information authenticating means for judging whether or not the biological information received by said sub-biological information receiving means is proper; sub-environment information collecting means for collecting environment information including information about peripheral equipment connected thereto or about software installed therein; sub-encrypting means for encrypting the environment information collected by said sub-environment information collecting means, with a secret key issued by said second authentication apparatus; and sub-encrypted information transmitting means for transmitting an electronic certificate issued by said second authentication apparatus and the encrypted environment information to said information processing apparatus, and said information processing apparatus comprises: sub-electronic certificate authenticating means for decrypting the encrypted environment information with a public key, which is acquired from the transmitted electronic certificate by using a public key acquired from said second authentication apparatus, and judging whether or not the decrypted environment information is proper; sub-environment information authenticating means for judging whether or not the transmitted environment information is proper with reference to a sub-environment information database, which stores environment conditions classified according to information to be transmitted and received, and the decrypted environment information; and sub-safety judging means for judging said information processing apparatus and said first authentication apparatus to be safe when all the authentications performed by said sub-biological information authenticating means, said sub-environment information authenticating means and said sub-electronic certificate authenticating means are successful and said safety judging means judges that said information processing apparatus are safe.

10. The safety judgment system as set forth in claim 9, wherein the environment information includes information about name or version of installed software, equipment name or version of connected peripheral equipment, or device name or version of said information processing apparatus.

11. The safety judgment system as set forth in claim 10, wherein the biological information is information about voice, fingerprint, retina, or iris.

12. A safety judgment system for judging safety of an information processing apparatus among the information processing apparatus, a first authentication apparatus and a second authentication apparatus which are connected through a communication network, wherein
said information processing apparatus comprises a processor capable of performing the operations of:
receiving biological information;
authenticating the biological information by judging whether or not the received biological information is proper;
collecting environment information including information about peripheral equipment connected to said information processing apparatus or about software installed in said information processing apparatus;
transmitting the collected environment information to said first authentication apparatus; and
transmitting an electronic certificate issued by said second authentication apparatus and information encrypted with a secret key issued by said second authentication apparatus to said first authentication apparatus, and
said first authentication apparatus comprises a processor capable of performing the operations of:
authenticating the electronic certificate by decrypting the encrypted information with a public key, which is acquired from the transmitted electronic certificate by using a public key acquired from said second authentication apparatus, and judging whether or not the decrypted information is proper;
authenticating the environment information by judging whether or not the transmitted environment information is proper with reference to an environment information database, which stores environment conditions classified according to information to be transmitted and received, and the transmitted information; and
judging said information processing apparatus to be safe when all the authentications by the operation of authenticating the biological information, the operation of authenticating the environment information and the operation of authenticating the electronic certificate are successful.

13. The safety judgment system as set forth in claim 12, wherein the processor of said information processing apparatus is further capable of performing the operation of encrypting the collected environment information with the secret key and transmitting the encrypted environment information together with the electronic certificate to said first authentication apparatus.

14. The safety judgment system as set forth in claim 12, further comprising a shop computer for transmitting and receiving information relating to transactions to/from said information processing apparatus, wherein
the processor of said information processing apparatus is further capable of performing the operations of:
receiving information relating to transactions, including product information or price information;
transmitting an electronic certificate issued by said second authentication apparatus, and the information relating to transactions encrypted with a secret key issued by said second authentication apparatus to said first authentication apparatus; and
reading an environment condition related to a class corresponding to the transmitted product information or price information from the environment information database and judging whether or not the environment condition is proper, based on whether or not the transmitted environment information matches the read environment condition, and
the processor of said first authentication apparatus is further capable of performing the operation of transmitting information indicating that said information processing apparatus is safe to said shop computer, when the information processing apparatus is judged safe in the operation of judging said information processing apparatus to be safe.

15. The safety judgment system as set forth in claim 12, wherein
the processor of said first authentication apparatus is further capable of performing the sub-operations of:
receiving biological information;
authenticating the biological information by judging whether or not the received biological information is proper;
collecting environment information including information about peripheral equipment connected to said first authentication apparatus or about software installed in said first authentication apparatus;
encrypting the collected environment information with a secret key issued by said second authentication apparatus; and
transmitting an electronic certificate issued by said second authentication apparatus and the encrypted environment information to said information processing apparatus, and
the processor of said information processing apparatus is further capable of performing the sub-operations of:
authenticating the electronic certificate by decrypting the encrypted environment information with a public key, which is acquired from the transmitted electronic certificate by using a public key acquired from said second authentication apparatus, and judging whether or not the decrypted environment information is proper;
authenticating the environment information by judging whether or not the transmitted environment information is proper with reference to a sub-environment information database, which stores environment conditions classified according to information to be transmitted and received, and the decrypted environment information; and
judging said information processing apparatus and said first authentication apparatus to be safe when all the authentications by the sub-operation of authenticating the biological information, the sub-operation of authenticating the environment information and the sub-operation of authenticating the electronic certificate are successful and said information processing apparatus is judged safe in the operation of judging said information processing apparatus to be safe.

16. The safety judgment system as set forth in claim 15, wherein the environment information includes information about name or version of installed software, equipment name or version of connected peripheral equipment, or device name or version of said information processing apparatus.

17. The safety judgment system as set forth in claim 16, wherein the biological information is information about voice, fingerprint, retina, or iris.

18. A safety judgment system for judging safety of an information processing apparatus among the information processing apparatus, a first authentication apparatus and a second authentication apparatus which are connected through a communication network, wherein
said information processing apparatus comprises: biological information receiving means for receiving biological information; biological information authenticating means for judging whether or not the biological information received by said biological information receiving means is proper; environment information collecting means for collecting environment information including information about peripheral equipment connected thereto or about software installed therein; and environment information transmitting means for transmitting the environment information collected by said environment information collecting means to said first authentication apparatus,
said first authentication apparatus comprises: encrypted information transmitting means for transmitting an electronic certificate issued by said second authentication apparatus and software encrypted with a secret key issued by said second authentication apparatus to said information processing apparatus; and environment information authenticating means for judging whether or not the transmitted environment information is proper with reference to an environment information database that stores environment conditions classified according to information to be transmitted and received, and
said information processing apparatus further comprises:
electronic certificate authenticating means for decrypting the encrypted software with a public key, which is acquired from the transmitted electronic certificate by using a public key acquired from said second authentication apparatus, and judging whether or not the decrypted software is proper; and installing means for installing the decrypted software when all the authentications performed by said biological information authenticating means, said environment information authenticating means and said electronic certificate authenticating means are successful.

19. The safety judgment system as set forth in claim 18, wherein said information processing apparatus further comprises:
main power supplying means;
sub-power supplying means;
communicating means for reception for receiving supply of power from said sub-power supplying means; and
storing means for storing the electronic certificate and software encrypted with the secret key which were transmitted by said encrypted information transmitting means and received by said communicating means for reception, when power is not supplied by said main power supplying means.

20. The safety judgment system as set forth in claim 19, wherein said electronic certificate authenticating means is constructed to read the electronic certificate and software stored in said storing means when power is supplied by said main power supplying means, decrypt the encrypted software with a public key which is acquired from the electronic certificate by using a public key acquired from said second authentication apparatus, and judge whether or not the decrypted software is proper.

21. The safety judgment system as set forth in claim 20, wherein said software is patch software for software pre-installed in said information processing apparatus.

22. The safety judgment system as set forth in claim 20, wherein said information processing apparatus further comprises deleting means for deleting data stored in a storage unit on and after a predetermined time, when the software installed by said installing means is executed.

23. The safety judgment system as set forth in claim 22, wherein the environment information includes information about name or version of installed software, equipment name or version of connected peripheral equipment, or device name or version of said information processing apparatus.

24. The safety judgment system as set forth in claims 23, wherein the biological information is information about voice, fingerprint, retina, or iris.

25. A safety judgment system for judging safety of an information processing apparatus among the information processing apparatus, a first authentication apparatus and a second authentication apparatus which are connected through a communication network, wherein
said information processing apparatus comprises a processor capable of performing the operations of:
receiving biological information;
authenticating the biological information by judging whether or not the received biological information is proper;
collecting environment information including information about peripheral equipment connected to said information processing apparatus or about software installed in said information processing apparatus; and
transmitting the collected environment information to said first authentication apparatus, and
said first authentication apparatus comprises a processor capable of performing the operations of:
transmitting an electronic certificate issued by said second authentication apparatus and software encrypted with a secret key issued by said second authentication apparatus to said information processing apparatus; and
authenticating the environment information by judging whether or not the transmitted environment information is proper with reference to an environment information database that stores environment conditions classified according to information to be transmitted and received, and
said processor of said information processing apparatus is further capable of performing the operations of:
authenticating the electronic certificate by decrypting the encrypted software with a public key, which is acquired from the transmitted electronic certificate by using a public key acquired from said second authentication apparatus, and judging whether or not the decrypted software is proper; and installing the decrypted software when all the authentications by the operation of authenticating the biological information, the operation of authenticating the environment information and the operation of authenticating the electronic certificate are successful.

26. The safety judgment system as set forth in claim 25, wherein the processor of said information processing apparatus is further capable of performing the operations of:
causing main power supplying means to supply main power;
causing sub-power supplying means to supply sub power;
supplying power from said sub-power supplying means to communicating means for reception; and
causing said communicating means for reception to receive the transmitted electronic certificate and software encrypted with the secret key, and store the electronic certificate and software in storing means, when power is not supplied by said main power supplying means.

27. The safety judgment system as set forth in claim 26, wherein the processor of said information processing apparatus is further capable of performing the operation of reading the electronic certificate and software stored in said storing means when power is supplied by said main power supplying means, decrypting the encrypted software with a public key, which is acquired from the electronic certificate by using a public key acquired from said second authentication apparatus, and judging whether or not the decrypted software is proper.

28. The safety judgment system as set forth in claim 27, wherein the software is patch software for software preinstalled in said information processing apparatus.

29. The safety judgment system as set forth in claim 27, wherein the processor of said information processing apparatus is further capable of performing the operation of deleting data stored in a storage unit on and after a predetermined time from said storage unit when the installed software is executed.

30. The safety judgment system as set forth in claim 29, wherein the environment information includes information about name or version of installed software, equipment name or version of connected peripheral equipment, or device name or version of said information processing apparatus.

31. The safety judgment system as set forth in claim 30, wherein the biological information is information about voice, fingerprint, retina, or iris.

32. A safety judgment system for judging safety of an information processing apparatus among the information processing apparatus, a first authentication apparatus and a second authentication apparatus which are connected through a communication network, wherein
said information processing apparatus comprises: biological information receiving means for receiving biological information; environment information collecting means for collecting environment information including information about peripheral equipment connected thereto or about software installed therein; encrypting means for encrypting the biological information received by said biological information receiving means and the environment information collected by said environment information collecting means, with a secret key issued by said second authentication apparatus; and encrypted information transmitting means for transmitting an electronic certificate issued by said second authentication apparatus and the encrypted biological information and environment information to said first authentication apparatus, and
said first authentication apparatus comprises: electronic certificate authenticating means for decrypting the encrypted biological information and environment information with a public key, which is acquired from the transmitted electronic certificate by using a public key acquired from said second authentication apparatus, and judging whether or not the decrypted biological information and environment information are proper; environment information authenticating means for judging whether or not the transmitted environment information is proper with reference to an environment information database, which stores environment conditions classified according to information to be transmitted and received, and the decrypted environment information; biological information authenticating means for judging whether or not the biological information is proper by comparing the decrypted biological information with pre-stored biological information; and safety judging means for judging said information processing apparatus to be safe when all the authentications performed by said biological information authenticating means, said environment information authenticating means and said electronic certificate authenticating means are successful.

33. The safety judgment system as set forth in claim 32, wherein
said first authentication apparatus comprises: sub-biological information receiving means for receiving biological information; sub-biological information authenticating means for judging whether or not the biological information received by said sub-biological information receiving means is proper; sub-environment information collecting means for collecting environment information including information about peripheral equipment connected thereto or about software installed therein; sub-encrypting means for encrypting the environment information collected by said sub-environment information collecting means, with a secret key issued by said second authentication apparatus; and sub-encrypted information transmitting means for transmitting an electronic certificate issued by said second authentication apparatus and the encrypted environment information to said information processing apparatus, and
said information processing apparatus comprises: sub-electronic certificate authenticating means for decrypting the encrypted environment information with a public key, which is acquired from the transmitted electronic certificate by using a public key acquired from said second authentication apparatus, and judging whether or not the decrypted environment information is proper; sub-environment information authenticating means for judging whether or not the transmitted environment information is proper with reference to a sub-environment information database, which stores environment conditions classified according to information to be transmitted and received, and the decrypted environment information; and sub-safety judging means for judging said information processing apparatus and said first authentication apparatus to be safe when all the authentications performed by said sub-biological information authenticating means, said sub-environment information authenticating means and said sub-electronic certificate authenticating means are successful and said safety judging means judges that said information processing apparatus is safe.

34. The safety judgment system as set forth in claim 33, wherein the environment information includes information about name or version of installed software, equipment name or version of connected peripheral equipment, or device name or version of said information processing apparatus.

35. The safety judgment system as set forth in claim 34, wherein the biological information is information about voice, fingerprint, retina, or iris.

36. A safety judgment system for judging safety of an information processing apparatus among the information processing apparatus, a first authentication apparatus and a second authentication apparatus which are connected through a communication network, wherein said information processing apparatus comprises a processor capable of performing the operations of:
receiving biological information;
collecting environment information including information about peripheral equipment connected to said information processing apparatus or about software installed in said information processing apparatus;
encrypting the received biological information and the collected environment information with a secret key issued by said second authentication apparatus; and
transmitting an electronic certificate issued by said second authentication apparatus and the encrypted biological information and environment information to said first authentication apparatus, and
said first authentication apparatus comprises a processor capable of performing the operations of:
authenticating the electronic certificate by decrypting the encrypted biological information and environment information with a public key, which is acquired from the transmitted electronic certificate by using a public key acquired from said second authentication apparatus, and judging whether or not the decrypted biological information and environment information are proper;
authenticating the environment information by judging whether or not the transmitted environment information is proper with reference to an environment information database, which stores environment conditions classified according to information to be transmitted and received, and the decrypted environment information;
authenticating the biological information by judging whether or not the decrypted biological information is proper by comparing the decrypted biological information with pre-stored biological information; and
judging said information processing apparatus to be safe when all the authentications by the operation of authenticating the biological information, the operation of authenticating the environment information and the operation of authenticating the electronic certificate are successful.

37. The safety judgment system as set forth in claim 36, wherein
the processor of said first authentication apparatus is capable of performing the sub-operations of:
receiving biological information;
judging whether or not the received biological information is proper;
collecting environment information including information about peripheral equipment connected to said first authentication apparatus or about software installed in said first authentication apparatus;
encrypting the collected environment information with a secret key issued by said second authentication apparatus; and
transmitting an electronic certificate issued by said second authentication apparatus and the encrypted environment information to said information processing apparatus, and
the processor of said information processing apparatus is capable of performing the sub-operations of:
decrypting the encrypted environment information with a public key, which is acquired from the transmitted electronic certificate by using a public key acquired from said second authentication apparatus, and judging whether or not the decrypted environment information is proper;
judging whether or not the transmitted environment information is proper with reference to a sub-environment information database, which stores environment conditions classified according to information to be transmitted and received, and the decrypted environment information; and
judging said information processing apparatus and said first authentication apparatus to be safe when all the authentications by the sub-operation of authenticating the biological information, the sub-operation of authenticating the environment information, and the sub-operation of authenticating the electronic certificate are judged successful, and said information processing apparatus is judged safe in the operation of judging safety.

38. The safety judgment system as set forth in claim 37, wherein the environment information includes information about name or version of installed software, equipment name or version of connected peripheral equipment, or device name or version of said information processing apparatus.

39. The safety judgment system as set forth in claim 38, wherein the biological information is information about voice, fingerprint, retina, or iris.

40. A safety judgment apparatus for judging safety of an information processing apparatus connected to a first authentication apparatus and a second authentication apparatus through a communication network, comprising:
biological information authenticating means for judging whether or not received biological information is proper;
environment information collecting means for collecting environment information including information about peripheral equipment connected to said information processing apparatus or about software installed in said information processing apparatus;
environment information transmitting means for transmitting the environment information collected by said environment information collecting means to said first authentication apparatus;
encrypted information transmitting means for transmitting an electronic certificate issued by said second authentication apparatus and information encrypted with a secret key issued by said second authentication apparatus to said first authentication apparatus; and
safety judging means for judging said information processing apparatus to be safe when said biological information authenticating means judges proper, said first authentication apparatus judges that the environment information transmitted by said environment information transmitting means is proper, said first authentication apparatus judges that the electronic certificate and encrypted information transmitted by said encrypted information transmitting means are proper, and said safety judging means receives information indicating that the information is proper.

41. A safety judgment apparatus for judging safety of an information processing apparatus connected to a first authentication apparatus and a second authentication apparatus through a communication network, comprising:
    biological information authenticating means for judging whether or not received biological information is proper;
    environment information collecting means for collecting environment information including information about peripheral equipment connected to said information processing apparatus or about software installed in said information processing apparatus;
    environment information transmitting means for transmitting the environment information collected by said environment information collecting means to said first authentication apparatus;
    electronic certificate authenticating means for, when an electronic certificate and encrypted software are received from said first authentication apparatus, decrypting the encrypted software with a public key, which is acquired from the electronic certificate by using a public key acquired from said second authentication apparatus, and judging whether or not the decrypted software is proper; and
    installing means for installing the decrypted software in said information processing apparatus when the authentications performed by said biological information authenticating means and said electronic certificate authenticating means are judged successful, said first authentication apparatus judges that the environment information transmitted by said environment information transmitting means is proper, and said installing means receives information indicating that the information is proper.

42. A safety judgment apparatus for judging safety of an information processing apparatus connected to a first authentication apparatus and a second authentication apparatus through a communication network, comprising a processor capable of performing the operations of:
    authenticating biological information by judging whether or not received biological information is proper;
    collecting environment information including information about peripheral equipment connected to said information processing apparatus or about software installed in said information processing apparatus;
    transmitting the collected environment information to said first authentication apparatus;
    transmitting an electronic certificate issued by said second authentication apparatus and information encrypted with a secret key issued by said second authentication apparatus to said first authentication apparatus; and
    judging said information processing apparatus to be safe when the biological information is judged proper in the operation of authenticating the biological information, said first authentication apparatus judges that the transmitted environment information is proper, the first authentication apparatus judges that the transmitted electronic certificate and encrypted information are proper, and information indicating that the information is proper is received.

43. A safety judgment apparatus for judging safety of an information processing apparatus connected to a first authentication apparatus and a second authentication apparatus through a communication network, comprising a processor capable of performing the operations of:
    authenticating biological information by judging whether or not received biological information is proper;
    collecting environment information including information about peripheral equipment connected to said information processing apparatus or about software installed in said information processing apparatus;
    transmitting the collected environment information to said first authentication apparatus;
    when an electronic certificate and encrypted software are received from said first authentication apparatus, authenticating the electronic certificate by decrypting the encrypted software with a public key, which is acquired from the electronic certificate by using a public key acquired from said second authentication apparatus, and judging whether or not the decrypted software is proper; and
    installing the decrypted software in said information processing apparatus when authentications are judged successful in the operation of authenticating the biological information and the operation of authenticating the electronic certificate, said first authentication apparatus judges that transmitted environment information is proper, and information indicating that the information is proper is received.

44. A first authentication apparatus for judging safety of an information processing apparatus connected through a communication network, comprising:
    authentication information receiving means for receiving authentication information indicating whether or not biological information received by said information processing apparatus is proper;
    electronic certificate authenticating means for, when an electronic certificate issued by a second authentication apparatus connected through the communication network and information encrypted with a secret key issued by said second authentication apparatus are transmitted from said information processing apparatus, decrypting the encrypted information with a public key, which is acquired from the transmitted electronic certificate by using a public key acquired from said second authentication apparatus, and judging whether or not the decrypted information is proper;
    environment information authenticating means for, when environment information including information about peripheral equipment connected to said information processing apparatus or about software installed in said information processing apparatus is received from said information processing apparatus, judging whether or not the received environment information is proper with reference to an environment information database, which stores environment conditions classified according to information to be transmitted and received, and the transmitted information; and
    safety judging means for judging said information processing apparatus to be safe when said authentication information receiving means receives authentication information indicating that the biological information is proper, and authentications performed by said environment information authenticating means and said electronic certificate authenticating means are judged successful.

45. A first authentication apparatus for judging safety of an information processing apparatus connected through a communication network, comprising a processor capable of performing the operations of:

receiving authentication information indicating whether or not biological information received by said information processing apparatus is proper;

when an electronic certificate issued by a second authentication apparatus connected through the communication network and information encrypted with a secret key issued by said second authentication apparatus are transmitted from said information processing apparatus, authenticating the electronic certificate by decrypting the encrypted information with a public key, which is acquired from the transmitted electronic certificate by using a public key acquired from said second authentication apparatus, and judging whether or not the decrypted information is proper;

when environment information including information about peripheral equipment connected to said information processing apparatus or about software installed in said information processing apparatus is received from said information processing apparatus, authenticating the environment information by judging whether or not the received environment information is proper with reference to an environment information database, which stores environment conditions classified according to information to be transmitted and received, and the transmitted information; and judging said information processing apparatus to be safe when authentication information indicating that the biological information is proper is received, and the authentications by the operation of authenticating the environment information and the operation of authenticating the electronic certificate are judged successful.

46. A computer program product, within a computer readable medium, for judging safety of a computer connected to a first authentication apparatus and a second authentication apparatus through a communication network, comprising the steps of:

causing the computer to authenticate biological information by authenticating whether or not received biological information is proper;

causing the computer to collect environment information including information about connected peripheral equipment or about installed software;

causing the computer to transmit environment information by transmitting the collected environment information to said first authentication apparatus;

causing the computer to transmit encrypted information by transmitting an electronic certificate issued by said second authentication apparatus and information encrypted with a secret key issued by said second authentication apparatus to said first authentication apparatus; and causing the computer to judge the computer to be safe when the biological information is judged proper in the step of authenticating the biological information, the first authentication apparatus judges that environment information transmitted in the step of transmitting environment information is proper, the first authentication apparatus judges that the electronic certificate and encrypted information transmitted in the step of transmitting the encrypted information are proper, and information indicating that the information is proper is received from said first authentication apparatus.

47. A computer program product, within a computer readable medium, for judging safety of a computer connected to a first authentication apparatus and a second authentication apparatus through a communication network, comprising the steps of:

causing the computer to authenticate biological information by authenticating whether or not received biological information is proper;

causing the computer to collect environment information including information about connected peripheral equipment or about installed software;

causing the computer to transmit environment information by transmitting the collected environment information to said first authentication apparatus;

when an electronic certificate and encrypted software are received from said first authentication apparatus, causing the computer to authenticate the electronic certificate by decrypting the encrypted software with a public key, which is acquired from the electronic certificate by using a public key acquired from the second authentication apparatus, and judging whether or not the decrypted software is proper; and causing the computer to install the decrypted software when authentications performed in the step of authenticating the biological information and the step of authenticating the electronic certificate are judged successful, the first authentication apparatus judges that the environment information transmitted in the step of transmitting environment information is proper, and information indicating that the information is proper is received.

* * * * *